(12) United States Patent
Stolerman et al.

(10) Patent No.: US 8,566,206 B2
(45) Date of Patent: Oct. 22, 2013

(54) PENSION FUND SYSTEMS

(75) Inventors: Jonathan Stolerman, Shipston on Stour (GB); Timothy Lyons, Kent (GB); Wayne Chen, Teddington (GB); Fiona Page, London (GB)

(73) Assignee: Pensions First Analytics Limited, London (GB)

( * ) Notice: Subject to any disclaimer, the term of this patent is extended or adjusted under 35 U.S.C. 154(b) by 222 days.

(21) Appl. No.: 12/638,668

(22) Filed: Dec. 15, 2009

(65) Prior Publication Data

US 2010/0131425 A1    May 27, 2010

Related U.S. Application Data

(63) Continuation-in-part of application No. 12/212,133, filed on Sep. 17, 2008, which is a continuation of application No. 12/117,306, filed on May 8, 2008, application No. 12/638,668, which is a continuation-in-part of application No. 12/612,274, filed on Nov. 4, 2009, which is a continuation-in-part of application No. 12/212,133, filed on Sep. 17, 2008, which is a continuation of application No. 12/117,306, filed on May 8, 2008, application No. 12/638,668, which is a continuation-in-part of application No. 12/612,291, filed on Nov. 4, 2009, which is a continuation-in-part of application No. 12/212,133, which is a continuation of application No. 12/117,306, application No. 12/638,668, which is a continuation-in-part of application No. 12/612,299, filed on Nov. 4, 2009, which is a continuation-in-part of application No. 12/212,133, which is a continuation of application No. 12/117,306.

(30) Foreign Application Priority Data

May 10, 2007   (GB) .................... 0709036.8
Aug. 31, 2007  (GB) .................... 0716979.0
Nov. 5, 2007   (GB) .................... 0721690.6

(51) Int. Cl.
    *G06Q 40/00*    (2012.01)

(52) U.S. Cl.
    USPC .............................. 705/36 R; 705/35; 705/39

(58) Field of Classification Search
    USPC ........................................... 705/35–45, 36 R
    See application file for complete search history.

(56) References Cited

U.S. PATENT DOCUMENTS 5,806,047 A    9/1998  Hackel et al.
5,933,815 A    8/1999  Golden (Continued)

FOREIGN PATENT DOCUMENTS

WO    WO 2008/139150    11/2008

OTHER PUBLICATIONS

"Private Pensions, Mortality Risk, and Decision to Annuitize", Jeffery R. Brown, John F. Kennedy School of Government and NBER, Feb. 2000.*

(Continued)

*Primary Examiner* — Hai Tran
(74) *Attorney, Agent, or Firm* — Cowan, Liebowitz & Latman, P.C.; Steven D. Underwood

(57) ABSTRACT

There is provided a computer-implemented method of projecting the future cash flows of a pension scheme, comprising: receiving data representative of the members of the pension scheme; receiving data representative of a mortality assumption; calculating, using data processing apparatus, for each pension scheme member, a projection of the future cash flow liabilities of the pension scheme to that member on the basis of the pension scheme member data and by applying the mortality assumption data to the pension scheme member data; and generating, using data processing apparatus, data representative of a projected liability cash flow of the pension scheme to all of its members by aggregating the liabilities to each member.

27 Claims, 27 Drawing Sheets

(56) References Cited

U.S. PATENT DOCUMENTS

| | | | |
|---|---|---|---|
| 6,269,339 B1* | 7/2001 | Silver | 705/2 |
| 6,947,904 B1 | 9/2005 | Macey | |
| 7,089,206 B2 | 8/2006 | Martin | |
| 7,617,138 B1 | 11/2009 | Gladden et al. | |
| 7,634,436 B1 | 12/2009 | Wagner | |
| 7,742,896 B2 | 6/2010 | Ikegami | |
| 7,747,518 B2* | 6/2010 | Caballero et al. | 705/38 |
| 7,844,523 B2 | 11/2010 | Torre et al. | |
| 2002/0188540 A1 | 12/2002 | Faye | |
| 2003/0208427 A1 | 11/2003 | Peters et al. | |
| 2003/0233301 A1 | 12/2003 | Chen et al. | |
| 2004/0088236 A1 | 5/2004 | Manning | |
| 2004/0177022 A1* | 9/2004 | Williams et al. | 705/36 |
| 2004/0186754 A1 | 9/2004 | Cecchi | |
| 2004/0230506 A1 | 11/2004 | Casco-Arias et al. | |
| 2004/0230507 A1 | 11/2004 | Davidovitch et al. | |
| 2005/0010510 A1 | 1/2005 | Brose et al. | |
| 2005/0086156 A1 | 4/2005 | Conroy et al. | |
| 2005/0177509 A1 | 8/2005 | Mahaney et al. | |
| 2005/0222940 A1 | 10/2005 | Schulman | |
| 2005/0267785 A1* | 12/2005 | Parankirinathan | 705/4 |
| 2006/0010061 A1* | 1/2006 | Macey | 705/35 |
| 2006/0026092 A1 | 2/2006 | Klein et al. | |
| 2006/0059074 A1 | 3/2006 | Freund | |
| 2006/0074786 A1 | 4/2006 | Zusy et al. | |
| 2006/0089892 A1 | 4/2006 | Sullivan et al. | |
| 2006/0100913 A1 | 5/2006 | Ward | |
| 2006/0212390 A1 | 9/2006 | Gruber | |
| 2007/0033124 A1 | 2/2007 | Herr et al. | |
| 2007/0038535 A1 | 2/2007 | Hulsizer et al. | |
| 2007/0219883 A1 | 9/2007 | Bronsnick et al. | |
| 2007/0226111 A1 | 9/2007 | Tan-Torres | |
| 2007/0233589 A1 | 10/2007 | Vasinkevich | |
| 2007/0239579 A1 | 10/2007 | Gulotta et al. | |
| 2008/0021804 A1 | 1/2008 | Deckoff | |
| 2008/0052210 A1 | 2/2008 | Mercier et al. | |
| 2008/0077519 A1 | 3/2008 | Pedersen et al. | |
| 2008/0189221 A1* | 8/2008 | Coughlan et al. | 705/36 R |
| 2008/0189222 A1* | 8/2008 | Coughlan et al. | 705/36 R |
| 2008/0249903 A1 | 10/2008 | Dellaert et al. | |
| 2008/0281742 A1 | 11/2008 | Lyons et al. | |
| 2009/0037258 A1 | 2/2009 | Lyons et al. | |
| 2009/0125450 A1 | 5/2009 | Mannion | |
| 2010/0121783 A1 | 5/2010 | Lyons | |
| 2010/0121784 A1 | 5/2010 | Lyons | |
| 2010/0121785 A1 | 5/2010 | Lyons | |

OTHER PUBLICATIONS

Lalani, M., 'Use of Captives to Share Pension Annuity Risk', E-bulletin of the Canadian Institute of Actuaries, Feb. 2009, retrieved from www.actuaries.ca.

Cole, M., 'A Role for Captives in Pension Financing', Captive Insurance Company Reports of the International Risk Management Institute (IRMI), Nov. 2006.

Cowling, et al. "Funding Defined Benefit Pension Schemes", British Actuarial Journal, vol. 11, pp. 497-518, 2005.

Blake, et al., "Living with Mortality: Longevity Bonds and Other Mortality-Linked Securities", British Actuarial Journal, vol. 12, pp. 153-197, 2006.

Continuous Mortality Investigation: Working Paper 3, "Projecting Future Mortality: A Discussion Paper", Mar. 2004, pp. 1-36, (published online at www.actuaries.org.uk).

Continuous Mortality Investigation: Working Paper 15, "Projecting Future Mortality: Towards a Proposal for a Stochastic Methodology", Jun. 2005, pp. 1-31, (published online at www.actuaries.org.uk).

Continuous Mortality Investigation: Working Paper 20, "Stochastic Projection Methodologies: Further Progress and P-Spline Model Features, Example Results and Implication", Apr. 2006, pp. 1-54, (published online at www.actuaries.org.uk).

International Search Report and Written Opinion issued by the European Patent Office in International Application No. PCT/GB2009/001129.

International Search Report and Written Opinion issued by the European Patent Office in International Application No. PCT/GB2008/001585.

"Der Brockhuas Computer and Informationstechnologie" 2003, F.A. Brockhaus Mannheim Leipzig, Mannheim, XP002491619, pp. 184-185, 625.

KPMG: A Financial Executive's Guide to Proposed Changes in Statutory Reserve and Risk-Based Capital Requirements for Variable Annuities; Apr. 2005; 14 pages @ us.kmpg.com/microsite/attachments/CapitalExpensiveProducts.pdf.

Probability of Default Ratings and Loss Given Default Assessments for Non-Financial Speculative—Grade Corporate Obligors in the United States and Canada by Moody's Investory Service; Global Credit Research; Aug. 2006, 16 pages @ http://www.nd.edu/~carecob/April%202007%20Conference/Loss%20given%20default%20rating%20methodology.pdf.

Measuring Loss-Give-Default for Structured Finance Securities: An Update, Dec. 2006, 28 pages @ www.moodys.com.com/sites/products/DefaultResearch/2006200000430444.pdf.

Jaquier et al., Model Error in Contingent Claim Models (Dynamic Evaluation), Jul. 1996; 55 pages, finance.wharton.upenn.edu/~rlwctr/papers/9607/pdf.

Janssen, "Dynamic Modeling of Life Table Data", Applied Stochastic Models and Data Analysis, vol. 11, 35-49 (1995), http://www.cmsim.net/sitebuildercontent/sitebuilderfiles/janssenskiadas.pdf.

Altman, "Measuring Corporate Bond Mortality and Performance", The Journal of Finance, vol. 44, No. 4, Sep. 1989, pp. 909-922, published by Blackwell Publishing for the American Finance Assoication. Article Stable URL: http://www.jstor.org/stable/2328616Reference.

Iyer, Faculty of Actuarial Science and Statistics and Application of Stochastic Methods in the Valuation of Social Security Pension Schemes., Actuarial Research Paper No. 151; Aug. 2003; ISBN 1-901615-72-3; Cass Business Scholl; www.cass.city.ac.uk; 42 pages.

McCarthy et al., "The Pension Protection Fund", Fiscal Studies, vol. 26, No. 2, pp. 139-167 (2005) 0143-5671.

Blake et al., "Pensionmetrics: Stochastic pension plan design and value-at-risk during accumulation phase", at http://www.wu.ac.at/programs/other/gc/whatwedo/bridging/symposia/2003/papers/paper_blake_1.pdf; ISSN 1367-580X; Pension Institute; Birkbeck College, University of London, Jun. 1, 2001; 30 pages.

Ten Tips to Appeal to Angel Investors: Tri-State Private Investor Network; Bringing ventures and investors together by Tri-State Private Investors; 2005, 6 pages.

Richards et al., "Two-Dimensional Mortality Data: Patterns and Projections", presented to the Faculties of Actuaries, Mar. 19, 2007, 45 pages.

Finkelstein et al., "Selection Effects in the United Kingdom Individual Annuities Market", The Economic Journal, 112 (January) 28-40 Royal Economic Society 2002. Published by Blackwell Publishers; 23 pages.

Ranasinghe; University of Connecticut, "Model to Develop a 'Provision for Adverse Deviation for the Longevity Risk for Impaired Lives", Aug. 2006; 23 pages at http://64.49.242.50/files/pdf/ARCH07v41n1_XV.pdf.

MultiOption Variable Annuities: Helping you accumulate the dollars you need for a financially secure retirement, Minnesota Life at Web.archive.org/web/*/http://www.minnesotalife.com Jul. 2002: p. 1-2.

Tregarthen, "Double the Benefit with a Split Annuity", Pub: Life Association News; Sep. 1997: 92, 9: ABII/INFORM Global p. 124, 126.

SAS/ETS Users Guide Version 8 by Cary, SAS Institute Inc., 1999p 1546 pp. 36 pages, date 1999.

Cairns, "Modelling the Mortality Term Structure", Heriot-Watt University, Edinburgh; 21 pages at www.pensions-institute.org/conferences/longevity/Cairns_Andrew.pdf, date 2004.

Stearns, et al., "Time to Include Time to Death? The Future of Health Care Expenditure Predictions", Department of Health Policy and Administration, University of North Carolina at Chapel Hill USA; Health Economics 12:315-237 2004: Publish Jul. 18, 2003 Wiley InterScience; www.interscience.wiley.com.

(56) References Cited

OTHER PUBLICATIONS

Besci, Federal Reserve Bank of Atlanta and Louisiana State University, "Longevity and the Life Cycle", Nov. 2001; pp. 1-27; www.bus.lsu.ed/economics/papers/pap01_12.pdf.
Lando et al., "On the pricing of step-up bonds in the European telecom sector", Journal of Credit Risk, vol. 1, No. 1, Winter 2004/2005.

Raffkind, Frequently Asked Questions Concerning Investment Limited Partnerships (Hedge Funds), Mar. 2006, Akin Gump Strauss Hauer & Field LLP.

Cash for Pensions; www.telegraph.co.uk/finance/personalfinance/2947590/Cash-for-pensions.html, Sep. 20, 2006.

* cited by examiner

| Member | Retirement year | Initial pension | Death rate |
|---|---|---|---|
| 001 | 10 | 12,613 | 2.3% |
| 002 | 7 | 13,404 | 3.1% |
| 003 | 5 | 26,536 | 3.7% |
| 004 | 2 | 23,126 | 4.5% |
| 005 | 13 | 15,797 | 1.5% |
| ... | ... | ... | ... |
| 997 | 0 | 12,455 | 5.0% |
| 998 | 13 | 3,562 | 1.5% |
| 999 | 5 | 29,870 | 3.7% |
| 1000 | 8 | 6,188 | 2.9% |

| | |
|---|---|
| Indexation pre-retirement | 4% |
| Indexation post-retirement | RPI |

Segments
0 TO 1000
1000 TO 2000
2000 TO 3000
3000 TO 4000
4000 TO 5000
5000 TO 6000
6000 TO 7000
7000 TO 8000
8000 TO 9000
9000 TO 10000
10000 TO 11000
11000 TO 12000
12000 TO 13000
13000 TO 14000
14000 TO 15000
15000 TO 16000
16000 TO 17000
17000 TO 18000
18000 TO 19000
19000 TO 20000
...

Cumulative mortality expectation

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 2.3% | 4.7% | 7.0% | 9.3% | 11.7% | 14.0% | 16.3% | 18.7% | 21.0% | 23.3% | 25.7% | 28.0% | 30.3% |
| 2 | 3.1% | 6.3% | 9.4% | 12.5% | 15.7% | 18.8% | 21.9% | 25.1% | 28.2% | 31.3% | 34.5% | 37.6% | 40.7% |
| 3 | 3.7% | 7.3% | 11.0% | 14.7% | 18.3% | 22.0% | 25.7% | 29.3% | 33.0% | 36.7% | 40.3% | 44.0% | 47.7% |
| 4 | 4.5% | 8.9% | 13.4% | 17.9% | 22.3% | 26.8% | 31.3% | 35.7% | 40.2% | 44.7% | 49.1% | 53.6% | 58.1% |
| 5 | 1.5% | 3.1% | 4.6% | 6.1% | 7.7% | 9.2% | 10.7% | 12.3% | 13.8% | 15.3% | 16.9% | 18.4% | 19.9% |
| ... | | | | | | | | | | | | | |
| 997 | 5.0% | 10.0% | 15.0% | 20.0% | 25.0% | 30.0% | 35.0% | 40.0% | 45.0% | 50.0% | 60.0% | 60.0% | 65.0% |
| 998 | 1.5% | 3.1% | 4.6% | 6.1% | 7.7% | 9.2% | 10.7% | 12.3% | 13.8% | 15.3% | 16.9% | 18.4% | 19.9% |
| 999 | 3.7% | 7.3% | 11.0% | 14.7% | 18.3% | 22.0% | 25.7% | 29.3% | 33.0% | 36.7% | 40.3% | 44.0% | 47.7% |
| 1000 | 2.9% | 5.7% | 8.6% | 11.5% | 14.3% | 17.2% | 20.1% | 22.9% | 25.8% | 28.7% | 31.5% | 34.4% | 37.3% |
| Total £K | 3.2% | 6% | 10% | 13% | 16% | 19% | 22% | 26% | 29% | 32% | 35% | 38% | 41% |

This is the probability that a member will die before a given date (as at time zero)

Expected cashflow

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | - | - | - | - | - | - | - | - | - | 14,314 | 14,295 | 14,261 | 14,213 |
| 2 | - | - | - | - | - | - | 13,770 | 13,614 | 13,436 | 13,235 | 13,010 | 12,760 | 12,482 |
| 3 | - | 22,778 | 22,311 | 21,795 | 26,366 | 25,938 | 25,460 | 24,930 | 24,346 | 23,704 | 23,001 | 22,235 | 21,403 |
| 4 | - | 11,892 | 11,568 | 11,214 | 21,228 | 20,607 | 19,930 | 19,194 | 18,396 | 17,533 | 16,601 | 15,597 | 14,519 |
| 5 | - | - | - | - | - | - | - | - | - | - | - | - | 21,060 |
| ... | | | | | | | | | | | | | |
| 997 | 12,187 | - | - | - | 10,829 | 10,410 | 9,956 | 9,466 | 8,938 | 8,369 | 7,758 | 7,103 | 6,402 |
| 998 | - | - | - | - | - | - | - | - | - | - | - | - | 4,749 |
| 999 | - | - | - | - | 29,678 | 29,196 | 28,659 | 28,062 | 27,404 | 26,682 | 25,891 | 25,029 | 24,092 |
| 1000 | - | - | - | - | - | - | - | 6,526 | 6,472 | 6,409 | 6,336 | 6,252 | 6,159 |
| Total £K | 2,021 | 3,053 | 4,094 | 5,117 | 6,658 | 6,664 | 7,974 | 9,311 | 10,321 | 11,675 | 12,555 | 13,063 | 14,798 |

Multiplying nominal cash flow by the probability that the member is still alive gives us expected cash flows...

... and these projected cash flows will be the issuer's scheduled annual payment obligations on its defeasance securities

Figure 8

Projected pension values as at time zero

| RPI value | 0 | 3% 1 | 4% 2 | 4% 3 | 4% 4 | 4% 5 | 4% 6 | 4% 7 | 4% 8 | 4% 9 | 4% 10 | 4% 11 | 4% 12 | 4% 13 |
|---|---|---|---|---|---|---|---|---|---|---|---|---|---|---|
| Pension value | | | | | | | | | | | | | | |
| 1 | 12,613 | 13,118 | 13,642 | 14,188 | 14,756 | 15,346 | 15,960 | 16,598 | 17,262 | 17,952 | 18,617 | 19,417 | 20,194 | 21,002 |
| 2 | 13,404 | 13,940 | 14,498 | 15,078 | 15,681 | 16,308 | 16,960 | 14,111 | 14,675 | 15,262 | 15,873 | 16,508 | 17,168 | 17,855 |
| 3 | 26,536 | 27,597 | 28,701 | 29,849 | 31,043 | 32,285 | 33,576 | 34,919 | 36,316 | 37,769 | 39,279 | 40,850 | 42,484 | 44,184 |
| 4 | 23,126 | 24,051 | 25,013 | 26,013 | 27,054 | 28,136 | 29,261 | 30,432 | 31,649 | 32,915 | 34,232 | 35,601 | 37,025 | 38,506 |
| 5 | 15,797 | 16,429 | 17,086 | 17,770 | 18,481 | 19,220 | 19,989 | 20,788 | 21,620 | 22,484 | 23,384 | 24,319 | 25,292 | 26,304 |
| ... | | | | | | | | | | | | | | |
| 997 | 12,455 | 12,828 | 13,341 | 13,875 | 14,430 | 15,007 | 15,608 | 16,232 | 16,881 | 17,556 | 18,259 | 18,989 | 19,749 | 20,539 |
| 998 | 3,562 | 3,705 | 3,853 | 4,007 | 4,167 | 4,334 | 4,507 | 4,688 | 4,875 | 5,070 | 5,273 | 5,484 | 5,703 | 5,931 |
| 999 | 29,870 | 31,064 | 32,307 | 33,599 | 34,943 | 36,341 | 37,795 | 39,306 | 40,879 | 42,514 | 44,214 | 45,983 | 47,822 | 49,735 |
| 1000 | 6,188 | 6,435 | 6,693 | 6,960 | 7,239 | 7,528 | 7,829 | 8,143 | 8,468 | 8,807 | 9,159 | 9,526 | 9,907 | 10,303 |

First, RPI turns out to have been 4% not 3%

Second, member 002 commutes 20% of his pension. This leads to a 20% drop in his pension entitlement (relative to what it would have been)...

Nominal Cashflow

| | 1 | 2 | 3 | 4 | 5 | 6 | 7 | 8 | 9 | 10 | 11 | 12 | 13 | Segment in year 10 | Segment Number |
|---|---|---|---|---|---|---|---|---|---|---|---|---|---|---|---|
| 1 | - | - | - | - | - | - | 47,977 | - | - | 18,671 | 19,417 | 20,194 | 21,002 | 18000 TO 19000 | 18 |
| 2 | - | - | - | - | 32,285 | 33,576 | 34,919 | 14,675 | 15,262 | 15,873 | 16,508 | 17,168 | 17,855 | 15000 TO 16000 | 15 |
| 3 | - | 25,013 | 26,013 | 27,054 | 28,136 | 29,261 | 30,432 | 36,316 | 37,769 | 39,279 | 40,850 | 42,484 | 44,184 | 39000 TO 40000 | 39 |
| 4 | - | - | - | - | - | - | - | 31,649 | 32,915 | 34,232 | 35,601 | 37,025 | 38,506 | 34000 TO 35000 | 34 |
| 5 | - | - | - | - | - | - | - | - | - | - | - | - | 26,304 | 0 TO 1000 | 0 |
| ... | | | | | | | | | | | | | | | |
| 997 | 12,828 | 13,341 | 13,875 | 14,430 | 15,007 | 15,608 | 16,232 | 16,881 | 17,556 | 18,259 | 18,989 | 19,749 | 20,539 | 18000 TO 19000 | 18 |
| 998 | - | - | - | - | - | - | - | - | - | - | - | - | 5,931 | 0 TO 1000 | 0 |
| 999 | - | - | - | - | 36,341 | 37,795 | 39,306 | 40,879 | 42,514 | 44,214 | 45,983 | 47,822 | 49,735 | 44000 TO 45000 | 44 |
| 1000 | - | - | - | 6,316 | 8,621 | 9,186 | 11,776 | 8,468 | 8,807 | 9,159 | 9,526 | 9,907 | 10,303 | 9000 TO 10000 | 9 |
| Total £K | 2,123 | 3,390 | 4,798 | 6,316 | 8,621 | 9,186 | 11,776 | 13,918 | 16,127 | 18,911 | 21,213 | 23,144 | 26,695 | | |

... but a spike in his cash flow due to the lump sum payout

All 1,000 scheme members are put into Year 10 segments based on their pension entitlement regardless of whether they are still alive

Figure 9

| Segment number | Segment | Number of people in Segment |
|---|---|---|
| 0 | 0 TO 1000 | 198 |
| 1 | 1000 TO 2000 | 3 |
| 2 | 2000 TO 3000 | 25 |
| 3 | 3000 TO 4000 | 24 |
| 4 | 4000 TO 5000 | 27 |
| 5 | 5000 TO 6000 | 41 |
| 6 | 6000 TO 7000 | 7 |
| 7 | 7000 TO 8000 | 12 |
| 8 | 8000 TO 9000 | 40 |
| 9 | 9000 TO 10000 | 14 |
| 10 | 10000 TO 11000 | 12 |
| 11 | 11000 TO 12000 | 18 |
| 12 | 12000 TO 13000 | 34 |
| 13 | 13000 TO 14000 | 24 |
| 14 | 14000 TO 15000 | 19 |
| 15 | 15000 TO 16000 | 19 |
| 16 | 16000 TO 17000 | 36 |
| 17 | 17000 TO 18000 | 13 |
| 18 | 18000 TO 19000 | 28 |
| 19 | 19000 TO 20000 | 12 |
| 20 | 20000 TO 21000 | 12 |
| 21 | 21000 TO 22000 | 13 |
| ... | ... | ... |
| | TOTAL | 1,000 |

All the deferred members are in this segment...

... while the retired members are in these segments according to their pension entitlement in year 10

Figure 10

| Segment Number | Number of members | Band | Revised nominal cash flows |
|---|---|---|---|
| 0 | 198 | 0 TO 1000 | 0 |
| 1 | 3 | 1000 TO 2000 | 3,932 |
| 2 | 25 | 2000 TO 3000 | 67,466 |
| 3 | 24 | 3000 TO 4000 | 91,058 |
| 4 | 27 | 4000 TO 5000 | 116,162 |
| 5 | 41 | 5000 TO 6000 | 220,508 |
| 6 | 7 | 6000 TO 7000 | 45,268 |
| ….. | ….. | | ….. |
| Total £K | 1,000 | | £18,911 |

Figure 11

| Segment Number | Number of members | Mortality experience (cumulative actual) | Average mortality rate | Average survival rate |
|---|---|---|---|---|
| 0 | 198 | 38 | 19.1% | 80.9% |
| 1 | 3 | 0 | 0.0% | 100.0% |
| 2 | 25 | 8 | 32.0% | 68.0% |
| 3 | 24 | 8 | 33.3% | 66.7% |
| 4 | 27 | 8 | 29.6% | 70.4% |
| 5 | 41 | 10 | 24.4% | 75.6% |
| 6 | 7 | 2 | 28.6% | 71.4% |
| ….. | | | | |
| Total | 1,000 | | | |

Figure 12

| Segment Number | Revised nominal cash flows | Average survival rate | Indexed Cash Flow |
|---|---|---|---|
| 0 | 0 | 80.9% | 0 |
| 1 | 3,932 | 100.0% | 3,932 |
| 2 | 67,466 | 68.0% | 45,877 |
| 3 | 91,058 | 66.7% | 60,736 |
| 4 | 116,162 | 70.4% | 81,778 |
| 5 | 220,508 | 75.6% | 166,704 |
| 6 | 45,268 | 71.4% | 32,321 |
| ..... | ..... | | ..... |
| Total £K | £18,911 | | £11,900 |

Figure 13

Projected cash flows  11,675
Indexed cash flows  (11,900)
Rate re-set receivable/(payable)  (225)

Actual mortality experience

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 1 | 0% | 0% | 0% | 0% | 0% | 0% | 0% | 0% | 0% | 0% | 0% | 0% | 0% | 0% |
| 2 | 0% | 0% | 0% | 0% | 0% | 0% | 0% | 0% | 0% | 0% | 100% | 100% | 100% | 100% |
| 3 | 0% | 0% | 0% | 0% | 0% | 0% | 0% | 0% | 0% | 0% | 0% | 0% | 0% | 0% |
| 4 | 0% | 0% | 0% | 0% | 0% | 0% | 0% | 0% | 0% | 0% | 0% | 0% | 0% | 0% |
| 5 | 0% | 0% | 0% | 0% | 0% | 0% | 0% | 0% | 0% | 0% | 0% | 0% | 0% | 0% |
| ... | ... | ... | ... | ... | ... | ... | ... | ... | ... | ... | ... | ... | ... | ... |
| 997 | 0% | 0% | 0% | 0% | 0% | 0% | 0% | 0% | 0% | 0% | 0% | 0% | 0% | 0% |
| 998 | 0% | 0% | 0% | 0% | 0% | 0% | 0% | 0% | 0% | 0% | 0% | 0% | 0% | 0% |
| 999 | 0% | 0% | 0% | 0% | 0% | 0% | 0% | 0% | 0% | 0% | 100% | 100% | 100% | 100% |
| 1000 | 0% | 0% | 0% | 0% | 0% | 0% | 0% | 0% | 0% | 0% | 0% | 0% | 0% | 0% |
| Total £K | 0% | 3% | 5% | 8% | 13% | 15% | 15% | 19% | 19% | 24% | 28% | 32% | 33% | 38% |

Cashflow required by trustees

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | - | - | - | - | - | - | - | - | - | 18,671 | 19,417 | 20,194 | 21,002 |
| 2 | - | - | - | - | - | - | 47,977 | 14,675 | - | - | - | - | - |
| 3 | - | 25,013 | 26,013 | 27,054 | - | 33,576 | 34,919 | 36,316 | 37,769 | 39,279 | 40,850 | 42,484 | 44,184 |
| 4 | - | 13,341 | - | - | 32,285 | 29,261 | 30,432 | 31,649 | 32,915 | 34,232 | 35,601 | 37,025 | 38,506 |
| 5 | - | - | - | - | 28,136 | - | - | - | - | - | - | - | 26,304 |
| ... | ... | ... | ... | ... | ... | ... | ... | ... | ... | ... | ... | ... | ... |
| 997 | 12,828 | - | 13,875 | 14,430 | 15,007 | 15,608 | 16,232 | 16,881 | 17,556 | 18,259 | 18,989 | 19,749 | 20,539 |
| 998 | - | - | - | - | - | - | - | - | - | - | - | - | 5,931 |
| 999 | - | - | - | - | 36,341 | 37,795 | 39,306 | 40,879 | 42,514 | 44,214 | - | - | - |
| 1000 | - | - | - | - | - | - | - | 8,468 | 8,807 | 9,159 | 9,526 | 9,907 | 10,303 |
| Total £K | 2,123 | 3390 | 4,036 | 4,866 | 6,087 | 6,552 | 7,699 | 9,266 | 10,294 | 11,889 | 13,083 | 14,408 | 15,934 |

| | |
|---|---|
| 0 TO 1000 | - |
| 1000 TO 2000 | 3,260 |
| 2000 TO 3000 | 47,497 |
| 3000 TO 4000 | 59,221 |
| 4000 TO 5000 | 81,002 |
| 5000 TO 6000 | 165,452 |
| 6000 TO 7000 | 32,317 |
| Total £K | 11,889 |

| Segment Number | Indexed Cash Flows | Pension Cash Flows | Delta |
|---|---|---|---|
| 0 | 0 | 0 | 0 |
| 1 | 3,932 | 3,932 | 0 |
| 2 | 45,877 | 47,497 | (1,620) |
| 3 | 60,736 | 59,221 | 1,515 |
| 4 | 81,778 | 81,002 | 776 |
| 5 | 166,704 | 165,452 | 1,252 |
| 6 | 32,321 | 32,317 | 4 |
| ..... | ..... | ..... | |
| Total £K | £11,900 | £11,889 | £11 |
| Basis risk | | | 0.093% |

Figure 16

PENSION FUND SYSTEMS

CROSS REFERENCE TO RELATED APPLICATIONS

The present patent application claims priority under 35 U.S.C. §120 to U.S. patent application Ser. No. 12/117,306, filed on May 8, 2008, and to U.S. patent application Ser. No. 12/212,133, filed on Sep. 17, 2008, the entire contents of both of which are herein incorporated by reference. The present patent application also claims priority to U.S. patent application Ser. Nos. 12/612,274, 12/612,291, and 12/612,299 each of which was filed on Nov. 4, 2009, and each of which is entirely incorporated herein by reference.

The present patent application also claims priority under 35 U.S.C. §119(a)-(d) to United Kingdom patent application serial nos. 0709036.8, filed on May 10, 2007; 0716979.0, filed on Aug. 31, 2007; and 0721690.6, filed on Nov. 5, 2007, the entire contents of each of which are herein incorporated by reference.

FIELD OF THE INVENTION

The present invention relates to the development of a methodology and system for securitizing pension liabilities, enabling the introduction of debt capital to achieve risk transfer from the pensions and insurance industries. The invention includes the development of a pension risk management system. Various aspects of the invention are also of relevance in other environments.

Some aspects of the invention are concerned particularly with immunization of risk in the pension and insurance sector using, for example, securities and derivative products to transfer the risk associated with pension liabilities over to the capital markets. Aspects of the invention also relate to systems which support the securitization of pension liabilities, report on the securitization of investments and ensure compliance of the securitization scheme with rating agency requirements. Further aspects of the invention provide reporting tools for corporate sponsors and pension trustees to help ensure their compliance with regulatory reporting requirements. Amongst other things, aspects of the invention provide methods for defeasing risk associated with pension liabilities, systems for supporting such methods, and related financial instruments.

BACKGROUND OF THE INVENTION

Demographics throughout the world are pointing to a global pensions crisis both in the public and private sectors. Mortality improvements, especially at older ages, make it ever more likely that individuals with inadequate pension arrangements will end their lives with insufficient income and, in some cases, in poverty.

For some private corporations operating defined benefit pensions schemes in which the amount of pension is determined by, for example, the length of service and the salary of an employee, the total size of the obligations on a pension scheme sponsored by the employer has grown due to improvements in mortality. In many cases this has been to an extent that it has become a significant burden on the corporation's finances and operations and many schemes are operating at a significant deficit.

Concerns to ensure that companies are properly equipped to meet their pension obligations have seen the introduction over about the last five years of a combination of both accounting and regulatory reforms, which have in themselves added to the pensions burden on corporate sponsors of defined benefit pension schemes.

Recently adopted international and domestic accounting standards, such as FRS 17, IAS 19 and FAS 87, now require many companies to reflect their pensions deficits on their balance sheets as obligations to third parties. Under these accounting standards, pensions liabilities are required to be valued by discounting obligations to pensioners on the basis of long term bond yields, while the assets supporting the scheme, which typically comprise a variety of asset classes in addition to bonds, such as equities and property, are simply recorded at market value. The result is that there is usually an imbalance between the valuation of the assets and liabilities of a scheme, which can lead to unwelcome volatility in the size of the surplus/deficit. This surplus/deficit volatility will ultimately be reflected in the company's balance sheet, with the expectation that accounting standards will eventually require this volatility to be included in the profit and loss statement with a potentially significant impact on earnings.

Further, to date, the development of systems in the pensions sector has been driven by the needs of actuaries and pension consultants, with a focus on the management and reporting requirements of insurance companies and pension trustees. At the pensions scheme level, the standards of record keeping and risk management are generally not of a high standard. At the insurance level, the focus has tended to be on cash flow projection and pricing. By capital markets standards, the world of pension risk management and reporting has mostly been unsophisticated.

An illustration of the problem is that despite the introduction of the accounting standard FRS 17, which requires companies to value their pensions liability on the basis of long term corporate bond yields, it remains the custom to only revalue the liability every three years. Further obfuscation of the true extent of corporate pensions liability is provided by the fact that sponsors have not been required to disclose their mortality assumptions. This means that despite the move by the accounting profession to make companies accurately reflect their pension liabilities in their financial accounts, the reality is that the measurement has only updated at intervals such as every three years and is then based on discretionary mortality criteria.

Further, recent legislation in some jurisdictions such as the United States and the United Kingdom requires corporate sponsors to demonstrate that where a deficit exists, they will be able to fully fund the deficit within a fixed period. For example, under current legislation in those territories the periods have been set at seven and ten years respectively. In view of this, in the UK a Pensions Regulator has been established with powers to intervene in corporate affairs, including the ability to divert dividends or other distributions away from shareholders to the fund the pension deficit.

Additionally, through quasi government agencies such as the Pension Benefit Guaranty Corporation in the USA and the Pension Protection Fund in the UK governments are being forced to become the underwriters of last resort of risk of sponsor failure. As a result, in turn these agencies are now imposing annual levies on the corporate sponsors.

In view of the inadequacies in the frequency and quality of current pensions reporting, it is difficult for regulatory bodies and governmental protection funds to gather accurate or timely information to enable a meaningful assessment of the ultimate exposure of pension schemes.

Pension fund problems could clearly cause underperformance on the part of sponsor companies, which could create issues for existing shareholders and potential investors.

Against this increasingly burdensome background, companies are realizing that the promises made to their pensioners are exposing their businesses to additional and sometimes highly volatile risks, such as inflation, exposure to the interest, currency, credit, equity and property markets, as well as longevity.

In view of the burden of these risks and exposures on the corporate sponsors of defined benefit pension schemes, the management of such companies may choose to close existing schemes to new members, or to reduce benefits and increase the retirement age, or to migrate away from defined benefit pension schemes towards defined contribution schemes which may not be an attractive alternative for its employees. This unnecessarily limits the corporate sponsor as to what is in the best interests of its particular employees and business imperatives. However, none of these strategies in themselves will deal with the fundamental problem of the exposure of the corporate sponsor to the volatility of the deficit, or indeed a surplus which has been the case at various times. Closing the scheme is an inflexible and final solution which does not permit the sponsor to claw back a growing surplus, should market conditions become favorable after closure.

Another option is to abandon the sponsorship of the corporate pension schemes altogether by transferring the scheme, for example, to an independently managed collector fund. Such an approach removes the burden of the deficit/surplus volatility, but is strongly discouraged by the pensions regulator.

Current options taken by companies often have human resource implications, with dissatisfaction amongst the workforce and in some cases industrial action as a way of expressing objections to proposed changes to a company's pension arrangements.

Currently, one source of underwriting capacity for the risk of longevity is the insurance sector, through the issuance of bulk annuity policies by a multi-line insurer, or a new breed monoline pension "buy-out" company and in turn the re-insurance market. This bulk annuity provides a full legal and economic transfer of the pension scheme's risk by transferring to the insurer all risks and future liabilities of a pension scheme in return for a priced premium and winding-up the scheme. While offering a partial solution, the capacity of the global insurance market to assume the risks associated with longevity is extremely limited in scale when set against the size of the global pensions market, making this an unscaleable solution. There are currently severe limits on the capacity of the insurance sector to supplement its existing capacity due to the high cost of capital for participating insurers. The high cost of capital arises because participating insurers are required to maintain high levels of regulatory capital largely in the form of expensive equity capital. This makes a buy-out of a pension scheme and replacement with a bulk annuity a very expensive and inefficient solution.

A further constraint of the annuity market is that it offers a product best suited to defeasance and closure of pension funds, rather than a source of risk transfer for existing ongoing pension schemes. The reason for this is that pension schemes are not allowed to give preference to specific scheme members and so bulk annuity is primarily used to defease the obligations of an entire scheme.

As an alternative to a full buy-out of a pension scheme, some insurance companies are offering to take on schemes' liabilities in a phased approach as a partial defeasance of the longevity and other risks. The aim is that benefits are insured gradually over time allowing the cost to be spread and the scheme risks to be managed towards buyout. Some market entrants are using this to target small to medium sized companies and schemes that may not have the available capital for a full buyout.

Another option available to trustees and sponsors of defined benefit corporate pension schemes is a range of products called pensions risk insurance. These insure certain risk experience within predetermined bands over a stated period of time, which may for example be the funding recovery period for the pension scheme. For example, this may be to underwrite mortality and investment experience up to a stated level over the recovery period.

Ultimately all of these products are categorized as an investment in an insurance contract. While through a variety of derivatives of the basic bulk annuity product, it is technically possible for a pension scheme to 'invest' in insurance products as a general asset of the scheme, rather than member specific policies, there are significant legal and security implications in doing so, as an insurance policy, unlike a bond, is not an unconditional promise to pay, but rather a contingent contract, subject to there being no available defenses. For this reason, insurance derived products, such as bulk annuity are not considered suitable investments by many pension trustees and their advisors.

The present inventors have appreciated that investment in bonds, or interest rate and inflation derivatives can offer a solution to hedge against the exposure of a pension scheme to equity risk, interest rate risk and inflation risk, and would immunize the scheme's liabilities from ballooning as a result of further falls in bond yields. However, it has also been appreciated that in many cases this solution would be incomplete as the pension scheme would remain exposed to longevity risk, i.e. the risk that a scheme's pensioners will live much longer than anticipated.

A preferred approach would be to hedge the pension schemes against all of their underlying exposures, including longevity, in order to immunize them against risk. This longevity risk has thus far been unmanageable and the present inventors have developed systems for transferring this longevity risk, as well as the other risk exposures and volatilities, away from corporate sponsors and managers of pension liabilities.

The possibility of creating financial instruments which can hedge the specific economic risk of increasing longevity has been proposed previously. There have been proposals to develop and introduce products in the form of longevity bonds and longevity derivatives which purport to immunize against longevity risk. Mortality bonds, hedging the inversely correlated mortality risk borne by insurers in their life insurance business, i.e. early death, have also been issued.

A longevity bond was announced in November 2004 by BNP Paribas on behalf of the European Investment Bank (EIB). This was proposed as a solution for financial institutions looking to hedge their long-term longevity risks. The bond issue was for £540 million, and was primarily aimed at UK pension funds. The bond was due to pay a coupon that would be proportional to the number of survivors in the cohort of individuals turning sixty-five in the year that the bond was issued, so that the coupon in each successive year would be proportional to the number in the cohort that survived each year. Since this payoff would in part match the liability of a pension, the bonds would create an effective hedge against longevity risk.

However, a number of problems with the EIB longevity bond meant that it did not generate sufficient interest to be launched, and was withdrawn for potential redesign.

The present inventors have appreciated that a significant inadequacy of the EIB bond or any similar proposals for use in the pensions sector, would have been that the mortality of a reference population was used to determine the payment of the bond coupon. This means that a basis risk faced by any individual pension plan, namely the mortality circumstances experienced by that particular pension plan, would not be covered, thus not making the bond an effective hedge against an individual pension scheme's longevity risk.

The present inventors have thus appreciated if longevity bonds or derivatives are to be of use in the pensions sector, they will have to provide a much more complete hedge for the mortality risks actually borne by each individual pension scheme, or at the very least need to be indexed to the mortality experiences of a much greater range of cohorts.

Longevity indices have been proposed, for example by Credit Suisse in 2006 by BNP Paribas and most recently by JP Morgan, which introduced an index under the brand name Lifemetrics, with an aim of creating benchmark values for underlying mortality rates or cumulative survival rates. However, the creation of indices does not move the market any further forward in terms of identifying new capital willing to take on the risk of longevity, and without this capacity a longevity derivatives market is unlikely to take off.

The inventors have identified that a key factor in the growth of the longevity securitization market is the development of longevity bonds and longevity derivatives capable of hedging the entire economic risk of an individual pension scheme (i.e. the element of exposure which is left if an investment or hedging instrument does not exactly mirror the longevity profile of the pension scheme). The inventors have realized that such products would provide buyers and counterparties in the form of individual pension funds and monoline buy-out specialists and multi-line insurers looking to hedge themselves and their own exposure to the longevity risk, with a complete solution to their risk transfer requirements. Also, the capital elements of such products could create sufficient value to generate buying interest from speculative investors for which exposure to longevity products would create an attractive diversification since it is uncorrelated with many of the more traditional asset classes.

In this regard the inventors have developed a capital markets methodology and system for securitizing pension liabilities, enabling the introduction of debt capital to achieve risk transfer from the pensions and insurance industries onto the capital markets. The inventors have also developed a pension risk management system to operate the methodology, which is the subject of this Continuation-in-Part application, and which includes hardware and software configured to process input data and provide a projection of pension scheme assets and liabilities, and of the risk exposure thereof. This methodology and system were first set out in detail in United States Patent Application Publication No. US-A1-2008/281742, published 13 Nov. 2008, and International Patent Application Publication No. WO2008/139150, published 20 Nov. 2008.

This capital markets methodology enables immunization of risk in the pension and insurance sector using, for example, securities and derivative products to transfer the risk associated with pension liabilities (including longevity risk) for a particular pension scheme membership over to the capital markets. The associated risk management system supports the securitization of pension liabilities, reports on the securitization of investments and ensures compliance of the securitization scheme with rating agency requirements. The risk management system also provides reporting tools for corporate sponsors and pension trustees to help ensure their compliance with regulatory reporting requirements.

This capital markets methodology allows the Trustees of a Pension Scheme to meet its payment obligations over the years whilst reducing the risk of going into deficit.

According to the inventor's methodology, the risk is transferred to a company which analyses the scheme and its members carefully. The company calculates nominal cash flow requirements for periods extending over a number of years. It then calculates the life expectancies of members of the pension scheme, using statistical techniques based on life expectancy data for a general population, and factors specific to the members of the scheme. Once life expectancy data has been calculated, projected actual cash flow requirements are calculated by manipulating the nominal cash flow requirements using the life expectancy data. The company, in return for funds provided by the Trustees of the pension scheme, issues a financial instrument which undertakes to pay sums equal to the projected actual cash flow requirements over the life of the arrangement.

The methodology is able to deal with unexpected changes in factors which result in increases in the cash flow requirements beyond those which have been projected. Reasons for such changes include rises in inflation/the cost of living so that indexed pensions payments increase more than expected, and changes in life expectancy. If people live for longer than estimated originally, then in any particular year, pensions must continue to be paid to more people than originally estimated.

This is achieved by providing a financial instrument by which cash flow requirements will be met despite unexpected changes in such factors by the financial instrument providing increased or decreased sums to match the increased or decreased cash flow requirements, but also protect the issuer of the financial instrument.

The system for recalculating the sums to be paid to the pension scheme to match its cash flows, is as follows. At a re-set point, revised nominal cash flows for each of the original members of the scheme are calculated taking into account the actual experience of the scheme members in all non-mortality factors affecting pension payments, such as commutations, transfers out, etc, whereas the actual mortality experience of the deaths of any pension scheme members in the preceding period are not taken into account in calculating the revised nominal cash flows. That is, if a member has died, the nominal cash flows for that member remain in the calculations. Actual mortality experience of the pension scheme membership is then taken into account by being used in conjunction with the revised nominal cash flows to calculate an adjusted cash flow for that re-set period.

If mortality experience were taken into account at an individual member level, the nominal cash flow for a deceased member would be taken out of the calculation of an adjusted cash flow for that re-set period and for the calculation of an adjusted cash flow in any subsequent re-set periods. This approach can be taken in calculating an adjusted cash flow. Instead, in some embodiments of the inventor's methodology, members are allocated into the relevant one of a number of segments, each segment representing a range of nominal pension cash flow requirements. Within each segment, the revised nominal cash flows for all of the members in that segment are summed, including those for deceased members, and average mortality rate for that segment is also calculated from the cumulative actual mortality experience of that segment. The resultant average mortality rate for each segment is used together with the sum of the revised nominal cash flows for that segment to calculate an adjusted cash flow for that segment. The adjusted segment cash flows are aggregated to give an adjusted cash flow for that re-set period which is paid to the Trustees of the pension scheme.

Of course, any party other than the trustees of the pension scheme can invest in the financial instruments of the inventor's methodology. In particular, any party having an exposure to the pension scheme and the financial risks associated therewith, including longevity risk, may choose to invest in a financial instrument provided according to the inventor's methodology. For example, an insurance company underwriting a pension scheme may choose to invest in such a financial instrument which may transfer any aspect of the risk exposure of the insurance company to the pension scheme on to the capital markets. Also, any party who considers the financial instrument to be mis-priced may choose to invest in a financial instrument according to embodiments of the present invention.

This 'longevity' financial instrument of the inventor's methodology is not limited to cash form including bonds, notes, paper, etc., and can be deployed in the form of a derivatives contract including swaps, options, etc.

The financial instruments can be used to hedge against the longevity risk and longevity basis risk associated with defined benefit pension schemes.

The inventors have thus provided methods and systems of securitizing the liabilities of a pension fund to immunize it against its underlying risk exposures, including longevity and longevity basis risk.

The risk management systems are arranged to manage the assets and liabilities of a defined benefit pension scheme and facilitate risk transfer to the capital markets.

This methodology can provide more accurate indications of the risks of a pension scheme, in which for example at least longevity calculations are based on factors associated with the individual members of the scheme, rather than on estimations based on a sample of the general population.

The inventors have thus developed a suite of capital markets based securities and derivatives and proprietary risk management and reporting systems, which enable multi-faceted risk transfer of longevity and other risks from the pensions and insurance sector to fixed income capital market investors.

These financial instruments can be provided as both indexed and dedicated defeasance products, which are capable of assuming the entire economic risk of a pension scheme—including longevity (including longevity basis risk), inflation, interest rate, credit and equity—by partially or completely replacing the scheme's existing assets with senior secured securities or derivatives, which are designed to match the obligation of the scheme. That is, the defeasance products are priced by analyzing the underlying pension scheme's exposures to longevity risk on a "granular" basis, i.e. on the basis of the pension scheme's members' actual characteristics, thus allowing more accurate pricing than previously.

This enables corporate sponsors of defined benefit pension schemes to immunize their obligations from the underlying exposure to risk, including longevity risk and basis risk associated with longevity.

The risk management system provides an operating platform for the securities and derivatives, and also incorporates a platform for projecting pension scheme assets and liabilities. The securities and the derivative products are capable of being rated by the world's leading debt rating agencies. The senior tranches are preferably be rated highly by an appropriate leading rating agency, for example being rated AAA or Aaa by an independent ratings agency such as Standard & Poor's or Moody's.

To support this rating of the securities and derivative products, the inventors have also provided a ratings method in which the securitization of longevity risk is measured and monitored by the risk management systems to deterministically or stochastically map the actual and projected mortality experience for the pension scheme and allocate risk capital based on a proprietary risk capital model to ensure daily compliance with a set of criteria agreed with at least one rating agency. This permits the securities ratings to be defined, monitored and maintained.

The risk management system further provides pensions reports to regulators, stakeholders, and pension scheme trustees, enabling the holistic reporting of both the investments and the pension's liabilities on a daily marked to market basis. This represents a revolution in terms of the business process compared to existing systems, enabling transparent daily reporting of a pension scheme's assets and liabilities.

SUMMARY OF THE INVENTION

It will be appreciated that there are many different aspects of the present invention, and that in the practical implementations of the invention, one or more aspects may be used together in any operable combination. Some aspects and particularly the systems may be used in environments other than the pensions sector.

The accurate estimation of longevity may be used in a number of scenarios, whether as applied to a group of people such as the members of a pension fund or to an individual—for example to determine the probability of that individual attaining a particular age.

Viewed from one aspect, the invention provides a computer-implemented method of projecting the future cash flows of a pension scheme, comprising: receiving data representative of the members of the pension scheme; receiving data representative of a mortality assumption; calculating, using data processing apparatus, for each pension scheme member, a projection of the future cash flow liabilities of the pension scheme to that member on the basis of the pension scheme member data and by applying the mortality assumption data to the pension scheme member data; and generating, using data processing apparatus, data representative of a projected liability cash flow of the pension scheme to all of its members by aggregating the liabilities to each member.

In accordance with this aspect of the invention, all pension scheme stakeholders can be provided with detailed capital projections of pension scheme liabilities, in a transparent and timely manner, the projections being accurately calculated on a member-by-member basis. This is in contrast to prior art actuarial triennial reporting on pension schemes, which is a relatively opaque and manual process conducted by skilled professionals, resulting only in a single-number valuation of the pension scheme funding level. The invention promptly provides a much more useful breakdown of projected pension scheme liabilities at time points in the future by using data processing apparatus to automatically applying known mortality assumptions to pension scheme member data. Individual member cash flow projections may even be generated and output for user evaluation.

The mortality assumption may be based on a mortality table of a reference population. The mortality assumption may include adjustments made to the mortality table of a reference population based on an analysis of the pension scheme membership.

The analysis of the pension scheme membership may include an analysis of the actual mortality experience of the pension scheme and/or an analysis of the socio-economic characteristics of the pension scheme membership. The analysis of the pension scheme membership may be used to adjust, at a pension scheme group level, the mortality rate of the mortality assumptions for all pension scheme members and/or the future improvements in mortality of the mortality assumptions for all pension scheme members, and/or, at an individual pension scheme member level, the mortality rate of the mortality assumptions for each member.

The method may further comprise: receiving data representative of a user-input adjustment to adjust the mortality assumption; calculating, using data processing apparatus, data representative of an adjusted mortality assumption by applying the user-input adjustment to the received mortality assumption data; and using the adjusted mortality assumption in the step of calculating the projection of the pension scheme member liabilities. The user-input adjustment may comprise an adjustment, at a pension scheme group level, to the mortality rate of the mortality assumptions for all pension scheme members or to the future improvements in mortality of the mortality assumptions for all pension scheme members. The user-input adjustment may comprise adjustments, at an individual pension scheme member level, to the mortality rate of the mortality assumptions for each member. The individual member mortality adjustments for each member may be dependent on the socio-economic characteristics of that member.

The method may further comprise: providing a plurality of possible mortality assumptions, selectable by a user for use in the step of calculating the projection of the pension scheme member liabilities.

The method may further comprise: receiving data representative of an interest rate assumption, an inflation assumption, and/or a discount rate assumption, and applying these assumptions in the calculation of the projected liabilities of the pension scheme to its members. The method may further comprise: receiving data representative of a user-input stress to adjust the mortality assumption, interest rate assumption, inflation assumption, and/or a discount rate assumption; and calculating, using data processing apparatus, what the projected liabilities of the pension scheme would be in the event the stressed assumptions were to occur by applying the user-input stress data to the assumptions data. The method may further comprise: receiving data representative of the pension scheme assets; receiving data representative of a market assumption; calculating, using data processing apparatus, for each asset, a projection of the future cash flows generated by that asset on the basis of the pension scheme asset data and by applying the market assumption data to the pension scheme assets data; and generating data representative of a projected asset cash flow of the pension scheme from all of its assets by aggregating the cash flows from each asset. The method may further comprise: generating data representative of the projected net cash flows of the pension scheme. The method may further comprise: providing an analysis of changes that can be made to the projected asset cash flow to reduce the risk exposure of the pension scheme. The method may further comprise: generating reports of the pension scheme asset and/or liability projections for use in achieving regulatory compliance. The method may further comprise: performing, using data processing apparatus, a stochastic modelling of the future cash flows of the assets and/or liabilities of the pension scheme. The method may further comprise: providing an analysis of the risk exposure of the projected scheme asset and/or liabilities. The method may further comprise: calculating a metric of the risk exposure of the pension scheme on the basis of the projected asset cash flows and/or liability cash flows. The metric calculated may be one of a funding level of the pension scheme, a contributions requirement to ensure the pension scheme is fully funded, a volatility of the funding level of the pension scheme, a change in asset and/or liability cash flows and valuations over a given time or in response to stress testing, a Value at Risk, a Risk Based Capital (RBC) requirement to support the pension scheme, a Risk Adjusted Return on Capital of the assets. Viewed from another aspect, the invention provides a computer configured to be usable to project the future cash flows of a pension scheme, comprising: data processing apparatus; and a data carrier containing instructions which when run on the data processing apparatus, cause the data processing apparatus to be operable to: receive data representative of the members of the pension scheme; receive data representative of a mortality assumption; calculate, for each pension scheme member, a projection of the future cash flow liabilities of the pension scheme to that member on the basis of the pension scheme member data and by applying the mortality assumption data to the pension scheme member data; and generate data representative of a projected liability cash flow of the pension scheme to all of its members by aggregating the liabilities to each member. Viewed from yet another aspect, the invention provides a data carrier containing instructions which when run on a data processing apparatus, cause the data processing apparatus of a computer to be configured as set out above.

BRIEF DESCRIPTION OF THE DRAWINGS

Certain preferred embodiments of aspects of the present invention will now be described by way of example only and with reference to the accompanying drawings, in which:

FIG. 6 is an illustration of the members comprising an exemplary pension scheme to be defeased by a pensions defeasance product in accordance with an embodiment of the invention;

FIG. 7 shows a projection of each exemplary pension scheme member's nominal cash flow;

FIG. 8 shows a prediction each exemplary pension scheme member's expected cash flow, taking account of their probability of death;

FIG. 9 shows the effect on each exemplary pension scheme member's pension value and nominal cash flow at year 10 due to a variation from the expected RPI value and a scheme member commuting a portion of his pension on retirement;

FIG. 10 shows the segmentation of each exemplary pension scheme member's cash flow at year 10;

FIG. 11 shows the allocation of the revised nominal cash flows at year 10 to the segments of the exemplary pension scheme;

FIG. 12 shows the calculation of the average survival rate for each segment at year 10;

FIG. 13 shows the calculation of the year 10 indexed cash flow of the exemplary pension scheme and FIG. 14 shows the calculation of the year 10 rate re-set;

FIG. 15 shows the calculation of what cash flows the trustees of the exemplary pension scheme actually need to pay their members and the splitting the cash flows at year 10 into segments;

FIG. 16 shows the calculation of the basis risk exposure on the 10 year rate re-set of the exemplary pension scheme;

DETAILED DESCRIPTION OF THE INVENTION

Figure 1:
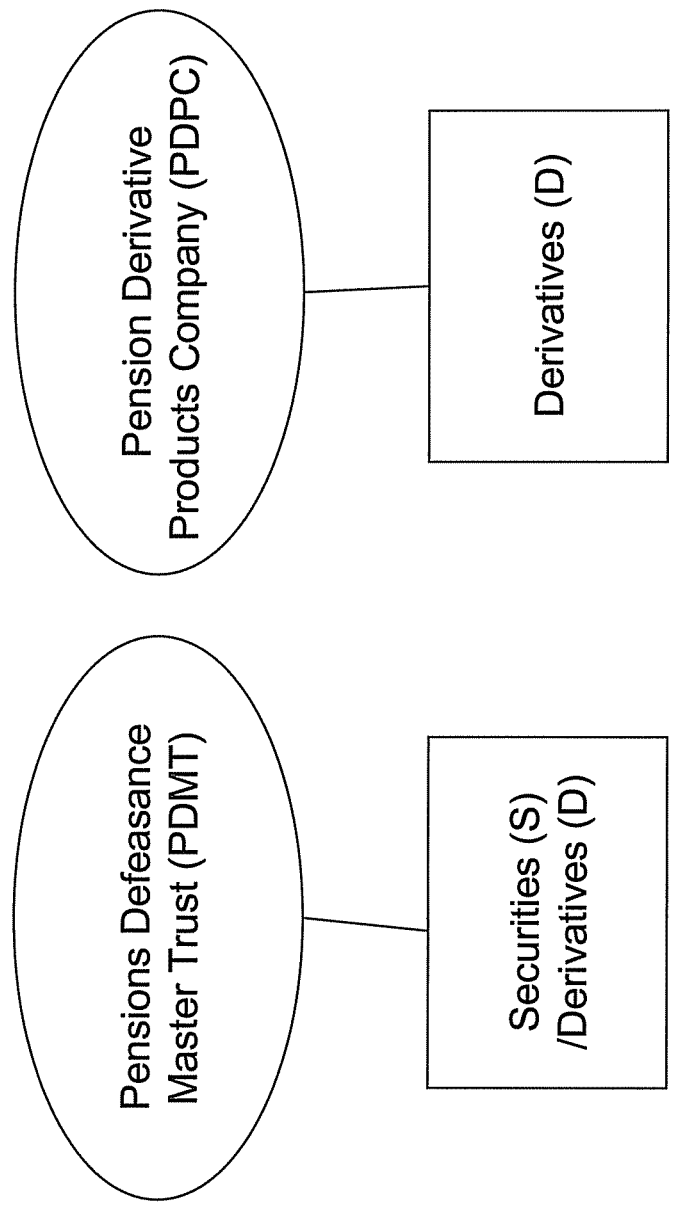
FIG. 1 is a schematic drawing detailing a financial instrument and derivative product and the issuing entities according to one embodiment of the present invention.

As shown in FIG. 1, the pensions defeasance products will be issued in both securities (1) and derivatives (2) form. For this purpose, both may be issued from a single entity, or two distinct issuing entities may exist. The defeasance products will be issued as cash securities (S) under the a Pensions Defeasance Master Trust, a cell company or a master issuing company and silo structure (PDMT) and in derivative form (D) from the PDMT, or a separate Pension Derivative Products Company (PDPC).

A Master Trust, cell company or master company and silo (MT) are structures often used in the asset backed securities market e.g. credit card issuers. The PDMT may comprise known capital markets structures.

At least one Pensions Sub-Trust, cell or silo (PST) is provided beneath the PDMT. The capital structure of the PST's combines threads of technology of known capital markets structures.

Similarly, the PDPC uses technology found in Derivative Products Companies (DPC).

In each case technology in accordance with the invention is used in order to facilitate the assumption of risks peculiar to the pensions market, such as longevity and in so doing creates an entirely new solution to pensions risk transfer, together with new asset classes in the capital markets and as such represents a new business application.

Figure 4:
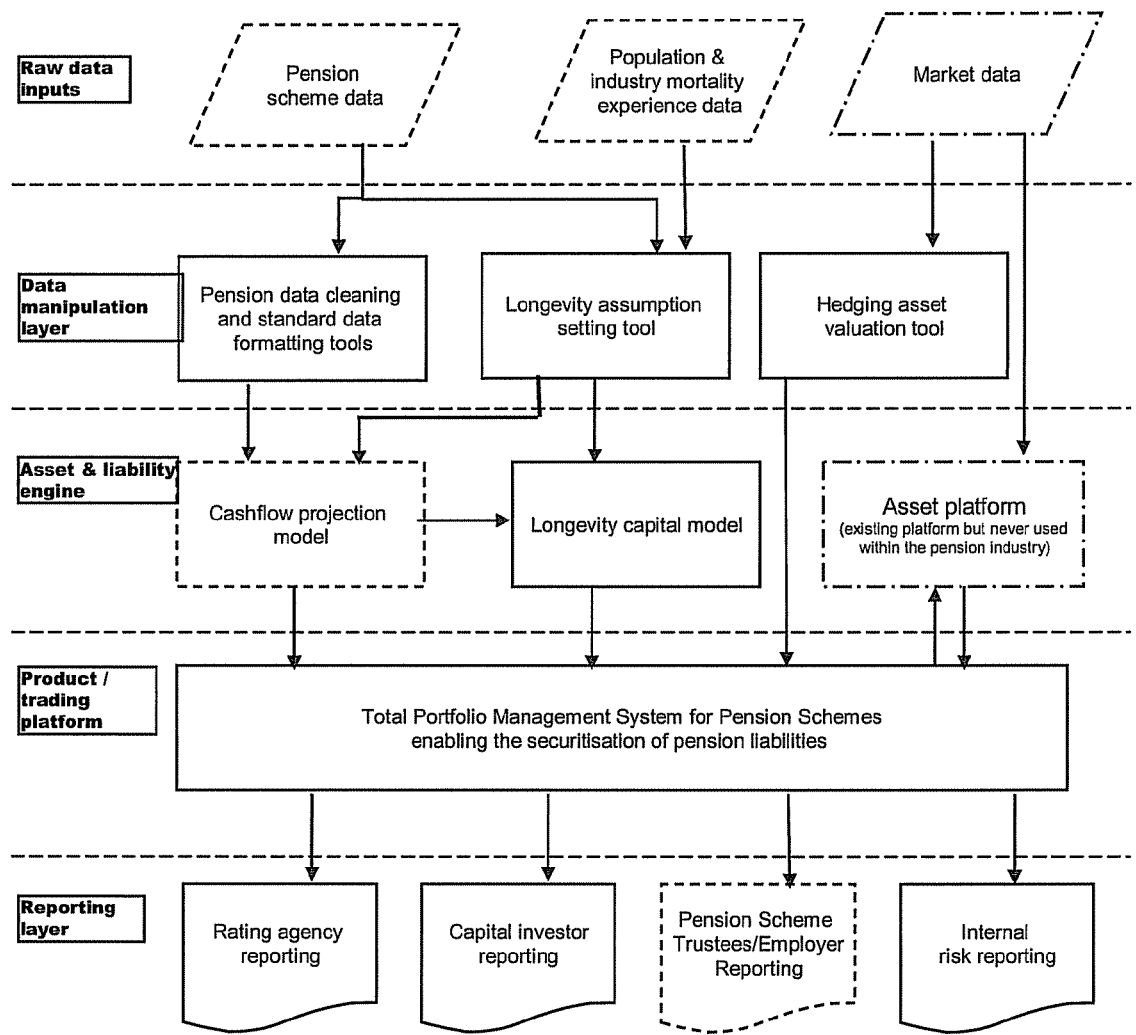
FIG. 4 shows a flow chart of data transfer and feed-through for the various modules comprising the pensions securities trading and reporting system (risk management system) of the present invention.
Figure 5:
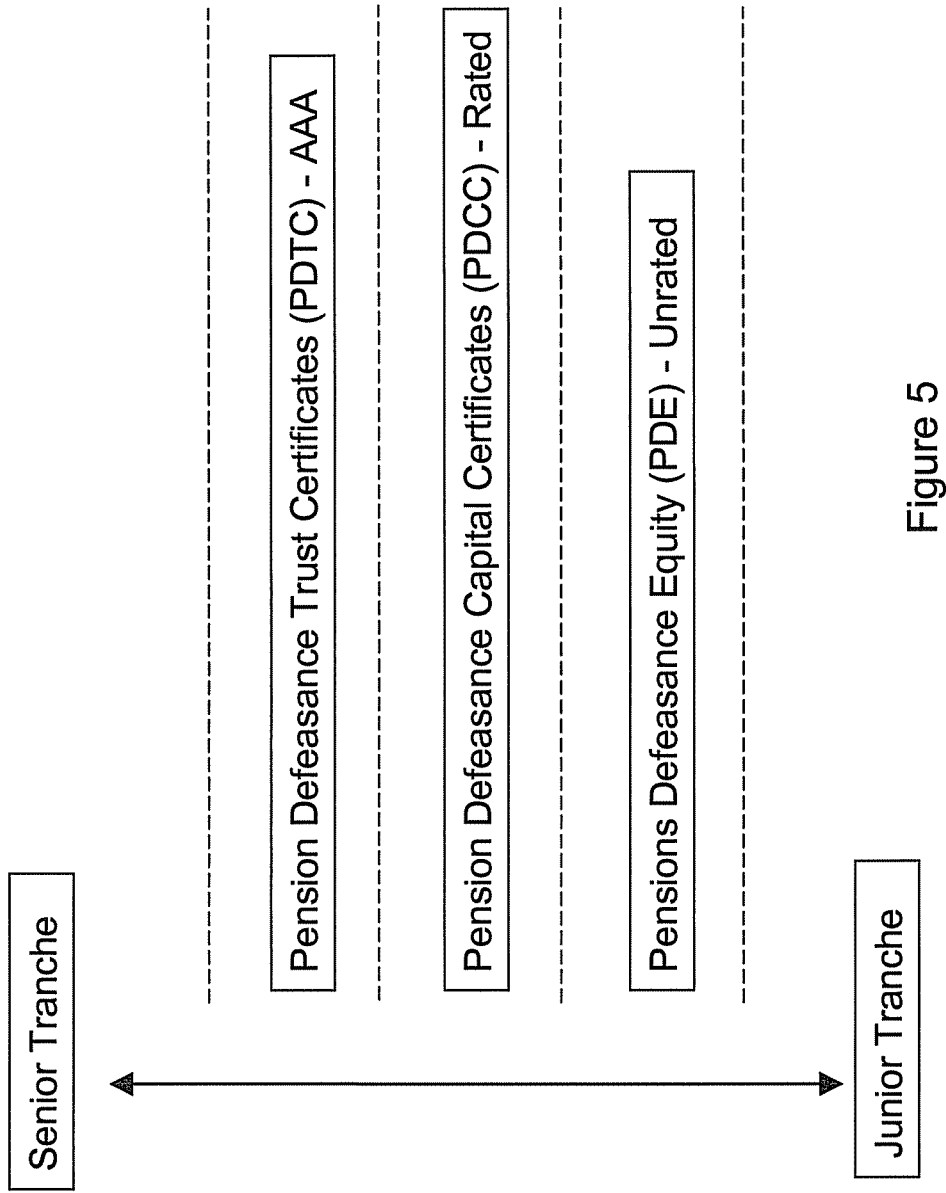
FIG. 5 is a schematic drawing showing the hierarchy of tranches of pensions defeasance products used in the method of securitizing a pension scheme according to one embodiment of the present invention.

Similarly, the risk management system, shown in FIG. 4 is based on a combination of existing capital markets and pensions market systems technology, which has been integrated into an entirely proprietary reporting framework. The risk management system provides a system capability which did not previously exist and which allows securitization technology to be used to achieve comprehensive defeasance and risk transfer from the pensions market to the debt capital markets.

Figure 2:
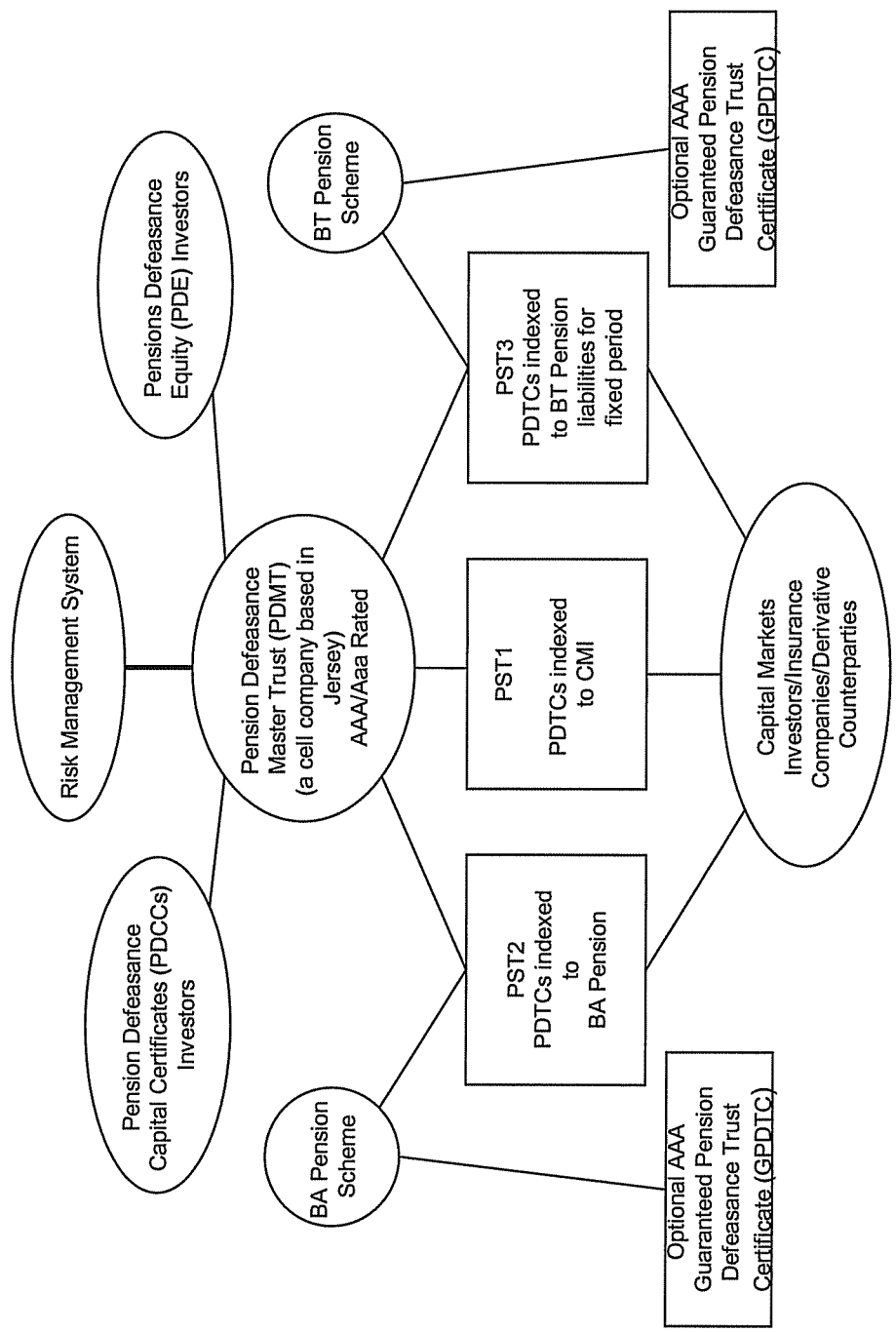
FIG. 2 is a schematic drawing showing the interaction between the parties involved in the securitization of a pension scheme according to one embodiment of the present invention.

Referring now to FIG. 2, a schematic of the entities involved in the issue and trading of pension defeasance securities will now be described. Securities will be issued under a PDMT, which will be—for example—a AAA/Aaa rated program, rated by leading rating agencies, such as Standard & Poor's, Fitch and Moody's rating agencies. The PDMT will be established as a special purpose entity based in, for example, Jersey or another appropriate location.

Beneath the PDMT, will sit a family of PST's, which will issue financial instruments according to embodiments of the invention in the form of Pension Defeasance Trust Certificates (PDTCs), bonds, notes or other securities (aka. Pension Defeasance Securities) to investors (such as, pensions schemes, insurance companies and derivative counterparties, such as investment banks) seeking to immunize their exposure to pensions risk.

The PDTC's will be issued under a global issuance program (under which dedicated targeted programs can exist for specific jurisdictions where local securities law requires), which will be listed on at least one major international stock exchange. The certificates will be open to subscription through a group of appointed dealers and will also be open to reverse enquiry from dealers outside the program, under "dealer for the day" arrangements similar to those which typically exist on medium term note programs.

One of the key features of the program is its flexibility to issue specific tranches of PDTC's (where appropriate out of dedicated PST's) which substantially meet the exact risk profile of the investor, so as to ensure complete economic defeasance and therefore complete transfer of risk. This means that the permutation of options available to investors under the program is almost unlimited, providing that the exposures are capable of being hedged, or managed under the criteria agreed with the rating agencies for the preservation of the ratings of the PDMT or PST's senior obligations. The criteria agreed with a ratings agency for the preservation of a rating are be set out in a Risk Management Manual and/or an Operations Manual associated with financial instruments issued under the program in the form of PDTCs, and said financial instruments will be operated in accordance with the Risk Management Manual and/or an Operations Manual such that the ratings agency rating is achieved and maintained.

PDTC's issued under the PDMT will generally carry a stand alone AAA/Aaa rating, thus putting them on a par with the obligations of the highest rated governments and corporate entities and above the credit of many sovereign entities and most banks and insurance companies. However, where required, the facility exists within the program structure to overlay a third party AAA/Aaa guarantee, typically provided by a monoline insurer, or similar entity, thereby adding further to the integrity of the covenant. The resulting instrument will be issued as a Guaranteed Pension Defeasance Trust Certificate (GPDTC).

Each sub-Trust will be dedicated to a specific class of risk. For example, PST1 might issue PDTC's where the payments due to investors are linked to a specific longevity index, such as the Continuous Mortality Index (CMI) or Lifemetrics. Investors in this class of PDTC's would therefore receive payments on their PDTC's which mirrored the performance of the appropriate index. That is, if longevity improves, meaning that people are living longer, the payment flow on the PDTC's will extend accordingly. Investors in such a tranche, might include, for example, pensions schemes looking to partially hedge their liability at a cheaper cost by purchasing a generic rather than bespoke hedging instrument, leaving them to manage the basis risk between the index and the actual performance of their scheme. This type of instrument might be chosen by an insurance company or derivative counterparty such as an investment bank with the capital and technical expertise to manage the resulting basis risk.

PST2 might issue PDTC's indexed to the performance of an individual company's pension scheme (for example, the pension scheme of a major UK company). The performance of this bespoke tranche will therefore mirror the performance of the particular scheme. That is, the cash flows on the PDTC's will reflect improvements in longevity, track inflation if appropriate, and reflect in aggregate all of the events impacting the portfolio of individual pensions of which the scheme comprises (such as spouse and dependant obligations election to take lump sums on retirement, transfers out of the scheme, etc.). The investors in these PDTC's might be, for example, the pension scheme itself to hedge its pension liability, or derivative counterparties, which have exposure to that particular pension scheme. By investing in this product the investor would be immunized from exposure to the relevant pensions scheme and would have no basis risk to manage. This is because there is, a very high degree of correlation between the mortality of the reference population used to determine the cash flows of the PDTC's and the mortality experienced by the particular pensions scheme.

PST3 might issue a tranche of defined term PDTC's, which instead of being linked to a generic index, or to the underlying obligations of a scheme (for example, another major British company) until the death of its last member, would provide a hedge for a scheme's pension liability for a specific period of time. For example, the payments on the PDTC's could be set to reflect the experience of the pensions scheme in terms of meeting all of its payment obligations for a ten year period. The PDTC's obligations might also incorporate the obligation to deliver a lump sum on maturity equal to any deficit (under IAS 19 or whichever is then the appropriate accounting standard) which may exist between the pensions scheme's assets and liabilities on the maturity date. In addition the PDTC's might also include, for good measure, the obligation to cover the cost to the scheme of a credit default, or failure of the sponsor at any time during the life of the PDTC's. An investor purchasing these securities would therefore have defeased or immunized the longevity risk and all other pensions scheme exposures for the relevant pensions scheme for a period of 10 years; have ensured that at the end of 10 years the relevant pensions scheme has no deficit (if the scheme has a deficit on the date of the PDTC's issuance this will in effect provide scheme deficit financing over a 10 year time horizon); and protection against a credit default by the pensions scheme's sponsoring employer.

The PDTC's will generally represent the A class and senior secured interests of each PST, as shown in FIG. 4. These ratings will be achieved by supporting the financial instrument with an amount of risk capital. The amount of risk capital to be held may be determined by quantifying the risk exposure of the financial instrument.

Risk capital may be raised by the PDMT which may act as a capital company and the amount of risk capital needed to support each PST may be passed on to that PST. The amount of risk capital passed to the PST may be determined to be an amount sufficient to support the PST's exposure to an amount of longevity risk and an amount of asset risk. In issuing the PDTC's, each PST may receive an investment amount from investors in the PDTC's and the PSTs may use the investment amounts to invest in assets to fund the payment amounts to be paid on the PDTC's.

Another possible arrangement is one in which the PST acts as an issuing entity and issues the PDTC's to investors in return for receiving an amount of investment, the PST then transfers the investment amount an asset holding entity also within the cell. It is then the asset holding entity that invests in assets to fund the payment amounts to be paid on the PDTC's, the asset holding entity transferring to the PST amounts matching the payment amounts on the PDTC's issued thereby. In this arrangement both the PST and the asset holding entity are supported by an amount of risk capital raised and passed on by the PDMT.

The exposure of the financial instrument to longevity risk may be quantified in accordance with methods of aspects of the present invention. To raise this risk capital the obligations of the PDTCs will be supported by the issuance of stratified subordinated classes of junior financial instruments in the form of Pension Defeasance Capital Certificates (PDCC), bonds, notes or other securities, which will be rated according to their priority in the sequential payment waterfall and further underpinned by further subordinated unrated Pensions Defeasance Equity, or Capital, certificates, bonds, notes or other securities (PDE). The amount of subordinated debt and equity raised by issuance will make up the risk capital supporting the PDTC.

The risks apportioned to the PDCC's and the PDE, will together encompass all of the exposures of the specific PST for which they provide enhancement. These may include exposure to longevity, inflation, interest rates, currency, credit, equity, property and alternative investments. The specific exposures borne by investors in each class of PDCC's and PDE, may be tiered simply in terms of seniority, in which case income of the PST after payment of its fees, expenses, senior obligations and any requirement for retention under conditions agreed with the rating agencies, will be paid out according to a priority waterfall. Alternatively, the individual classes of PDCC's and PDE's may be specifically linked to the performance of a single class of risk or specified grouped exposures, i.e. just longevity, or longevity and inflation, but no other exposure within the portfolio.

With regard to derivatives, the derivative products will largely mirror the aforementioned securities products already described, but will be issued in the form of derivative contracts, including total return swaps, futures contracts and contracts for differences and may be issued through the PDMT, or through a PDPC.

Figure 3:
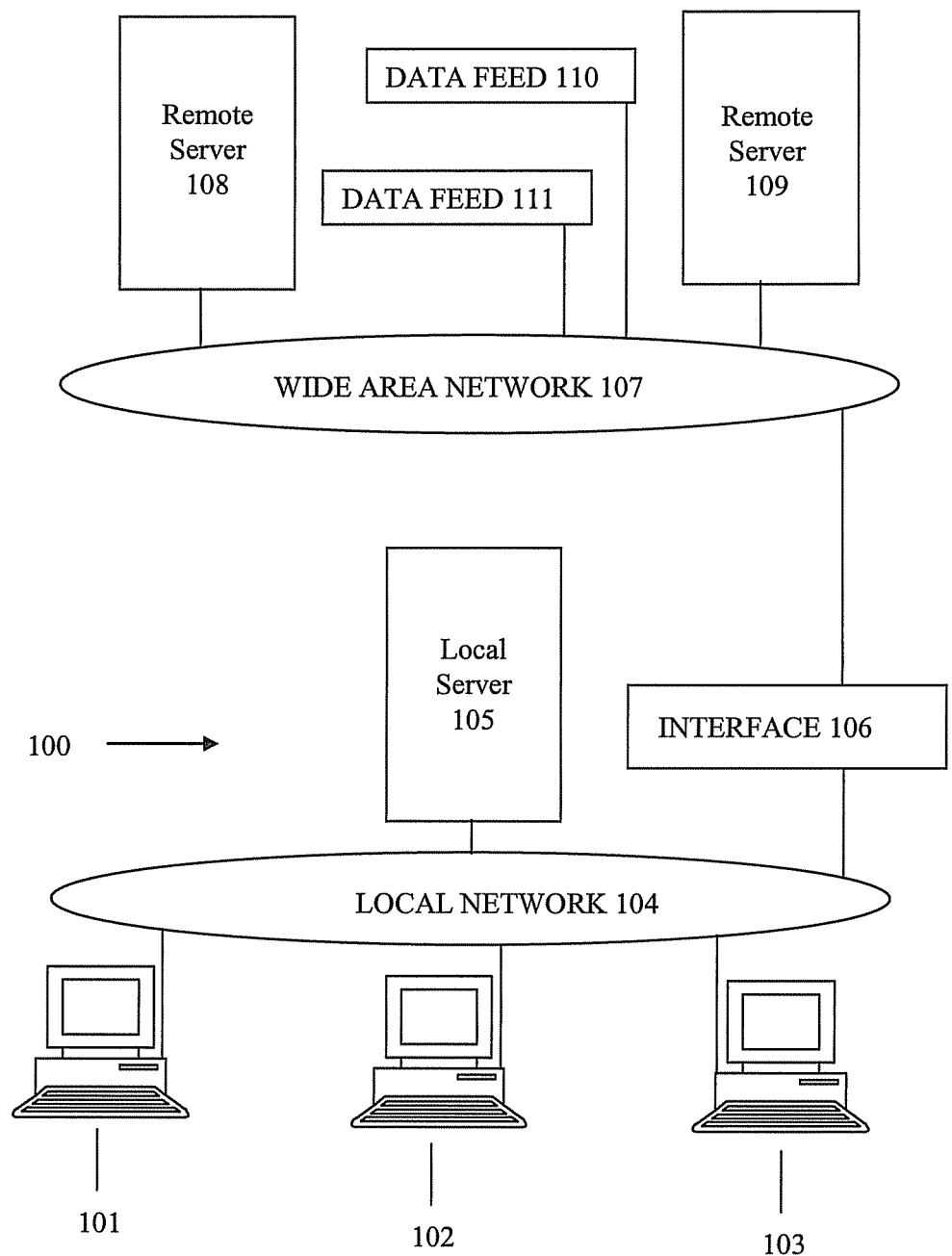
FIG. 3 illustrates a data processing system for use in carrying out methods in accordance with the invention.

FIG. 3 illustrates a data processing system 100 for use in carrying out methods in accordance with the invention. At a local site there are personal computers 101, 102 and 103, which are interfaced to a local network 104, and a local server 105 which is also interfaced to the local network 104. Data can be stored on the local server 105 and/or the personal computers 101, 102, 103. Data processing can be carried out by the local server 105 and/or the personal computers 101, 102, 103. The local server 105 and/or the personal computers 101, 102, 103 may be configured by software to carry out the steps of methods in accordance with the invention. The local network 104 is provided with an interface 106 to a wide area network 107, so that the local server 105 and the personal computers 101, 102, 103 communicate with the wide area network. Remote servers 108 and 109 are also connected to the wide area network, so that data held by the remote servers can be made available to local server 105 and/or the personal computers 101, 102, 103. The remote servers can receive data from data feeds 110 and 111 also connected to the wide area network 107, which provide data such as mortality statistics, pension fund statistics and so forth. This basic data is processed by the remote servers 108 and 109 so as to provide data which is used by the local server 105 and the personal computers 101, 102, 103 in carrying out the methods in accordance with the invention.

Risk Management System

FIG. 4 shows the operation of the risk management system of the present invention and is set out in the form of a flow chart showing the transfer of data between the different modules making up the risk management system. The risk management system is an integral component of the pensions defeasance system of the present invention is, as shown in FIG. 4, can be notionally divided into five operational layers: a raw data input layer; a data input layer; an asset and liability engine layer; a product/trading platform layer; and a reporting layer. Modules of the system shown with a solid outline in FIG. 4 denotes a new module developed to make up the risk management system. Those modules shown in FIG. 4 with a dashed outline denote a module that existed in some form before the development of the risk management system but which has been improved before incorporation in the risk management system. Those modules shown with dash-dot-dash outline in FIG. 4 denote a module that existed in the form in which it has been incorporated before the development of the risk management system.

These operational layers of the system and the modules of the system that make up each layer will now be described in turn. For each operational layer of the system, the current situation of the operation of a pension scheme before the development of the present operation will first be compared with the operation of that layer of the risk management system of the present invention.

Raw Data Input Layer

This layer relates to the collection, analysis and availability of all data required to be input to the risk management system of the present invention.

Currently, pension scheme data is collected on ad hoc basis and is of very poor quality; population and industry data are analysed only by academics but basis risk is not focussed on; and market data is not transparent to non-participants.

In accordance with the risk management system underlying the present invention, a rigorous data collection process allows the drilling down to the most detailed level of analysis across all elements of the raw data inputs.

The raw data input layer comprises: a pension scheme data module; a population and industry mortality experience data module; and a market data module.

In the pension scheme data module, pension scheme data is currently recorded by third party administrators or in-house administrators of pension schemes and the quality of data varies and is generally extremely poor. Data cleaning for a bulk buy-out exercise typically takes between 6 months to 2 years to complete. In the risk management system of the invention, this module creates a standard data protocol to provide a link between the pension scheme data and the trading platform and ensures minimum data quality standards are met through standard data quality control and checks. This module must be linked to the systems of any preceding third party administrators of the pension scheme.

In the population and industry mortality experience data module, a large sample of data of a suitable reference population is required to be input to the risk management system in order to make credible forecasts of mortality and longevity trends over time. Currently the only sources of data sufficient in size in the UK are (i) population data from the ONS and (ii) insured population data collected by the CMI. In the risk management system of the invention, this module provides a consistent way to extract the relevant data for projection of longevity trends. This module is linked to have access to the mortality data of the suitable reference population.

In the market data module, data from the relevant markets that is required by the risk management system is collected. The market data module may collect all relevant swap curves sourced from market counterparties on a daily basis, all pricing information required to build proprietary pricing curves, all pricing information required to run a daily mark to market on all assets contained within the pension scheme, and all pricing information required to create hedging exposure maps. In the risk management system, this module provides access to all required pricing inputs and all swap curves required for valuing pension portfolios on a daily basis and also stores and collates relevant pricing information to allow a daily mark to market on all assets contained within a pension scheme. This module requires access to closing market data on a daily basis.

Data Manipulation Layer

The data manipulation layer relates to the 'cleaning' and standardisation of data input from the raw data input layer and to the so that it meets the operation parameters of the risk management system of the invention and to valuation of hedging pension portfolio assets dependent on market data.

Currently, data cleaning specialists operate on a project/contract basis, but no standard data protocols exist, mortality analysis is led by academic and industry benchmarks do not exist, and hedging assets are bespoke products sold by Investment Banks.

In accordance with the risk management system underlying the present invention, standardised data protocols and transparent mortality assessments will lead to a market standard and an open-architecture hedging strategy.

The data manipulation layer comprises: a pension data cleaning and standard data formatting tools module, a longevity assumption setting tool module, and a hedging asset valuation tool module.

In the pension data cleaning and standard data formatting tools module, pension scheme data extracted and cleaned to convert it into a standard protocol that meets the operational parameters of the risk management system. Currently, data that is currently extracted from pension administrators is not standardised. In addition to poor data quality, there is currently no motivation for Trustees or Sponsors to see data cleaning as priority. This means data cleaning is currently an ad-hoc process and mostly applied in a wind-up situation, thus many corporate sponsors do not have an accurate assessment of the full liability exposure of the pension scheme. In the risk management system, this module provides a standard data transfer protocol between third party pension scheme administrator systems and the systems risk management system. It also provides standardised procedures for data cleaning and on-going data maintenance. It provides an ability to source and incorporate additional information to improve the quality of data provided by each scheme. It ensures a minimum data quality on which a 'clean' pricing can be achieved. It also creates a "market standard" for information content and quality required from pension schemes and trustees. This module is linked to the pension scheme data module which inputs the collected pension scheme data.

In the longevity assumption setting tool module, mortality analysis is conducted applying models to identify trends in mortality to value pension liabilities and enable quantification of the longevity exposure of the pension scheme and determine a risk capital requirement. Currently, longevity trends are generally analysed in a number of academic papers but there is no common approach adopted by the market/industry. In the risk management system, this module incorporates the leading mortality/longevity models in a consistent and transparent manner to provide longevity assumptions to value pension liabilities and for determining capital adequacy requirements for rating purposes. This module contains functionality allowing scheme specific mortality adjustments based on sex, age, size of pension and socio-economic factors through post code analysis. It extracts longevity projections (both mean estimates and tail scenarios) from reference population data, for example, CMI data. This module is also capable of determining adjustments for mortality rates linked to socio-economic groupings and specific pension scheme profiles. This module is linked to the pension scheme data module and the population and industry mortality experience data module. It reads mortality experience data from the reference population data such as the ONS and CMI sources and reads the pension scheme data and builds up scheme specific mortality experience over time.

In the hedging asset valuation tool module, the assets of the pension scheme portfolio to be hedged are valued in accordance the market data. The current approach to hedging a pension portfolio is by providing high-level duration information (e.g. PV01) followed by raw data to the providers of the derivative instruments without a standard approach. A number of providers offer an investment solution comprising a range of funds which approximate the underlying investment risk profile of a pension scheme, for example, LDI providers. Both approaches require the involvement of fund managers or investment consultants as "middle men". In the risk management system, this module creates exposure maps to facilitate risk management of the portfolio and the system also includes a pricing module that uses appropriate proprietary swap curves in pricing a proposed transaction. This module is linked to the market data module and requires access, for example, to Bloomberg mid-market screens and the relevant 'pricing grids' from swap counterparties to build appropriate proprietary pricing curves.

Asset and Liability Engine Layer

The asset and liability engine layer relates to the projection of the pension scheme cash flows and to the calculation of the risk capital required in order to achieve a rating from a rating agency.

Currently, a range of liability cash flow models exist but they require to be individually adapted so that they are bespoke for each pension scheme/client and they require actuarial knowledge and programming expertise. A rating agency capital projection framework and model do not currently exist.

In accordance with the risk management system underlying the present invention, a robust cash flow and capital projection system is achieved with minimum tailoring to each pension scheme/client and a rating agency capital projection framework is provided.

The asset and liability engine layer comprises: a cash flow projection model module; a longevity capital model module; and an asset platform module.

In the cash flow projection model module, expected cash flows of the pension scheme are projected. Currently, a range of cash flow projection models exist that could be used to model pensions and annuity business. However, the models require significant modification for each pension scheme and require both programming and actuarial expertise. In the risk management system, this module imports pension scheme information for both benefit entitlements and member data using a standardised approach through a customised database front-end. The standardised pension scheme data protocol is used. Each "slice" of a member's pension entitlements is modelled using a flexible approach adaptable across multiple jurisdictions and geographic regions. The module projects expected cash flows using assumptions linked to other risk management modules within the wider system and allows valuation of all pension risks, such as, transfer-out value, cash commutation, orphan benefits, etc, in addition to longevity and market risks. This module is linked to the preceding pension data cleaning and standard data formatting tools module from which it imports pension scheme data and also this module has access to best estimate assumptions from the longevity assumption setting tool module.

In the longevity capital model module, the longevity risk exposure of the pension scheme is measured and quantified. Currently, pension schemes are not required to capitalise for longevity risk. Life insurance companies currently use simplistic capital calculations for longevity risk and these are mainly scenario driven. Rating agency approved longevity capital models do not currently exist. In the risk management system, this unique and proprietary module contains the methodology and process for quantifying longevity risk within a pension scheme for the purposes of obtaining short and long term debt ratings up to and including AAA/Aaa ratings from ratings agencies. This module includes a rating agency approved capital model that allocates and projects the longevity capital requirements of a pension scheme on either a deterministic or stochastic basis. This module is linked to the longevity assumption setting tool module from which the best estimate mortality assumptions are imported and is also linked to the cash flow projection model.

In the asset platform module, cash flows for all asset classes held by the pension portfolio are projected. The existing asset platforms used by insurance companies, pension schemes and pensions consultants are limited to modelling a broad representative asset portfolio and do not included granularity at individual stock level. Asset allocation and portfolio decisions are currently modelled on a high-level, for example, an X % equity proportion. In the risk management system, the asset platform module models and projects cash flows for all asset classes. It manages and records trading activity and creates curves for pricing, hedging and risk management. It allows direct linking of assets and liabilities allowing analysis and hedging on a portfolio or individual basis and it contains functionality allowing sensitivity analysis/management of 01 exposure. The asset platform module is linked to the market data module from which it reads in market data on a daily basis and to the total portfolio management system module from which is accesses asset and liability portfolio information.

Product/Trading Platform Layer

The product/trading platform layer relates to the trading of the capital markets products associated with the risk management system which enable to securitization of pension liabilities.

Current pension risk transfers are assessed on a case-by-case basis by a team of actuarial specialists. A single pension projection and capital market trading platform does not currently exist and pension liabilities are not directly linked to asset trading platform.

In accordance with the risk management system underlying the present invention, a single platform allowing a combination of pension projections, trading of capital market products and direct linking of asset and liability portfolios is achieved.

The product/trading platform layer comprises a total portfolio management system module.

In the total portfolio management system module, the capital markets products, assets, liabilities and pension projections underlying the securitization of a pension scheme in accordance with the present invention are combined on a single platform. The market currently allows pensions risk to be transferred only to an insurance company through a bulk annuity exercise. The bulk annuity exercise is assessed and priced on a case-by-case by a team of actuarial specialists and the assumptions and the details of the transaction are not transparent to the pension trustees nor wider public. A solution that allows risk transfer of pensions liability risks to the capital markets does not currently exist and hence a single pension projection and capital market trading platform does not exist. In the risk management system, the total poi (folio management system module provides a single platform allowing a combination of the following things. Dynamic pension liability cash flow projections including: analysing cost and liquidity impact of excising member options; analysis of hedging requirements/costs/strategies; comparison of actual versus expected; assessment of correlated risk exposure e.g. longevity improvement event compounded with a rise in inflation. Detailed analysis of pension slices. Asset modelling and cash flow projections. A trading system for all classes of capital market products. Analysis and trading of derivative products. Production of linked asset and liability portfolios. The production of exposure maps for risk management. Micro hedging of individual asset and liability cash flows. Allocation of capital through rating agency approved asset and liability models (both stochastic and deterministic). All aspects of liquidity management including projecting tracking and analysing cash flows generated by both assets and liabilities. Ability to price and mark to market all assets and liabilities. Daily, comprehensive and transparent reporting. The total portfolio management system module is linked to the cash flow projection model module to allow it to read member level cash flows, to the longevity capital model module to allow it to read capital requirements, and to the asset platform module to allow it to read both asset and liability data to create a portfolio based approach.

Reporting Layer

The reporting layer relates to the reporting of the outputs of the product/trading platform layer to various stakeholders.

Pension valuation reports are currently in the form of: (i) triennial actuarial valuations (ii) accounting values (iii) bulk annuity quotes from insurers. There is currently no disclosure of mortality assumptions from any of these reporting sources, and, as a result, a total lack of transparency in current pensions reporting.

With regard to reporting for rating agencies, to date Rating agencies participation in the pension scheme risk transfer has been limited to providing ratings for derivative swap counterparties (principally interest rate and inflation swaps and single cohort longevity bonds). The rating agencies have not previously provided ratings for any product which achieves comprehensive risk transfer such as is achieved by the embodiments of the present invention which are capable of immunising multiple facets of pension portfolio risk including actual longevity experience, inflation, early retirement, spouse and dependant pension entitlement election to take lump sums on retirement and transfers out of the scheme. Therefore no reporting to rating agencies is currently provided.

With regard to reporting for capital investors, capital market investors are currently not directly participating in pensions risk transfer solutions and therefore no reporting to capital investors is currently provided.

With regard to reporting for pension scheme trustees, the most accurate pension valuation reports are currently carried out once every three years and they take a minimum of 6 months to complete. This means sponsors do not currently have up-to-date information on their pension obligations.

With regard to reporting for internal purposes, current internal risk assessment includes accounting valuations (e.g. FRS 19) and ALM models. FRS 19 is widely recognised by experts as inadequate reflection of the true underlying risk. ALM models are used to manage high-level risk decisions such as equity mix.

In accordance with the risk management system underlying the present invention, comprehensive, transparent, web based reporting to multiple stakeholders and potentially wider public is achieved. The reporting layer comprises: a rating agency reporting module; a capital investor reporting module; a pension scheme trustee/employer reporting module; and an internal risk reporting module. In the risk management system, the reporting layer modules achieve this reporting to such stakeholders including sponsors, investors, market counterparties, rating agencies and potentially the wider public. Reporting in the risk management system includes asset/portfolio reporting, in which: asset rating/asset class/issuer concentration/geographic concentration reports are produced; capital management and allocation reports are produced; liquidity reports including daily cash flow projections are produced; Hedging/interest rate/inflation sensitivity analysis and reports are produced; cash management reports are produced; and asset and liability profile reports are produced. Reporting in the risk management system also includes liability reporting, in which: monthly cash flow projection reports are produced; reports of major valuation assumptions, for example of mortality levels/trends, are produced; key member profile statistics reports are produced; IRR and payback period of capital investment reports are produced; actual versus expected analysis reports are produced; and capital risk exposure and expected loss analysis reports are produced.

At the core of the parameters agreed with the rating agencies to secure the appropriate debt ratings for the senior and junior debt obligations of the PST are the capital projection models, which evaluate risk (in the form of, for example, expected loss) within the portfolio to determine how much capital is required to support the issuance of senior debt obligations. These are proprietary models operate within the risk management system and lie at the heart of the rating methodology.

The models shown in FIG. 4 can be run deterministically or stochastically and are run daily to measure rating agency compliance. The capital models collectively determine how much risk capital is required each day to comply with the rating agency requirements and capital is measured as a combination of subordinated debt, equity. This may also include the excess spread i.e. the net spread between cost of funding (collectively senior and junior debt) and the income from the investment portfolio.

Issuing and Administering a Longevity Financial Instrument

The process of marketing and selling the PDTC's will vary according to their characteristics. Some tranches will be originated through reverse enquiry, where the investor(s) or dealers will define the risks which they are seeking to hedge though the purchase of the certificates. Alternatively, tranches may be structured on the basis of established parameters and indices and offered to the wider market.

Where the issuance is by reverse enquiry, the execution timetable will likely include an extensive due diligence process, which will involve the collection of relevant data (potentially up to and including data on all of the members of the scheme) needed to price the offering. Where the issuance is to be linked to a specific pension scheme the member data will need to be obtained from the scheme or from third party administrators, collated and "scrubbed" or "cleaned" to meet the parameter requirements of the risk management system. Also, all of the pension rules (both the pension scheme and regulatory rules) and any other relevant parameters will need to be modeled within the risk management system, so that a defined liability can be determined, albeit with variable parameters.

Assuming that the pricing of the PDTC's meets the targets of the investor(s), the investor(s) will then subscribe for a dedicated tranche of certificates.

Within the PST a complex process managed and monitored by the risk management system then begins, which will now be described. Upon receipt of funds subscribed to purchase the PDTC's, and the issuance of appropriate tranches of PDCC's and PDE to capital investors, in accordance with the requirements of the capital model, the PST will immediately commence the process of hedging and managing the complex liability which it has acquired.

This will include writing inflation and interest rate swaps with market counterparties to translate the liability (which can be thought of as a long sequence of zero coupon obligations, albeit a sequence which can expand, extend or contract) into a floating rate LIBOR based cash flow, to remove inflation and interest rate risk from the portfolio. For other types of liability, such as index based transactions, term longevity hedging, deficit elimination or sponsor default protection, other types of primary hedging may be used to enable the PST to be managed within the agreed ratings criteria. Where the underlying risks cannot be fully hedged, the PDMT and the PST's will hold sufficient additional capital according to the levels determined by its deterministic or stochastic capital models to satisfy the rating agencies that the risks are covered to the appropriate level to ensure that all of its securities or derivatives obligations can be met on a timely basis.

The subscription funds will then be invested in LIBOR based investment products. The investment process will initially be in cash deposits and other short term cash instruments. However, because the liabilities of PST's will typically be long term in nature, reflecting the mortality experience of the pensions scheme, the investment process will be dynamic and designed to achieve economic defeasance of the PST's liabilities over the medium to long term.

The PST will operate under investment parameters agreed with the rating agencies, which will allow it to extend its investment profile from cash and fixed income investments, right through to equities, property and alternative investments. The PST's investment portfolio will therefore be determined on a dynamic basis, according to available assets, market conditions (pricing), available capital, cost of capital and liquidity requirements, all measured within the risk management system against a capital model agreed with the rating agencies.

The risk management system, shown in FIG. 4, will enable the administration of a complex set of monitoring and management tasks which will help ensure that the PST always remains fully compliant with its rating obligations and meets its obligations to investors on a timely basis. The list of daily tasks includes:

Running the asset and liability capital models to ensure capital compliance;

Marking all assets and liabilities to market;

Measuring the 01 portfolio volatility and rebalancing derivatives and other hedges to take account of changes in the investment portfolio and the profile of the liability to ensure compliance with agreed sensitivity limits;

Running both a short term (1 year) and long term (to the final date of the longest liability) net cumulative outflow test to ensure the PST will always have liquidity to meet its payment obligations;

Measuring all sector concentrations, such as geography, industry, sector and country, to ensure compliance with rating agency diversification tests;

Monitoring scheme data such as deaths (actual versus projected), spouses/dependants, withdrawals etc. to ensure that the profile of the PST's liability always accurately reflects changes to the scheme's pensions liabilities In addition to these daily reporting tasks, which in total will require the production of a large number, for example 150, daily reports there will be an extensive mid and back office administration function required to ensure compliance of the PST with all of its obligations to investors, rating agencies and Stock Exchange(s). These administrative functions will encompass, rating agency reporting, accounting, securities and derivative settlements, pricing, trustee functions, custody and paying agency and cash management.

Using this system, a pension scheme will be able to purchase an investment, or enter into a derivative contract, with the capability to precisely mirror the liability profile of a part, or all of its pension obligations. In doing so, the sponsoring employer and the Trustees of the scheme will know that they have fully transferred the embedded risks of that part of the scheme which has been hedged, to investors in the capital markets. Depending on the specification of the securities or derivative contracts in which the scheme invests, this means that some of, or the combined risks of longevity, inflation, interest rates, currency, credit, equity, property and alternative investments will have been removed from the scheme for the life of the investment. The Trustees will be safe in the knowledge that the scheme's obligations will in future be met from the income received from the scheme's investment in PTC's or D's to a AAA/Aaa standard, or such lower rating as the scheme specifies, and the sponsoring employer will have no further exposure to the pensions deficit volatility that a pension scheme can impose upon its balance sheet.

Case Study of Implementation of the Invention

The following is a potential case study as an example of how aspects of the present invention may be implemented. This case study looks at the application of aspects of the present invention as a solution for a mature UK pension fund. To provide perspective, the case study also looks at the alternative options available, based upon the UK Pension Regulator's list of risk transfer options available to UK pension funds, published in December, 2006 (reprinted below). The case study also looks at the impact of the reporting and risk management systems.

In accordance with aspects of the present invention, for the first time pension schemes are able to purchase investment securities, or enter into derivative contracts, the cash flows of which will accurately reflect the liability profile of their obligations to pensioners.

In doing so the sponsoring employer of the pension scheme and its trustees will be able to transfer the embedded risks (such as longevity, inflation, interest rates, currency, credit, equity, property and exposure to alternative asset classes) to the capital markets and thereby defease the scheme's pensions liability.

The case study concerns a hypothetical corporation, ABC Airways. ABC Airways (ABC) is a formerly nationalized European airline, which was privatized in the 1980's with a large legacy pension scheme. The total estimated size of its pension scheme obligations, including pensioners, active employees and deferred members (former employees who have not yet retired), is £15 billion. ABC's current market capitalization is £5 billion.

Changes in pensions legislation, combined with recent accounting rule changes have forced the pension scheme to the top of ABC's management agenda. Having formerly been regarded as a contingent liability which was not recorded or recognized in ABC's accounts, management now has to contend with the following pension related issues:

- Any deficit between the estimated pensions liability (measured under FRS 17 and IAS 19 on the basis of AA rated bond yields) and the value of the scheme's investment assets, much of which is invested in equities, must now be recorded as a debt to third parties in the company's balance sheet.
- ABC's current deficit, based on its most recent actuarial valuation, which was carried out in 2005, is £2 billion. The mortality assumptions used as the basis for this estimate of the deficit are not published.
- The UK Pensions Regulator has expressed concern at the size of the deficit and requires the company to show that it will be able to reduce the deficit to zero within 10 years. The company plans to achieve this by a combination of special contributions and transferring certain property assets to the scheme.
- Due to the size of the deficit, the Regulator has also exercised its powers to require ABC to suspend all forms of distributions to its shareholders, including dividend payments, until there has been a substantial reduction in the size of the deficit.
- The credit rating agencies, seeing the pensions deficit as an obligation to third parties and part of ABC's debt, have reduced its credit rating to the non-investment grade level of BB.
- The cost and credit availability implications of this downgrade are a serious concern for ABC, which will need to start purchasing new aircraft from 2008 if it is to maintain the quality of its fleet.
- In an effort to reduce the burden of the scheme on the company, senior management has announced that it intends to negotiate with its pension trustees and the unions to seek changes in the schemes benefits. However, the unions which are very strong in the airline industry, have indicated that any initiative to reduce pension benefits, or increase the retirement age will lead to industrial action.
- Despite the difficulties which many others in the industry have faced, ABC has a strong management team and despite substantial increases in fuel costs, is actually on track to meet its target of achieving an operating margin of 10% within the next two years.
- The company is also likely to be one of the major players in the anticipated consolidation of the airline industry, which is likely to follow from the recently agreed "Open Skies" policy.
- As with other former nationalized airlines, which are similarly burdened with legacy pension schemes, ABC's share price reflects the impact of the pensions scheme—equity analysts have described the company as a large pension scheme run by a small airline—and the disparity between the multiple of EBITDA on which ABC trades compared to the new low-cost carriers, which do not have a similar pensions burden is striking.
- The fact is that despite its success at running its core business, ABC is a very complex story for the equity markets to understand as it can no longer be valued as a straight airline stock due to the balance sheet impact of its volatile pensions deficit.
- To determine an accurate valuation of the company, analysts would also need to reflect the volatility of the £13 billion pension asset portfolio, much of which is invested in equities—on this basis, ABC is arguably a 3× leveraged equity play.
- On the other hand ABC's pensions liability is valued on the basis of corporate bond yields and therefore its share price also needs to reflect volatility in bond yields.
- Unfortunately, this is just too complicated for the poor share analysts who do not have the transparency of information to make these calculations (the fact that the pensions liability is only re-calculated every three years itself makes a mockery of any attempt to conduct a marked to market valuation) or the tools to carry out this analysis and so as with any business which they do not fully understand, they mark the stock down.
- Starved of dividends, with a significantly underperforming share price, ABC's investors are frustrated and confused by the impact that the pension scheme is having upon what by all measures is otherwise a very successful company.
- Beyond the existing investors, potential bidders from the private equity markets are also frustrated by the uncertainty resulting from the pensions issue. Thus, a company that ought to be at the centre of attention in an industry that is likely to experience intense consolidation, continues to under-perform.

ABC's Options Using Only Conventional Solutions

- Based on the list of options available to pensions schemes to achieve risk transfer, as defined by the UK Pensions Regulator in December, 2006 (reprinted below), ABC's management have only a limited menu of solutions to their pension problems, none of which is sourced from the capital markets.
- They could close the scheme to new members. This would be deeply unpopular with existing employees and management recognize the value of the scheme as a human resources tool.
- Alternatively, they could retain the scheme, but reduce the benefits and increase the age of retirement. This is also seen as a very unpopular move and while some progress might be made on this front, it is unlikely to be enough to eliminate the deficit and bring the cost of the scheme to a manageable level.
- Neither of these strategies in itself will deal with the fundamental problem of the volatility of the deficit or indeed surplus.
- To complicate matters further, ABC's pensions liabilities are spread over a number of schemes, two of which are closed to new members. While the company's overall deficit across its schemes is £2 billion, the two closed schemes are both slightly in surplus.

ABC therefore finds itself in the frustrating position that were market conditions to become favourable (the ideal combination would be rising share prices and rising interest rates), would on the one hand benefit the schemes in deficit, while on the other there would be no way to claw back the growing surpluses in the two closed schemes, due to the asymmetry under which deficits in both open and closed schemes sit on the sponsor's balance sheet, while surpluses in closed schemes belong to the scheme members and cannot be clawed back by the sponsor.

ABC pension trustees have taken advice from an investment bank, which having analyzed the funds, concluded that they were exposed to three types of risk: equities, interest rates and inflation—for some reason they ignored longevity, possibly because they had no solution to offer (see, for example, the W. H Smith Case Study published on the UK Pension Regulator's website, reprinted below).

The investment bank's proposal was to implement a 95% swap overlay liability driven investment strategy ("LDI"), using indexation and interest swaps, combined with a 5% investment in equity options.

However, the trustee's investment consultant pointed out that while this strategy would protect against further ballooning of the liability caused by a further fall in bond yields, the analysis ignored the scheme's exposure to longevity, for which the investment bank had no product solution. Thus the scheme would remain exposed to the uncertainty of its member's mortality and thus uncertainty about its ability to meet its future obligations.

Two other investment banks proposed derivative solutions based on generic population longevity indices. However, the proposals would have left the pension scheme with considerable basis risk (the differential between the index on which the derivatives would have been based and the likely longevity experience of its own pensioner population) and there was also some doubt about the banks ability to execute the transactions.

Having rejected the LDI strategy and the indexed derivatives because of their inability to deal with the schemes specific exposures to longevity, the trustees looked at bulk annuity purchased from an insurance company as a potential solution.

Bulk annuity would certainly provide a full risk transfer of the scheme's obligations to its pensioners, but there were issues of scale, cost and the quality of the covenant.

In terms of scale, ABC's total pension's liabilities of £15 billion were considered way beyond the present capacity of the market, which has typically operated with an annual volume of around £2.5 billion. New entrants have joined the market recently, but even with the new capital which they have brought to the market, the scale of ABC's requirement would be well beyond the market's current capability.

Another negative factor when considering bulk annuity was cost. Bulk annuity utilizes regulated insurance company balance sheet capacity based on the equity capital of the insurance company and is therefore an expensive product. It is also a far from transparent product and ABC's trustees were troubled by the fact that neither their investment consultant, nor employee benefit consultant were really able to explain the basis on which the product was priced.

Notwithstanding the cost and lack of scalability for a total pensions scheme defeasance, ABC did look at bulk annuity as a partial defeasance i.e. as an investment asset of the scheme, rather than as a full legal and economic transfer of the scheme's obligations to its members. However, they decided against this option eventually on the advice of their lawyers, who pointed out that while a full legal transfer to an insurer of the scheme's obligation to its members would be effective, holding an insurance contract as an investment asset is an entirely different matter. Unlike a bond or other securities, an insurance contract is only a conditional obligation to pay, subject to their being no defenses available to the insurer.

On this basis, the trustees also decided against pursuing other insurance risk transfer products such as deferred or partial buy-outs and a product called pension risk insurance, which is designed to reduce a scheme's deficit and absorb the deficit volatility for a fixed period of time—ultimately all of these products would be categorized as an investment in a conditional obligation to pay (i.e. an insurance contract) rather than a conventional financial asset like a bond.

Another solution which the trustees looked at was a scheme transfer. This would have involved the transfer of the schemes liabilities to an independently managed collector scheme, which in breaking the link to ABC as the employee sponsor would have removed the troubling deficit/surplus volatility.

While superficially attractive, the trustees were quickly put off this idea after discussion with the UK Pensions Regulator, which brackets such arrangements under what it terms "scheme abandonment". This is strongly discouraged, on the basis of the Regulator's view that anything which breaks the link with the sponsoring employer is highly undesirable.

ABC's Options Employing the Inventor's Longevity Financial Instruments and Methodology However, innovative capital markets based solutions in accordance with aspects of the present invention provide the following options to the trustees and the corporate sponsor:

Longevity Indexed Solution

An embodiment of the present invention would offer ABC an AAA/Aaa rated longevity indexed security or derivative product issued from a Jersey cell or Master & Silo company. This product would make payments according to the actual longevity experience of a defined population and would most likely be based on the CMI index, or the newly announced Lifemetrics index, which both use general population data to generate their indices.

To achieve this, the trustees would liquidate existing assets of the pensions scheme's sufficient to purchase the longevity indexed securities or derivatives, which would in turn pay to the scheme an income based on the actual performance of the chosen index reflecting the actual longevity of the reference population.

The indexed securities or derivatives would provide a hedge against overall improvements in longevity, so that if people are generally living longer, the payments would extend accordingly. The payments on the indexed products would not however track the specific longevity experience of the ABC scheme's members and would therefore still leave some potential exposure to longevity within the scheme—usually referred to as basis risk The indexed securities or derivatives, could be issued for a specified term, or to the expiry of payments under the index.

The indexed securities or derivatives could be issued on a stand alone basis, or they could also have embedded within their terms the facility to additionally hedge the specific experience of the ABC's scheme with respect to inflation, early retirement, spouse and dependant's pensions entitlements, election to take lump sums on retirement, transfers out of the scheme, etc.

The indexed securities or derivatives could therefore immunize most of the portfolio risks inherent in ABC's pension's schemes, but would leave a residual exposure to longevity. The fact that this solution is based on a generic longevity index, as opposed to the specific experience of the ABC scheme's would make it a less costly solution for ABC.

The important distinction therefore from any other non insurance product currently available to pension schemes, is that an offering in accordance with a preferred embodiment of the invention is an indexed longevity investment product, which in addition can encompass the hedging of other scheme specific exposures, with payments of those elements linked to the actual experience of the ABC schemes.

Partial Scheme Defeasance

Alternatively, a further embodiment of the present invention would enable ABC to opt for a partial scheme defeasance as a way of solving exposure to its pension schemes. This product, which can also be offered in the form of AAA/Aaa rated securities or derivatives can be offered in many permutations, but for the purpose of this illustration is considered as a 10 year solution.

The pension schemes would liquidate sufficient of their existing assets to enable the purchase of partial scheme defeasance securities or derivative contracts with a 10 year maturity. Income from the securities or derivatives would cover substantially all of the payment obligations of the pension schemes for the full period of the investment.

At the end of the 10 year life of the securities or derivatives, there would be a final payment equal to any outstanding deficit in the schemes, thus ensuring that the scheme's will not only receive the exact income to meet their obligations to members for the 10 year period, but that they will be assured of removing any deficits over the period as required by the Pensions Regulator The partial scheme defeasance product will benefit ABC and the pension's trustees by covering substantially all payment obligations for the life of the investment, eliminating deficits within 10 years and removing any deficit volatility from ABC's balance sheet for the life of the investment. However, at the end of the investment, the full future exposure of the liability will once again reside with ABC, albeit from a starting point of a nil deficit. The unknown is what will be the cost in 10 years of the further hedging which will be required to immunize the exposures going forward.

Partial scheme defeasance as the name suggests is not a total management solution, but provides a cost effective method of immunizing deficit volatility and dealing with pensions deficits.

The important distinction therefore from any other non insurance product currently available to pension schemes, is that an offering in accordance with a preferred embodiment of the invention is a bespoke partial scheme defeasance product, reflecting the longevity experience of the ABC schemes.

Deficit Financing

While deficit financing is an integral part of the Partial Scheme Defeasance product, if required an embodiment of the present invention would also enable deficit financing to be incorporated into any of the securities or derivative alternatives outlined in this case study as potential solutions for the ABC schemes. This means that ABC would be able to fund its deficit over a period of its choice (up to 50 years), rather than within the 10 year requirement of the Pensions Regulator.

This would be achieved by the issuing cell company or silo buying a long term debt obligation from ABC equal to the total size of the scheme's deficits as one of its own investment assets (suitably credit enhanced and diversified through the use of credit derivatives). ABC will deploy the proceeds in an extraordinary deficit filling contribution to its schemes thereby allowing its schemes to increase the number of AAA/Aaa rated defeasance securities acquired up to the total liabilities of the ABC schemes. As a result, both the Pensions Regulator and the scheme's trustees will be satisfied that the scheme's deficits have been immediately eliminated.

The important distinction therefore from any other non insurance product currently available to pension schemes, is that an offering in accordance with a preferred embodiment of the invention is a bespoke deficit financing product, based on an exchange of securities issued by ABC for AAA/Aaa rated investment securities issued to the pensions schemes for the benefit of its members.

Full Scheme Defeasance—A Total Solution for Pension Scheme Risk Transfer:

In its most comprehensive form, an embodiment of the present invention would offer ABC and the pension scheme trustees the opportunity to invest in AAA/Aaa rated securities or derivatives issued from a Jersey cell or master & silo company, or a composite package of securities and derivatives the cash flows of which would comprehensively reflect the total liability of the schemes to all of their members.

To achieve this, the trustees would liquidate existing assets of the pensions schemes sufficient to purchase the pension defeasance securities or derivatives, which would in turn pay to the schemes an income which in substance defeases the actual liabilities of the individual schemes.

The securities or derivatives would provide a dedicated cash flow that accurately matches the future obligations of ABC's pensions schemes to their members, the amounts of which may vary from current projections due to factors such as actual longevity experience, inflation, early retirement, spouse and dependant's pensions entitlements, election to take lump sums on retirement, transfers out of the scheme, etc. All of these variations in the actual liabilities of the schemes will however be reflected in the income received from the securities or derivatives.

The important difference between preferred products in accordance with the invention and any other non-insurance solutions, is that in addition to tracking inflation and aggregating the impact of all of the events which affect each of the individual pension entitlements that make up the scheme, such as spouse and dependant obligations, election to take lump sums on retirement, transfers out etc., critically the income which is paid to the pension scheme will also reflect variations in longevity of the scheme members.

The important distinction therefore from any other non insurance product currently available to pension schemes, is that an offering in accordance with a preferred embodiment of the invention is a bespoke investment product, which is highly correlated to variations in the actual longevity experience of the ABC schemes.

While this solution will eliminate substantially all of the variable exposures of the schemes and thereby defease future obligations to members, any future obligations incurred to existing or new members of the scheme will not be covered by this solution. However, the facility exists to add incrementally to the solution by making further investments in the securities or derivatives to defease further liabilities as they arise, on a monthly, quarterly or annual basis.

The cost of this solution may be expected to be cheaper than insurance based solutions, because the products will utilize debt capital as opposed to equity capital, which as a result of being issued in risk specific tiers, is both cheaper and more readily sourced. The result is a more scaleable and cost effective risk transfer solution.

Impact for ABC of Solutions Based on Inventor's Methodology

Risk Transfer—Indexed longevity securities or derivatives can eliminate most of the scheme's exposure to longevity risk, as well as eliminating other variable portfolio exposures such as inflation and member specific obligations. This solution will provide significant risk transfer, but leave some exposure to longevity basis risk; Partial defeasance securities or derivatives can immunize the scheme's exposures to both longevity and other variable portfolio exposures for a fixed period, at the end of which any scheme deficits will have been eliminated. However at the end of the investment, ABC would be exposed to all of the future exposures of the schemes; Total scheme defeasance securities or derivatives can provide total transfer of all of the risks inherent in its pension schemes to the investors in the capital notes which support the structure.

Deficit Volatility—The indexed product, if elimination of non-longevity member specific exposures is included, will achieve a very substantial risk reduction, but not the elimination of deficit volatility; The partial defeasance product will eliminate deficit volatility for a defined period; The total defeasance solution will achieve the total elimination of deficit volatility.

Trustees—Having purchased any of these solutions the trustees would remain legally responsible for the schemes (unlike an insurance buyout, which is a full legal transfer of the obligation), but they would have the comfort of knowing that the schemes future obligations to pensioners would be either partially, or fully covered by a AAA/Aaa covenant, thereby reducing, or in the case of full defeasance, removing the need for reliance on ABC's covenant, which is currently non-investment grade. Depending upon which solution is chosen the stand alone exposure to ABC's covenant would have been eliminated or greatly reduced.

Accounting—FRS 17 & IAS 19 calculate a scheme's liabilities on the basis of discounting at the current yield on AA/Aa corporate bonds and require that where a deficit exists between the assets and liabilities of a scheme, that the deficit is shown on the sponsor's balance sheet. The value of AAA/Aaa investment securities or derivatives would be directly offset and as a result, in the case of a full scheme defeasance, the value of the scheme's assets will always match, or exceed the value of the scheme's liabilities and the problem of the volatile deficit will be permanently removed. Similarly the partial defeasance will provide a matching asset to offset the liabilities for the period of the investment and eliminate volatility. The indexed solution will substantially reduce, but not eliminate volatility.

Pension Regulator—From the Pension Regulator's perspective, each of these solutions involving the purchase of AAA/Aaa securities or derivatives, will meet with approval by raising the certainty of ABC's pensions liabilities being fulfilled. In addition, if the solution includes deficit financing, the Regulator's concerns will also have been met in this regard. The Pensions Regulator could therefore be expected to lift its restriction on dividend payments and other distributions to ABC's shareholders.

PPF—Similarly, the UK Pensions Protection Fund, which underwrites the risk of failure by UK corporate pension schemes, for which it charges a risk based annual levy, can be expected to respond positively to each of these solutions. Since the long dated indexed solution or better still the total defeasance solution would give a greater certainty of the long term performance of ABC's schemes, over the shorter term solution provided by partial defeasance, it is likely that they will result in a greater reduction in the PPF's annual levy, 80% of which is based on the inherent risks of the specific scheme. Additionally, where a scheme adopts an AAA/Aaa investment solution to defease its liabilities, it is expected that, subject to the language of the documentation, the PPF will give exemption to the Pensions Act Section 75 provision in the event of a subsequent failure of ABC, thus protecting scheme members from a reduction in their pension entitlements.

Debt Rating—The impact on ABC's debt rating of any of these solutions is likely to be neutral, since to the extent that the solution incorporates deficit financing, it will in effect replace a long term obligation to the pension scheme with a long term obligation to the Cell Company or Silo. However, to the extent that the term of the deficit financing exceeds the maximum period of 10 years in which the Pensions Regulator requires the deficit to be eliminated, it may have a positive impact on the ratings due to the lesser call on ABC's cash flow.

Market Timing—One of the most difficult decisions in dealing with pensions liabilities is timing when to extinguish the risk exposure. Having taken the decision to utilize a solution in accordance with aspects of the present invention, one of the many benefits is the flexibility of the product, which offers ABC as the sponsor the option (but not the obligation) to invest in any or all of the tiers of capital which support the AAA/Aaa ratings of the investment securities or derivatives. By investing in the capital of the defeasance securities or derivatives, ABC can continue to participate in the risks and rewards of managing the pensions risk, which is being transferred to the capital markets, without further balance sheet exposure to the volatile pensions deficit—the balance sheet exposure would now be limited to the size of its investment in the capital notes. By participating through ownership of tradable capital securities, which can be sold to reduce or eliminate exposure at any time, ABC can more effectively manage the process of extinguishing its pension's exposure according to its assessment of market conditions. This is very helpful to a sponsor who is uncertain as to the best timing of closing out its pension's exposure. The pension trustees, in the meantime will have the security of holding AAA/Aaa rated securities or derivatives to meet the liabilities of the schemes to their members.

Future Additions—While the preferred solution only provides defeasance up to the date of execution—i.e. it is not forward looking in terms of the accrual of future obligations to ABC's employees—the solution is flexible in that ABC can subscribe for additional tranches on a monthly, quarterly or annual basis, so that future pension liabilities are defeased as they accrue.

Sponsor/Trustee Dynamics—There is an inevitable tension between pension trustees and the corporate sponsor. Trustees want to see minimum risk and no deficit in the scheme, while sponsors will typically seek to minimize costs and contributions—especially for a closed scheme where there may be no way of redeeming a surplus. The proposed solution in accordance with embodiments of the invention can uniquely satisfy the demands of both the trustees and the sponsor, because it provides the flexibility to fully defease the pension scheme, while leaving the economics open for the sponsor, if it chooses to participate in the capital structure.

Flexibility—The flexibility of offerings that can be made in accordance with embodiments of the invention gives ABC the option to choose different solutions for its different schemes. ABC might for example opt for full defeasance for those of its schemes which are in deficit (including deficit financing) to remove the deficit and its associated volatility. For the schemes in surplus, it might choose the partial defeasance solution for a 5 year period, protecting against a swing from surplus to deficit and thereby neutralizing the volatility for 5 years, with the option to review the position of the surplus again at a future date. Alternatively, ABC could elect to buy a full defeasance solution, but for less than the total liabilities of the specific scheme. In this case it could choose to reference payments to a defined percentage of the obligations due to all of scheme members, or just to a nominated cohort of members of the scheme. The permutation of options available under a program in accordance with aspects of the invention is substantial, providing that the exposures are capable of being hedged, or managed under the criteria agreed with the rating agencies for the preservation of the AAA/Aaa ratings through the provision of capital.

Covenant—While the preferred solution in accordance with embodiments of the invention provides the ABC schemes with a AAA/Aaa rated credit covenant (equal to the strongest sovereign credit ratings), the facility exists within the issuance program to add the overlay of an additional independent AAA/Aaa guarantee from a monoline insurance company or similar entity, to provide further integrity to the solution.

Portfolio Diversification—An important consideration for the trustees in agreeing to accept a solution in accordance with embodiments of the invention is that the corporate structure from which the securities or derivatives are issued is transparent for the purposes of the requirements for portfolio diversification required for pension schemes. For this reason the structure of a trust and sub-trust, or a cell company, or a master and silo company structure have been chosen to provide a combination of segregated portfolio exposure (the assets against which the securities or derivatives are secured are legally segregated from assets held to secure obligations to third parties) and "look through", meaning that the pension trustees can look through the securities or derivatives, which they hold on behalf of their members to the underlying diversified portfolio of assets against which their investment is secured.

Systems Implications

The proposed solution in accordance with embodiments of the invention in all of its manifestations relies upon the unique capability of the systems platform to map the risk inherent in pension liabilities to the ratings criteria agreed with major rating agencies for the purpose of securitization and risk transfer. The systems platform is a vital tool for defining, monitoring and reporting the relevant risks and for determining the appropriate levels of capital needed to maintain the debt ratings for both the senior AAA/Aaa and lower rated junior and subordinated capital tranches.

In addition to its pivotal role in enabling the securitization of pension liabilities, a further aspect of embodiments of the invention is that the systems platform can be used by pension trustees and other managers in the daily management of pensions risk. Unlike other pensions systems solutions, the systems which are an embodiment of the invention, provide a comprehensive risk map of member specific pension liabilities and can uniquely link the liabilities to the portfolio of pension assets, so that the risks in the portfolio can be viewed on a holistic basis and at a granular level.

Due to this unique level of functionality, an embodiment of the invention would allow ABC to adopt the systems platform for its own internal pension's scheme management purposes. Among the benefits of doing so would be; the ability to manage its schemes on a daily marked to market basis for both assets and liabilities (unlike the present arrangement of revaluing the liabilities on a triennial basis); the availability of a transparent reporting system would be of value to ABC's accountants; it would also provide valuable analysis to equity analysts and investors, who could be provided with the information needed to interpret the risks inherent in ABC's pensions schemes, thereby greatly enhancing their overall understanding of ABC's business; a further embodiment of the invention is that it would facilitate transparent reporting of the composite risks of the ABC schemes to the PPF, which could be expected to reduce accordingly the risk based aspect of its annual levy.

Means of Delivering the Solution

Having described the potential solutions which could be provided to ABC through the application of various embodiments of the invention, there follows a brief description of the process by which the various securities and derivatives are issued and managed:

An embodiment of the invention could involve setting up a Jersey master company beneath which would sit individual silos, which would be legally ring fenced from each others obligations The master company would seek and obtain long term debt ratings for a global multi-currency program of pension defeasance solutions. The ratings would cover senior and subordinated debt and capital notes Having been requested by ABC to price a defeasance solution for one of its pension schemes, all of the scheme member data would be entered onto the systems platform, which represents a further embodiment of the invention so as to create a 'risk map' of the scheme. The risk map would be used to derive the amount of capital required to support an issuance of AAA/Aaa pension securities, the payments of which would reflect the future obligations of the scheme to its members. On the basis of this analysis, ABC would be provided with a price for the pension defeasance certificates Assuming that the price is acceptable to ABC and its pension trustees, Silo 'A' would issue pension defeasance certificates in sufficient amount to defease the liability of the scheme. The monthly payments on the certificates would be the amounts calculated as sufficient to enable the trustees to meet the monthly obligations of the scheme to its members, including one-off payments such as lump sums payable on retirement. The amounts due would be recalculated on a periodic basis to ensure that the trustees always have sufficient funds to meet their obligations—if required, a further embodiment of the invention would allow the trustees to draw and repay from a liquidity facility to ensure that they always have funds available to meet the needs of the scheme. The maturity of the certificates will be determined by a legal final date, which will be a date after the scheme has met its final obligations to scheme members.

The terms having been agreed, the pension scheme will subscribe for the pension defeasance certificates, either by exchanging existing assets of the scheme, or by liquidating existing assets and subscribing the proceeds to Silo 'A' in exchange for pension defeasance certificates.

Having purchased the certificates, which will be secured against Silo 'A's portfolio of investment assets, the scheme will be required to provide regular updates of member data to enable the systems platform to monitor the risks profile of the liabilities which Silo 'A' has assumed in issuing the certificates and to generate the daily rating agency reports required to maintain Silo 'A's debt ratings At the same time as issuing the pension defeasance certificates, Silo 'A' will need to issue sufficient capital notes to satisfy the rating agencies that it will always have sufficient resources to meet its obligations, which as a first priority are to the holders of the defeasance certificates.

To enable Silo 'A' to meet its obligations, it will invest the subscription proceeds from the sale of defeasance certificates in a portfolio of assets, diversified by reference to geography, industry, issuer and rating, for the purpose of which it will run its proprietary capital model with updated market data on a daily basis. The investment parameters under which Silo 'A' will operate will permit investments in short term instruments such as cash, bank deposits and commercial paper, while at the longer end of the spectrum, Silo 'A' will be permitted to invest in all forms of fixed income securities together with public and private equity and alternative asset classes. Every type of asset and every permutation of asset portfolio will be assigned a specific capital charge to reflect the risk associated with the investment.

In addition to monitoring and maintaining capital against its investment portfolio, Silo 'A' will be required to monitor its sensitivities to market risks, such as interest, currency and inflation and will be required to hedge its exposures to remain within prescribed tolerances.

Finally, Silo 'A' will be required to monitor its exposure to longevity, comparing the actual experience of the reference population with its own projections of longevity and where adverse divergence occurs, to provide capital against the exposure.

All of these key portfolio tests will be run daily on the systems platform to ensure capital compliance and to produce reports for the rating agencies.

It will be appreciated that the case study and other embodiments discussed above are exemplary only and are not to be taken as limiting the scope of the invention.

Brief Summary of Conventional Methodologies

The following is the UK Pension Regulator's list of known methods available to manage pension scheme risk, published December, 2006 and available on their website.

Buy Out of all or Some Scheme Liabilities with a Regulated Insurer

Buying out liabilities with a regulated insurance company may appear to be an expensive immediate exit cost relative to the cost to the employer of running the scheme on. In practice, this means the employer is implicitly providing capital from its business to cover the risks that an insurer has to provide explicitly. This depends on the appropriate technical provisions for a scheme linked to the financial strength of the employer, and the benefit and membership profile of the scheme.

Deferred Buyout of Liabilities with a Regulated Insurer

Some insurance companies are offering to take on schemes' liabilities in a phased approach. The aim is that benefits are insured gradually over time allowing the cost to be spread and the scheme risks to be managed towards buyout. Some market entrants are using this to target small to medium sized companies and schemes that may not have the available capital for a full buyout.

Longevity Risk Products or Securities

This covers a range of products or potential products. A discussion paper on these was presented to the Faculty of Actuaries in January 2006(see 'Living with Mortality: Longevity Bonds and other Mortality Linked Securities', D Blake, A J G Cairns and K Dowd). Existing and past products include over the counter mortality swaps, mortality bonds limiting catastrophe risk over the short to medium term issued by a reinsurer to cover its own life insurance risk, and a longevity bond announced in November 2004 (subsequently withdrawn).

Primary Layer or Excess of Loss Insurance of Pension Risks Over Stated Periods

We are aware of proposals by some companies to insure certain risk experience within predetermined bands over a stated period which may be the funding recovery period. For example this may be to underwrite mortality and investment experience up to a stated level over the recovery period.

Interest Rate and Inflation Derivatives

These are primarily over the counter swaps or pooled investment arrangements provided by investment banks and asset managers. The intention of these is to improve the match of the scheme assets to the measurement of the liabilities.

Equity Derivatives

These usually involve combinations of share options and futures in order to limit exposure to falls in equity markets. The cost of these is usually also to limit the potential for equity gains. These may be used in combination with bond options or futures to effect a change in the equity/bond mix of the scheme assets.

Protection Against Employer Default

Examples of third party insurances include letters of credit and credit default swaps. A letter of credit provides an amount to the scheme in the event of employer default as defined in the agreement. A credit default swap, generally, operates as for a letter of credit but is a tradable market instrument.

Case Study of Conventional Options Available to Pension Scheme Trustees

The following is a case study analysis of W H Smith pensions defeasance, as published by the UK Pensions Regulator.

In 2005, faced with a £100 m deficit, W H Smith took a radical step to try to deal with the problem.

Why Did they Decide to Change their Investment Strategy?

The trustees took advice from an investment bank, which analysed the fund in relation to risk. This showed that the fund was exposed to three types of risk: equity risk, interest rate risk and inflation risk.

The trustees decided that they wanted some, but not a lot, of equity exposure but no interest rate or inflation risks. They were also concerned that equity was an imperfect match for their pension fund liabilities.

Their pension payments were inflation linked. The trustees wanted to change their investment strategy so that it matched these liabilities.

What Did They Do?

They invested 94% of the fund in swaps (inflation and indexed linked). The remaining 6% was invested in options, which allowed the scheme some equity exposure.

The W H Smith trustees took a lot of advice before deciding upon this liability driven investment strategy. They considered 30 different models provided by banks and fund managers before making a decision.

What was the Result?

This strategy proved at least partially successful for W H Smith. Their advisers said that if the trustees had kept their original strategy, the deficit would have increased to £150 m because of the unprecedented fall in bond yields in early 2006.

The timing of strategies like this is key. W H Smith's strategy was put in place in October 2005 before the further fall in bond yields.

A Final Note.

Despite this strategy, in January 2007 W H Smith announced that it needed to close the scheme even to existing members. The company stated that 'the long term costs of running a final salary scheme continue to be high and difficult to predict, mainly due to low investment returns and members living longer.'

Inventor's Capital Markets-Based Solution

The lesson which trustees may draw is that liabilities can be very unpredictable, even in the short term.

The basis of one aspect of the invention is that it provides a structure for a defeasance product which creates minimal basis risk for the issuer and the investor, assuming that the investor is seeking to defease exposure to actual pension liabilities rather than exploit relative value.

For ease of understanding, the comments below refer to a securitised embodiment of a product in accordance with this aspect, but they can also apply to the derivative form.

Method of Initially Setting and Later Re-Setting Payment Schedule Amounts

An embodiment of a method according to the present invention of operating a financial instrument associated with the defeasance of a pension scheme will now be described.

The design rationale of the method of operating the defeasance product to project cash flows and also of calculating the indexed cash flows that make up the adjusted cash flow to be paid at re-set points to the investor holding a financial instrument according to the invention concerns two aspects, life expectancy (i.e. mortality experience) and pension cash flow (taking into account non-mortality experience) will now be set out.

In this embodiment, the life expectancy construct of the defeasance product has been based on the understanding that its cash flows may be determined by reference to the actual average or weighted average mortality rate of a defined population or sub-population (i.e. "segment") of scheme members, but may not be determined by reference to the deaths of individual scheme members. In other embodiments, reference to the deaths of individual scheme members may be made.

The pension cash flow construct of the defeasance product has been based on the understanding that cash flows attributable to each scheme member may be varied due to non-mortality events such as pension, work or lifestyle choices of individual scheme members (e.g. election for a tax free lump sum on retirement, pay increase, marriage etc) but may not be varied due to the death of individual scheme members (i.e. mortality experience).

The defeasance product requires the calculation of two sets of cash flows, projected cash flows and indexed cash flows, together with a rate re-set on a regular basis.

The working assumption is that, depending on the scheme, rates will be re-set on a monthly, quarterly or annual basis (each a "rate re-set period"). The adjusted payment amount to be paid to the investor in that period is thus calculated in accordance with the rate re-set method.

Projected cash flows will be calculated prior to each issue of a financial instrument, such as defeasance securities, in accordance with the present invention. Based on personal and statistical data available at time of issue, the capital projection model will project future cash flows for the scheme as a whole, all segments of the scheme, and every member of the scheme. The likelihood that each pension scheme member will survive until given times in the future projected by an appropriate statistical longevity projection model may be taken into account in calculating the projected cash flows prior to the issue of the financial instrument.

These projected cash flows calculated for the scheme as a whole will be the issuer's monthly scheduled payment obligations on the securities and will be documented as such in the relevant pricing supplement for each issue.

The statistical data used for life expectancy/longevity projections may also be based on appropriate actuarial tables as amended for the demographic and socio-economic characteristics of each scheme, segment and member. These amendments of the longevity tables for each member of the pension scheme, or 'mortality level adjustments' will be described later.

At each re-set point after the financial instrument has been issued, indexed cash flows will be calculated in relation to the rate re-set period just completed. Based on updated personal and statistical data related to the pension scheme's actual experience, the model will re-calculate cash flows for the rate re-set period just completed for the scheme as a whole, all segments of the scheme, and every member of the scheme.

The indexed cash flows for any rate re-set period will comprise the aggregate value of indexed cash flows for all segments of the scheme. The aggregated indexed cash flow represents the adjusted cash flow amount paid to the investor in relation to that re-set point.

The statistical data used for life expectancy outcomes during that month, quarter or year is based on the actual average mortality rate for each segment of the scheme.

A cash flow entitlement is calculated for every original member of the scheme regardless of whether they are alive or dead.

All other (i.e. non-mortality related) personal and statistical information used in the calculation of indexed cash flows will be based on actual (rather than projected) data. For example, the model will use actual RPI growth for indexed pensions, actual tax free lump sums and "transfers out" during the rate re-set period (i.e. members porting their pension entitlements to a different scheme).

Rate re-sets will take place each month, quarter or year and will involve increasing or decreasing the issuer's monthly, quarterly or annual scheduled payment obligation on the securities by reference to the net difference between the Projected and Indexed cash flows for that month, quarter or year.

Where, during the rate set period under review, only one scheme member has died, the element of the rate re-set calculation attributable to mortality data will be deferred until the rate re-set period during which the next scheme member dies. The deferred rate re-set in respect of mortality data will be calculated for the composite period from the first day of the original rate re-set period to and including the last day of the deferred rate re-set period. All scheme members dying during this composite period will be deemed to have died part way through the composite period using a time based weighted average.

This "single death" procedure will only apply on a scheme wide basis; it will not apply to a single death in a segment of the scheme if at least one other scheme member from one of the other segments of the scheme has died during the rate re-set period under review.

Run Off: if the issuer has not previously redeemed the defeasance securities (perhaps by exercising its "clean-up" call option) and fewer than 11 members of the scheme are still alive, the issuer will be required to redeem the securities by paying investors an amount equal to the cost of buying annuities for all of the remaining members.

An optional feature of the product is that if rate re-sets occur on a less regular basis than payments on the securities (e.g. quarterly or annually rather than monthly) the issuer may provide deposit and liquidity facilities to an investor to help "smooth" differences between cash flows received on the defeasance securities and payments due to scheme members.

In a preferred embodiment of this aspect of the invention, "segments" will be created based on the status of each member (deferred, active, pensioner) and size of pension entitlements in each rate re-set period. Table 1 shows defined segments for members of a large scheme sorted by reference to £200 annual pension entitlement bands. This would produce at least 1,000 segments for a scheme of say 50,000 members and annual pension entitlements ranging from £0 to £200,000. Although this corresponds to an average of 50 members per segment, the average will cover a wide range of segment sizes, some of which may be several hundred strong others of which may be empty or just have a handful of members.

TABLE 1

| Segment | Segment | Segment |
|---|---|---|
| 1 > £0 < £200 | 491 > £98,000 < £98,200 | 991 > £198,000 < £198,200 |
| 2 > £200 < £400 | 492 > £98,200 < £98,400 | 992 > £198,200 < £198,400 |
| 3 > £400 < £600 | 493 > £98,400 < £98,600 | 993 > £198,400 < £198,600 |
| 4 > £600 < £800 | 494 > £98,600 < £98,800 | 994 > £198,600 < £198,800 |
| 5 > £800 < £1,000 | 495 > £98,800 < £99,000 | 995 > £198,800 < £199,000 |
| 6 > £1,000 < £1,200 | 496 > £99,000 < £99,200 | 996 > £199,000 < £199,200 |
| 7 > £1,200 < £1,400 | 497 > £99,200 < £99,400 | 997 > £199,200 < £199,400 |
| 8 > £1,400 < £1,600 | 498 > £99,400 < £99,600 | 998 > £199,400 < £199,600 |
| 9 > £1,600 < £1,800 | 499 > £99,600 < £99,800 | 999 > £199,600 < £199,800 |
| 10 > £1,800 < £2,000 | 500 > £99,800 < £100,000 | 1000 > £199,800 < £200,000 |

The worked example below exemplifies the contrast between the respective obligations of the pension trustees to its members and the issuer to its investors consequent upon the death of scheme members. For example, with more than 250 deaths by the year 10 rate re-set, the pension trustees' future obligations to their scheme members are now based on the pension entitlements of fewer than 750 surviving members. By contrast, the issuer will always calculate payments on its defeasance securities by reference to the original population of 1,000 members. Even though more than a quarter of members have died by the end of Year 10, the issuer will still calculate and pay cash flows on its defeasance securities in respect of all 1,000 original members, whether alive or dead based on cumulative projected and average actual mortality data for the 10 year period.

Example Application of Payment Schedule Setting and Re-Setting Method

A hypothetical scheme overview will now be described, with reference to FIGS. 6-16.

In this example, there are 1000 members labelled 001 to 1000. Some are already retired (retirement year 0), while others retire up to 13 years into the future. The scheme members have differing initial (annual) pension entitlements ranging from circa £1K to £31K, and different expected mortality rates (based on age, gender etc.). There is an indexation scheme—4% pre-retirement, and RPI after retirement.

In accordance with this embodiment of the invention, people will be assigned to a segment in any given year based on their nominal pension cash flow in that particular year. In this example, the segments are defined in terms of £1,000 intervals. Thus, for example, segment 1 in year 5 would consist of those individuals whose annual pension in that year ranges from £1,000 to £2,000.

Figure 7:
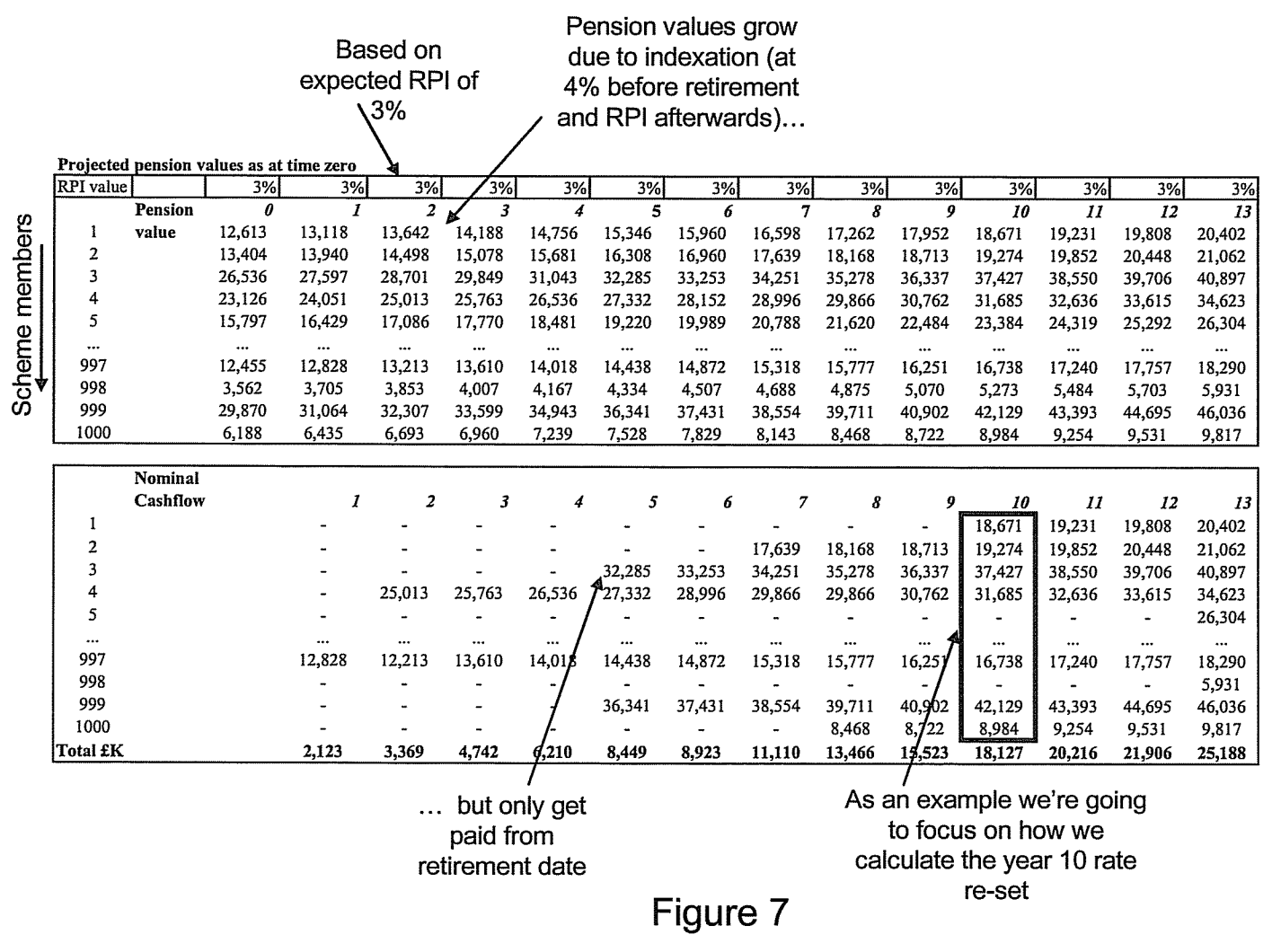

As of time zero, when the financial instrument is to be issued, it is possible to project each member's nominal cash flow, as shown with reference to FIG. 7. The projections are based on an RPI of 3%. Pensions grow due to indexation before retirement of 4% and RPI afterwards, but only get paid from retirement date.

The calculation of the expected cash flows is performed as follows, with reference to FIG. 8. As described above, it is possible to predict each member's expected cash flow, taking account of their projected probability of death. The probability of death/survival of each member as at time zero, when the financial instrument associated with the pension scheme is to be issued, is projected using the longevity projection model in accordance with aspects of the present invention, to be described below. It can be seen in FIG. 8 that there is provided the probability that a member will die before a given date, as at time zero. Multiplying the nominal cash flow by the probability that the member is still alive, provides expected cash flows. This expected cash flow forms the payment schedule for the bond that is issued. These expected cash flows will be the issuer's scheduled annual payment obligations on its defeasance financial instruments such as securities. This is how the scheduled payment amounts of the financial instrument match the expected cash flow obligations of the pension scheme to its members.

There will now be described how indexed cash flows and rate re-sets can be calculated to take account of actual experience for all factors other than mortality, and a segmented average of actual experience for mortality.

After the financial instrument is issued, adjusted payment amounts are calculated at regular re-set points. As an example, the calculation of the year 10 rate re-set will be discussed, with reference to FIG. 9. It can be seen that in year 10, two things have turned out differently to what was expected. Firstly, RPI turns out to have been 4% and not 3%, and secondly member 002 commutes 20% of his pension. This leads to a 20% drop in his pension entitlement compared to what it would have been, but a spike in his cash flow due to the lump sum payout. It will be noted that all 1,000 scheme members are put into year 10 segments based on their pension entitlement, regardless of whether they are still alive or not. This segmentation makes it possible to place all 1,000 into a segment. Thus, as shown in FIG. 10, all 198 deferred members are in segment 0, while the retired members are in the segment according to their pension entitlement in year 10. As shown in FIGS. 11 and 12, it is possible to allocate the revised nominal cash flows to each segment, and to calculate the average survival rate for each segment. Whether revising cash flow projections or mortality projections, the revisions are always based on the original 1,000 members, regardless of whether they are alive or dead.

There is now all the information needed to calculate the Year 10 aggregated indexed (i.e. adjusted) cash flow. With reference to FIG. 13, the revised nominal cash flows are multiplied by the average survival rates, and the segments are added up to provide the Year 10 aggregated indexed (i.e. adjusted) cash flow. As shown in FIG. 14, it is then possible to calculate the Year 10 rate re-set, being the difference between the projected cash flows and the aggregated indexed (i.e. adjusted) cash flows.

To understand the basis risk, it is possible to work out what cash flows the trustees actually need to pay to their members. With reference to FIG. 15, it is possible to look at which individuals actually died. In the actual mortality experience table, an entry of 100% means that the individual died; otherwise the entry is 0%. It is possible to calculate the cash flows the trustees actually need to pay out to each member, as shown in the cash flow required table. The cash flows are calculated as the member's nominal cash flow (but on an actual basis as described above with reference to FIG. 9) if he/she survives, and are set at zero is he/she does not. For year 10, the cash flow required in this example is £11,889K, and the right hand side of FIG. 15 shows the cash flows split into segments.

The difference between what the issuer pays investors on the defeasance securities and what the trustees need to pay the scheme members, is the basis risk. With reference to FIG. 16, it can be seen that segment 2 shows no basis risk because it has no mortality experience. In general, no basis risk arises whenever either no members or all members of a segment have died. It can be seen that the difference between the indexed cash flows and the pension cash flows in this example is £11,000. Thus, investors in the longevity instrument will receive £11,000 more than the trustees actually need to pay the scheme members. This represents a 9.3 basis points basis risk exposure on the 10 m year rate re-set.

Method of Projecting Longevity and Quantifying Longevity Risk

There will now be discussed in some detail the methodology for projecting the longevity of a pension scheme membership and also sizing and capitalising longevity risk, in accordance with aspects of the invention.

The methodology according to aspects of the invention described herein for sizing and capitalising longevity risk can be used to quantify and price the longevity risk associated with a pension scheme due to the uncertainty associated with the future mortality experience of the pension scheme's members, and thus also the longevity risk associated with a financial instrument according to the present invention which transfers the longevity risk of a pension scheme onto the capital markets. This can assist investors in understanding the longevity exposure of the financial instruments of the present invention.

The methodology of the present invention can also be applied to determine an amount of risk capital to be held to support a financial instrument according to the present invention so that it achieves and maintains a rating according to criteria agreed with a ratings agency. The risk capital can be held in the form of subordinated tranches of debt and equity, issued in the form of, for example, capital notes and equity notes.

The methodology of aspects of the present invention can also be applied generally to quantify the longevity risk exposure of any asset or a liability having cash flows of sums of accounts receivable and accounts payable which are dependent to some extent on the actual future mortality experience or exposure of a group of creditors or debtors.

Modelling and Adjusting Mortality Tables for Longevity Trends

Longevity 'trend' risk is the risk that the trend in mortality rates is different to that expected, i.e. people live longer than projected. The rate of mortality improvement has been increasing over time, driven by incremental improvements in medical advancements, rising standards of living and generally healthier lifestyles. Also, certain age groups have seen higher rates of mortality improvement than others. This phenomenon, known as the "cohort effect", has resulted in the actuarial profession developing more robust statistical techniques to predict future longevity.

The P-spline model is a statistical technique that has gained wide acceptance to date both within the industry and across academia and preferred embodiments of aspects of the present invention utilise the P-spline model to forecast longevity. However, any suitable statistical longevity projection technique may be utilised, such as, Cairns, Blake and Dowd's model and the Lee-Carter model. The following will be discussed below: the development in the Continuous Mortality Investigation (CMI) bureau Working Papers of the P-spline model for forecasting longevity, how to use the P-spline model, which data sources are appropriate to provide a suitable reference population and key issues to be aware of regarding the use of the model. The practical issues surrounding longevity and a step-by-step process for producing a mortality table will also be discussed. Overall, the P-spline model projections are more conservative (i.e. project greater improvements in longevity) and are generally accepted to be more accurate than previously published projections by the CMI.

In preferred embodiments of aspects of the present invention, once the mortality tables with the future mortality rate projections have been constructed according to the P-spline model, the capital requirement to cover longevity risk exposure of a financial instrument according to the present invention can be estimated. In preferred embodiments, the capital requirement is calculated by ensuring sufficient capital is held so that the liability is covered in the worst case longevity scenario. The worst case scenario is calibrated in differing ways depending on whether the product being offered is to be rated by either Standard & Poor's and Fitch or Moody's ratings agencies.

If the product being offered is to be rated by Standard & Poor's or Fitch to have a certain rating, the worst case scenario is preferably calibrated to the default probability of an equivalently rated bond.

If the product being offered is to be rated by Moody's to have a certain rating, the worst case scenario is preferably calibrated to the expected loss of an equivalently rated security.

The drivers of longevity improvements will now be discussed.

Figure 17:
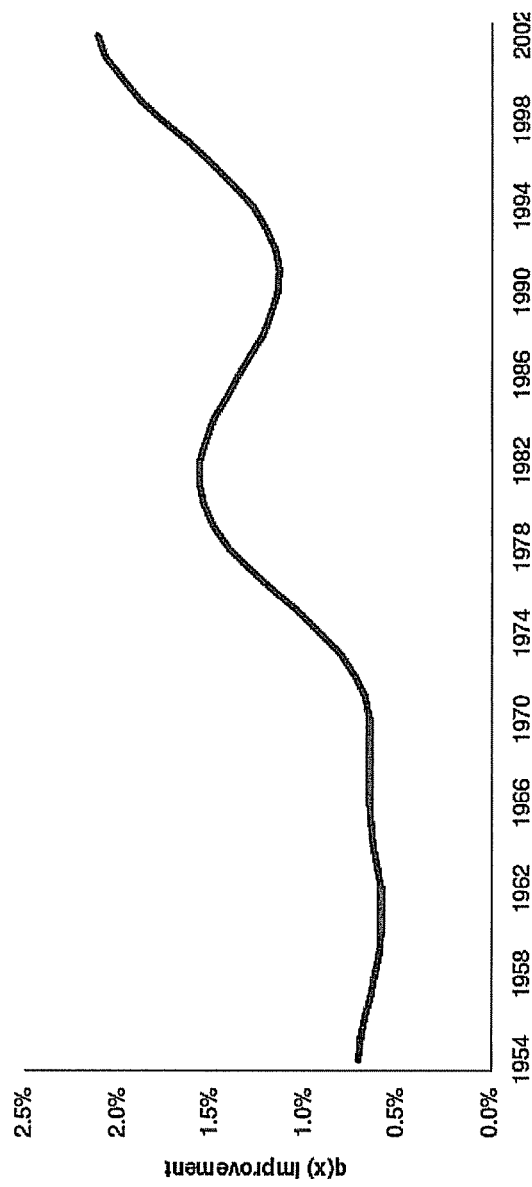
FIG. 17 shows the annual percentage decline in mortality rate for males aged 20-90 from the ONS data.

Over time we observe that mortality rates decline, and so average life-spans increase. This trend is driven by a combination of factors including incremental improvements in health care, rising standards of living (for example better insulated housing), changing lifestyles (for example a decline in smoking rates), and incremental public health initiatives (for example stricter regulation of air pollution). All of these drivers tend to result in gradual declines in mortality rather than step changes. For example, we typically observe that rather than eliminating broad classes of diseases in one go, new drugs tend to be effective against narrow classes of illness (e.g. one form of liver cancer) or deliver a higher success rate than their predecessor. Consequently the rise in longevity should be viewed as the compounding effect of a large number of incremental improvements. This longevity improvement trend is illustrated in FIG. 17 which shows the annual percentage decline in mortality rate (q(x)) for the male population aged 20-90 based on smoothed data from the Office of National Statistics (ONS). If q(x) is the mortality rate, then FIG. 17 shows the percentage decline in the mortality rate from one year to the next.

Figure 18:
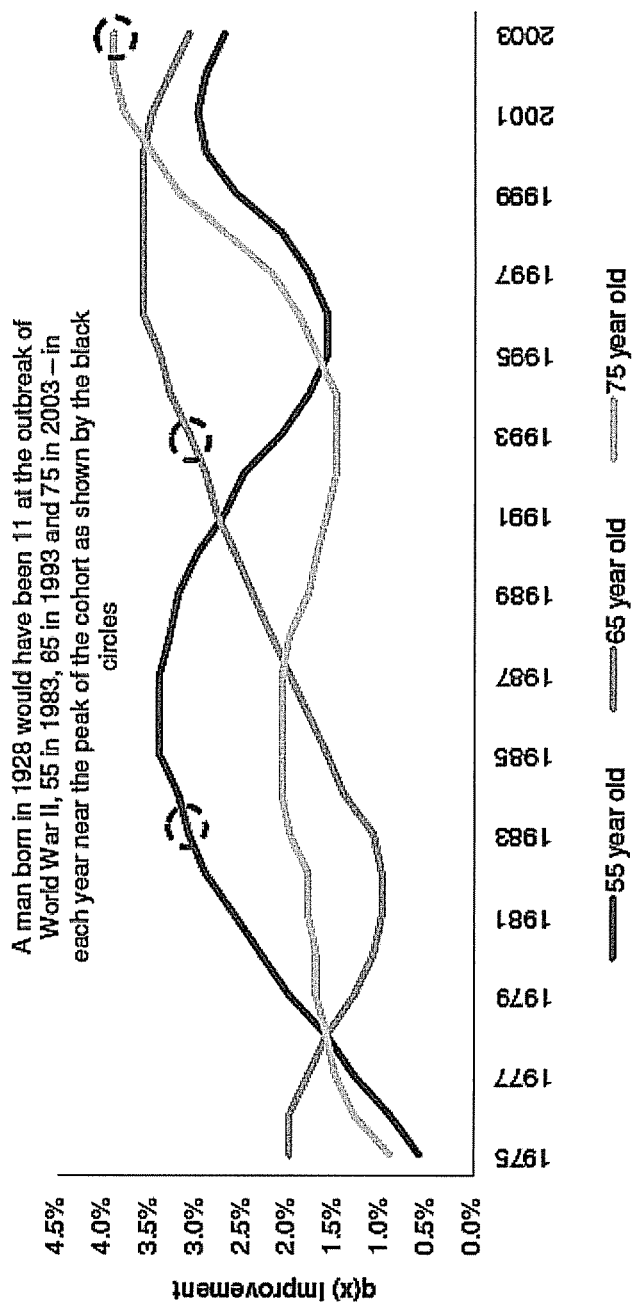
FIG. 18 shows the annual percentage decline in mortality rate for males by age-group from the ONS data, illustrating the 'cohort effect'.

Since the mid 1970s, there has been observed an acceleration in the rate of mortality improvement in the UK. FIG. 18, which breaks out this rate of improvement and shows the annual percentage mortality decline by age-group for males aged 55, 65 and 75. FIG. 18 shows that they have been particularly driven by specific groups of people: 55-year olds in the late 70's and early 80's; 65 year-olds in the 90's and 75-year olds now. This reflects a phenomenon known as the 'cohort effect' which observes that the cohort born between 1925 and 1945 experienced especially marked improvements in their longevity. Of course the subsequent generations that followed this cohort would show relatively low rates of mortality improvements being measured off the low mortality rates of the 1925-45 cohort. But the 1925-45 cohort also saw significantly greater improvements in mortality (relative to their predecessors) than prior cohorts. In preferred embodiments it is, important that the "cohort effect" is accounted for in projecting mortality rates.

The P-spline methodology for projecting improvements in longevity in accordance with preferred embodiments of aspects of the present invention will now be described. The use of a statistical longevity projection model, such as the P-spline, according to aspects of the present invention is to project trends in improvements in mortality in a suitable reference population in order to produce individual mortality tables to project with greater confidence the mortality of each of the members of the pension scheme into the future, and to calculate the expected cash flows of the financial instrument and the capital requirement on that basis.

Historically, pension liability valuations were based on mortality tables produced from actual experience and a flat mortality assumption which does not allow for improvements in mortality. Such an approach was found not to be conservative enough and, as a result, these mortality tables have been extended to allow for mortality improvements linked to the 'cohort effect'. These interim adjustments to the tables were essentially to 'roll forward' the trend improvements in longevity seen in previous years. However, these adjustments tend not to be grounded in rigorous statistical theory but are based on expert judgement by actuaries and are subjectively set by choosing a range of projection bases. These arbitrarily chosen tables have been found to probably be not sufficiently prudent.

In view of this, the industry has recently taken major steps forward in establishing more rigorous statistical underpinnings to mortality projections. The P-spline model is the statistical technique that has the widest acceptance among industry experts, academics and the larger and more sophisticated insurance companies. In various aspects of the invention, the P-spline is the preferred methodology for projecting longevity. However, further research is continuing on a range of other statistical models such as the Lee Carter model, or the Cairns, Blake and Dowd model, which may also be used to project longevity in conjunction with the present invention.

A spline is a function defined piecewise by polynomials. Splines are generally used for interpolation or smoothing of data sets (e.g. to derive a complete yield curve using points on the curve). Further discussion of splines in general can be found in Eilers P and Marx D., 'Flexible smoothing with B-splines and penalties', Statistical Science, Vol. 11, No. 2, p. 89-121, 1996. Further detail on the application of P-splines specifically to mortality data can be found in Currie I., Durban M. and Eilers P., 'Using P-splines to extrapolate two-dimensional Poisson data', Proceedings of 18th International Workshop on Statistical Modelling, Leuvan, Belgium, p. 9'7-102, 2004, and CMI, 'Projecting future mortality: Towards a proposal for a stochastic methodology', Working paper 15, July 2005. These documents are incorporated herein by reference.

In general, when fitting polynomials to observed data, the higher the degree of polynomial that is used, the better the fit. However, it is not always desirable to use a high degree polynomial as this can often lead to 'over-fitting' and to poor predictive stability outside of the observation period. Instead, the P-spline calculates what is known as a 'penal spline': by applying a penalty to increasing degrees of polynomial it trades off parsimony in estimated coefficients for accuracy of fit. If we choose a small penalty we follow the data closely, and the possibility of over fitting is in this case lurking. On the other hand, choosing a very large penalty leaves very little room for following the data. There is a trade-off between smoothness-of-fit and goodness-of-fit. Any of the common criteria for optimising smoothness versus goodness-of-fit can be used, such as the Bayesian Information Criterion (BIC) or the Akaike Information Criterion (AIC).

The other way in which a P-spline differs from a simple spline is that it can be carried out over two dimensions. In other words, rather than fitting a curve to a set of observations, the P-spline fits a surface to a two-dimensional array defined by age and year of observation.

One important choice which needs to be made in using a P-spline is whether to use an age-period or age-cohort spline. The former projects mortality rates based on historical patterns observed by age group and year of observation. The latter projects mortality rates based on patterns observed by age group and by cohort. In the invention, the strong cohort effect which is apparent in the UK longevity data leads the age-cohort model to be preferred. The age-cohort central projection has be found to be more conservative than the age-period central projection.

The P-spline model reads in data on historical observations for deaths and for the population as a whole, and fits a P-spline to the resulting death rates. The model then projects the P-spline forward in time to deliver projected mortality rates into the future. Finally, the model also delivers standard errors of the fit, indicating the goodness of fit. In aspects of the invention these standard errors are then used to estimate the capital requirements to cover longevity risk.

An example of using the P-spline methodology to project longevity in the UK dataset in accordance with a preferred embodiment of the invention will now be described using the age-cohort model only.

The goal is the construction of a longevity mortality table and this process will be described step by step. In this example, the approach taken to P-spline modelling in CMI Working Paper 20 (which is incorporated herein by reference) is followed. This paper concludes that the interim cohort projections show a lower pattern of observed mortality improvements in comparison to the P-spline model. The P-spline methodology is better able to project forward the actual improvements as more recent data becomes available. However, it cautions that care is needed in the choice regarding the dataset selected for a reference population and the parameters and penalties used.

When running the P-spline model, key considerations are the selection of an appropriate data set and P-spline knot placement. A knot is a point where the polynomials making up the P-spline are joined. The CMI recommends a minimum of 20 consecutive years of data spanning an age range of at least 40 years. Additionally, there needs to be sufficient number of deaths and exposures for each age in each year. A minimum number of 1,000 lives (exp) and 30 deaths in each data cell by year and age is preferred. The knots of the P-spline should be placed to ensure that no polynomial piece in the fitted splines spans both the data and the projected region. The best way to ensure this is to place knots at the leading edge of the data. Knot locations will need to be changed as new years of data become available and the model is updated.

The first step is to select an appropriate data set of actual mortality experience for a reference population for which the P-spline model can be used to project mortality improvements. The data set should meet these minimum requirements outlined above. In the UK, for example, there are two main sources for mortality experience data:

1. Continuous Mortality Investigation (CMI) provides mortality data for male assured lives from 1947 to 2005 covering ages 11 to 100. The CMI started collecting female data from 1975 to 2005. However, prior to 1983 the data was collected in aggregate age and year bands. Furthermore, the data is very limited at higher ages (above 70 years). These factors make the female data unreliable for mortality projection. The CMI data covers the UK insured population which is generally a more affluent segment of the total population. The insured population has lower mortality rates compared to the UK population and have experienced stronger mortality improvements in the past.
2. Office for National Statistics (ONS) provides mortality data for the populations of England and Wales from 1841 to 2003 for ages 0 to 110 for both males and females.

In this example, the CMI data has therefore been used for projecting mortality as this better reflects the population underlying the liabilities of an exemplary pension scheme and is more prudent. However, special treatment has to be made for female mortality projections. the female CMI data set does not have a large enough population at high ages to be considered. Therefore, to provide mortality rates for females the female ONS data set and the male ONS data set were also analysed. The female improvement factors can therefore be calculated by taking the difference between ONS male improvement factors and ONS female improvement factors to adjust the CMI male improvement factors.

In the CMI data set only ages 20 to 90 are used for projecting mortality because members of a pension scheme will be of working age, making mortality projections for younger ages irrelevant. Ages above 90 are not considered due to small exposures at these ages. Although the ONS data set is a larger data set both in time spanned and number of lives covered there are some difficulties in applying the data set to data in the early years. Years prior to 1953 have not been considered due to difficulties with the data especially around World War I and World War II. Specifically, some approximations and estimates had to be made to the number of deaths in the periods 1914-1920 and 1939-1949 due to lack of accurate data. That said, there is more than 50 years of data to work with, which is sufficient for projection purposes.

Next, the step of running the P-spline model to project mortality improvements in the selected reference dataset will be discussed.

In this example, CMI's recommended default parameters and calibration data set (covering ages 21 to 90 and years 1947 to 2005) have been used (see CMI Working Paper 27, July 2007, incorporated herein by reference). For all of the P-spline fits, cubic splines and a penalty order of two have been used. The knots have been placed on both corners of the leading edge of data. In practice this means that there are knots at age 21 and 90 and on the last year of data. The projections have been performed for 100 years into the future, e.g. to 2105 for base year projections from 2005. Changing the number of years projected may affect the fit.

Table 2 presents the parameters used for the age-cohort penalties model based on the data set that results in a high goodness of fit and prudent results.

TABLE 2

|  | CMI assured lives males |
| --- | --- |
| Calendar year range | 1947-2005 |
| Age range | 21-90 |
| Knot spacing: | |
| Age dimension | Every 3 years |
| Cohort dimension | Every 3 years |

Several sense checks are run on the model's output; the model outputs the Bayesian Information Criterion (BIC) which is optimised over the penalty weights (the lower the number the better). Analysis confirms that, when using the CMI data, a BIC of 7,600 has produced reliable results. This also agrees with results of a study by Cairns et al who produced a BIC number of 9,300 on a slightly different data set when using a P-spline model. A second check performed is to verify that the standard error (S.E.) terms are not excessive over the whole period, but most importantly to monitor the later years in the projection.

Next, to produce the projected mortality table, the projected improvements in longevity from the P-spline model are applied to a base mortality table for that reference population. In this example, the base table is the latest full table published by the CMI, the PNMA00 table. This is defined as the Life Office Pensioners, Males, Normals for the year 2000. This mortality table is fitted to the combined mortality experience of all pension business written by insurers including both deferred and immediate pensions. The year-on-year improvements from the P-spline model are then applied from this year going forward.

Figure 19:
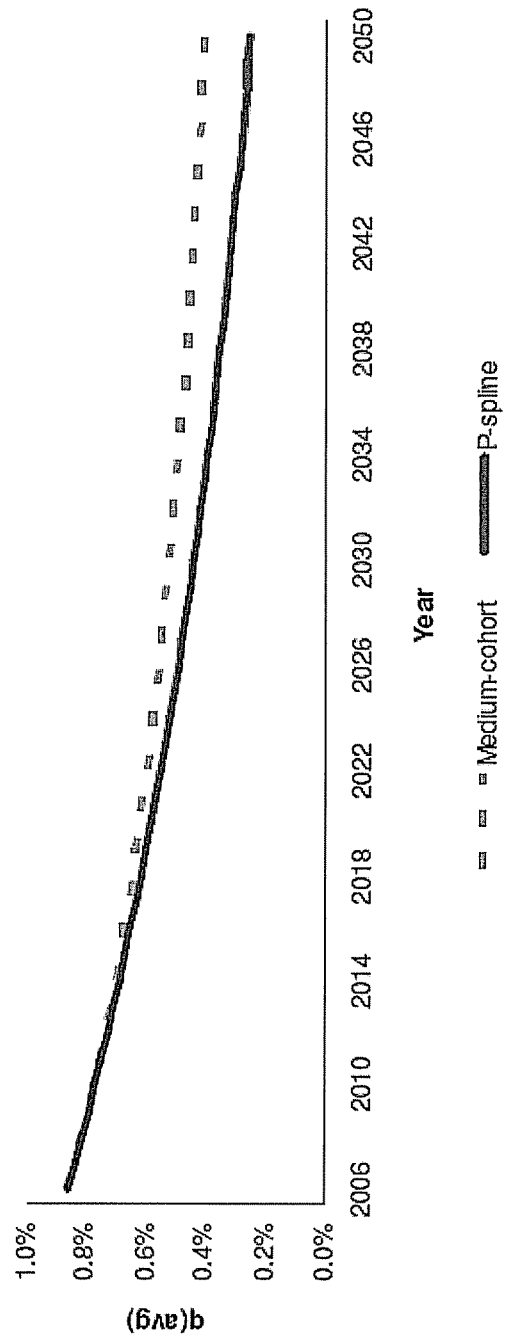
FIG. 19 shows a comparison of P-Spline and CMI adjusted mortality rate projections averaged for a representative 'basket' of males aged 55-90.

FIG. 19 shows a comparison of the weighted average P-spline model longevity projections for males aged 55-90 and the previous CMI published projections (the 'Medium Cohort' table). Overall, the P-spline projections are more conservative (i.e. project a greater rate of improvement in mortality rates) than the Medium-Cohort projections.

The resulting improvements in mortality projected by the statistical longevity projection model, such as the P-spline model used in this example, can be validated by carrying out a 'what if' or back testing analysis. This can be performed by using statistical longevity projection model to fit data at a point in past history and assess the adequacy of the best estimate capital requirement of a sample portfolio of pensioners and the worst case capitalisation at a required (AAA/Aaa) confidence level by comparing the projected liability with the actual liability in the full-run off of the portfolio of pensioners using actual mortality experience for the projected period.

The resulting improvements in mortality projected by the statistical longevity projection model can also be validated by performing a comparison of those results with the results of a qualitative analysis of the trends in mortality improvements in the reference population. This qualitative analysis may take into account the effect on longevity of factors such as historical longevity trends, uncertainty, socio-economic factors, behavioural factors, gender issues, mortality by cause of death, and medical discovery risk. For example, one can ask the question, what would be the improvement in longevity if there were a significant reduction in obesity or a cure for cancer were suddenly discovered, and compare those effects with the projections of the qualitative model. The qualitative analysis thus far conducted on the CMI data for the UK have confirmed the appropriateness of and outputs from the quantitative forecasting models of embodiments of aspects of the present invention.

Modelling and Adjusting Mortality Tables for Mortality 'Level'

The methodology of aspects of the present invention of taking into account the mortality level risk associated with the particular pension scheme membership in the calculation of mortality projections for the individual pension scheme members, in addition to the trend projections described above, will now be described.

Level risk is the risk that a particular pension scheme membership has a different level of mortality risk compared with that of the reference population on which the mortality table incorporating the quantitative mortality trend projections is based. In the example given above, that is the risk that the pension scheme membership has a different level of mortality risk compared with that of the general UK insured population as a whole (as evidenced by CMI mortality data) which forms the basis for the longevity projections.

The approach taken to level risk is granular in that, in embodiments, it involves analysis of life expectancy profiles based on full postcode/zipcode geographical analysis, and where possible drilling down to residents of individual households. That is, there is no averaging assumption and the impact of mortality level differentials is incorporated at the level of the specific pension cash flows of individual members, and the approach is thus granular.

Mortality level adjustments are calculated for every individual in the reference portfolio (by reference to his or her age, sex, lifestyle, pension size and even postcode) and incorporated into each individual's pension cash flows—i.e. at the most granular level possible. These level adjustments are produced as a result of an analysis of the effects on mortality of the different socio-economic factors and the calculated adjustment for each member may be incorporated into the mortality table produced by the statistical longevity projection model by way of a multiplication factor, an addition, a subtraction, or some other function of varying the mortality rate contained therein.

As for quantum, the aggregate of all level adjustments has been found to have a small impact on the Net Present Value of a reference portfolio's liabilities—the impact may vary from one reference portfolio to another but is likely to be less than 5% for the majority of pension schemes, on the basis of current studies.

The socio-economic characteristics that are taken into account in the level risk adjustment may be at least one of the following: age, gender, pension size, socio-economic class, smoking status, geographical lifestyle mapping, zipcode/postcode, seasonality based on date of birth, taxation level, real estate ownership level, family status, marital status, number of dependents and occupational industry.

Longevity Capital Assessment Methodology

The longevity capital assessment methodology of aspects of the present invention which is used to estimate the capital requirement to cover longevity risk will now be described.

As discussed above, this estimation of the capital requirement is calculated by ensuring sufficient capital is held so that the liability is covered in the worst case longevity scenario and that the worst case scenario is calibrated in differing ways depending on whether the product being offered is to be rated by either Standard & Poor's and Fitch or Moody's ratings agencies. Thus the preferred approach to longevity capital assessment for Standard & Poor's and Fitch rated financial instruments will be discussed first, followed by the preferred approach for Moody's rated financial instruments.

Ratings Method for Quantifying Longevity 'Trend' Risk

For a Standard & Poor's or a Fitch rated financial instruments, in preferred embodiments of aspects of the invention, the approach is to hold sufficient capital to ensure that the probability of default (i.e. cumulative probability of default) is lower than that observed for corporate bonds of the target debt rating. Thus, the capital estimates of the longevity capital assessment are anchored on a calibration of Standard & Poor's or Fitch's rated corporate bonds. In the example given below, the estimation of the capital requirement to achieve a rating from Standard & Poor's rating agency is described.

Figure 20:
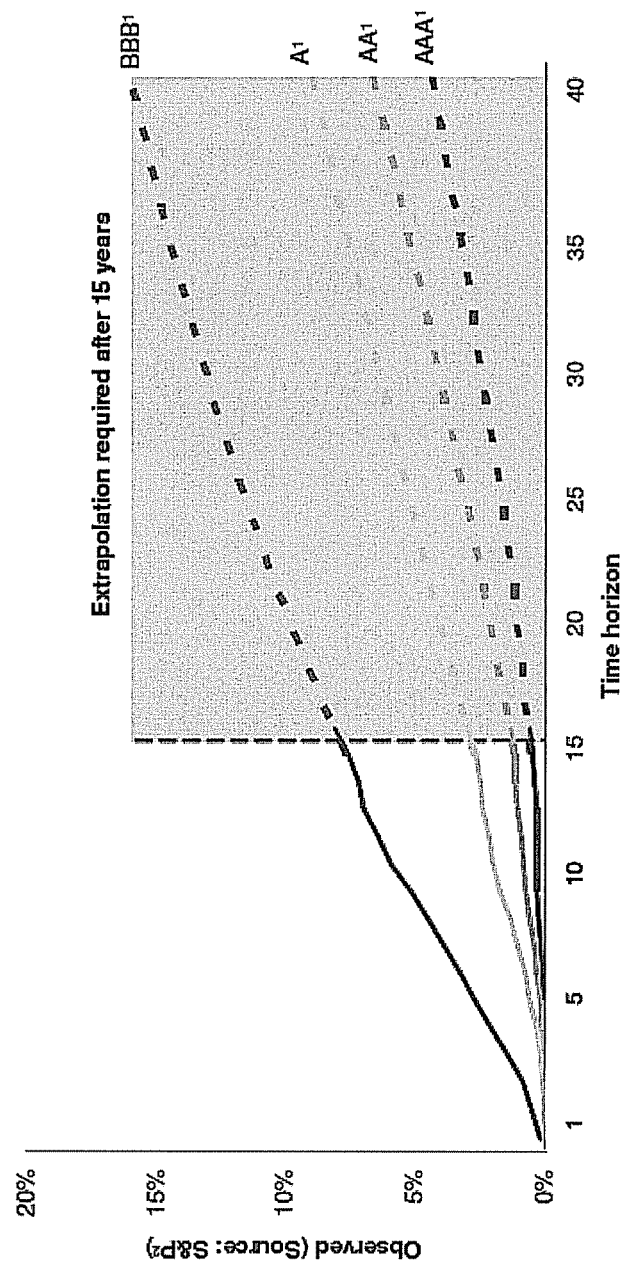
FIG. 20 shows a plot of the estimated default probabilities, which are derived from Standard & Poor's data for AAA, AA, A and BBB rated corporate bonds.

FIG. 20 shows the estimated default probabilities, which are derived from Standard & Poor's data for AAA, AA, A and BBB rated corporate bonds and extrapolated beyond 15 years based on the appropriate rating transition matrices. As one would expect, these rise over time. In the invention, the approach is to ensure sufficient capital is held so that the default probability is lower than the relevant bond class at all time horizons. In this sense the capital calibration according to the invention is very conservative since at all horizons other than the binding time horizon our default probability will be lower than that of an equivalently rated bond.

In order to calculate the capital requirement for any given time horizon, two different approaches are possible, both are within the scope of aspects of the invention.

The primary and preferred approach is the deterministic approach, which is based on applying stress tests of the appropriate size to the cash flow projections and observing the resulting impact on liability valuations.

The other approach is the stochastic approach, in which stochastic longevity shocks are simulated and the portfolio is re-valued for each one. By observing the tail of the resulting distribution we can calculate the required capital.

Both of these approaches give the same estimate for economic capital. However, the advantage of the stochastic approach is that it provides greater flexibility—for example allowing us to estimate the 'tail' value-at-risk (VaR) as well as straightforward VaR. These two approaches will now be described in turn in more detail.

Deterministic Longevity Trend Risk Quantification Method

For any given time horizon, the deterministic approach essentially involves answering the question "How much capital do we need to hold to withstand the worst case shock which arises with a probability of no more than x %?" where x is our target default probability for the given time horizon. So, for example at a 5 year time horizon, we know that the default probability of a AAA rated bond is 0.10%. Therefore, if we can identify the longevity shock which arises with this probability then we can use this to calculate how much capital is needed.

Figure 21:
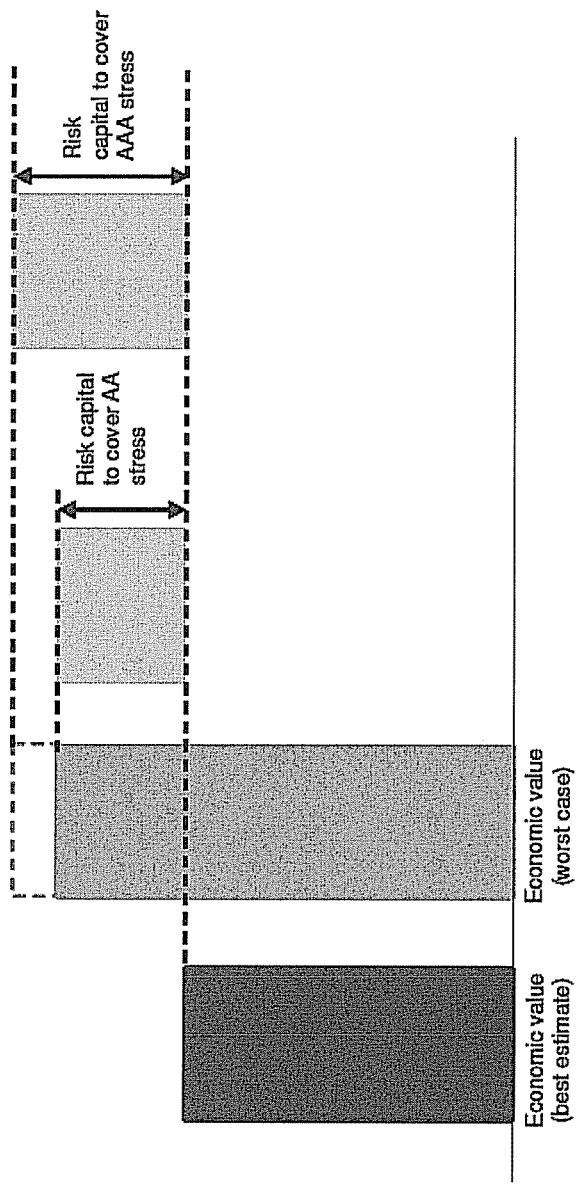
FIG. 21 shows an illustration of the calculation of the required capital to cover different stresses based on the difference between the best estimate liability value and the shocked liability value.

The required capital is then calculated as the difference between the 'Best estimate' value of the pension liabilities and the shocked value of the pension liabilities at the relevant confidence interval. FIG. 21 illustrates this calculation.

Figure 22:
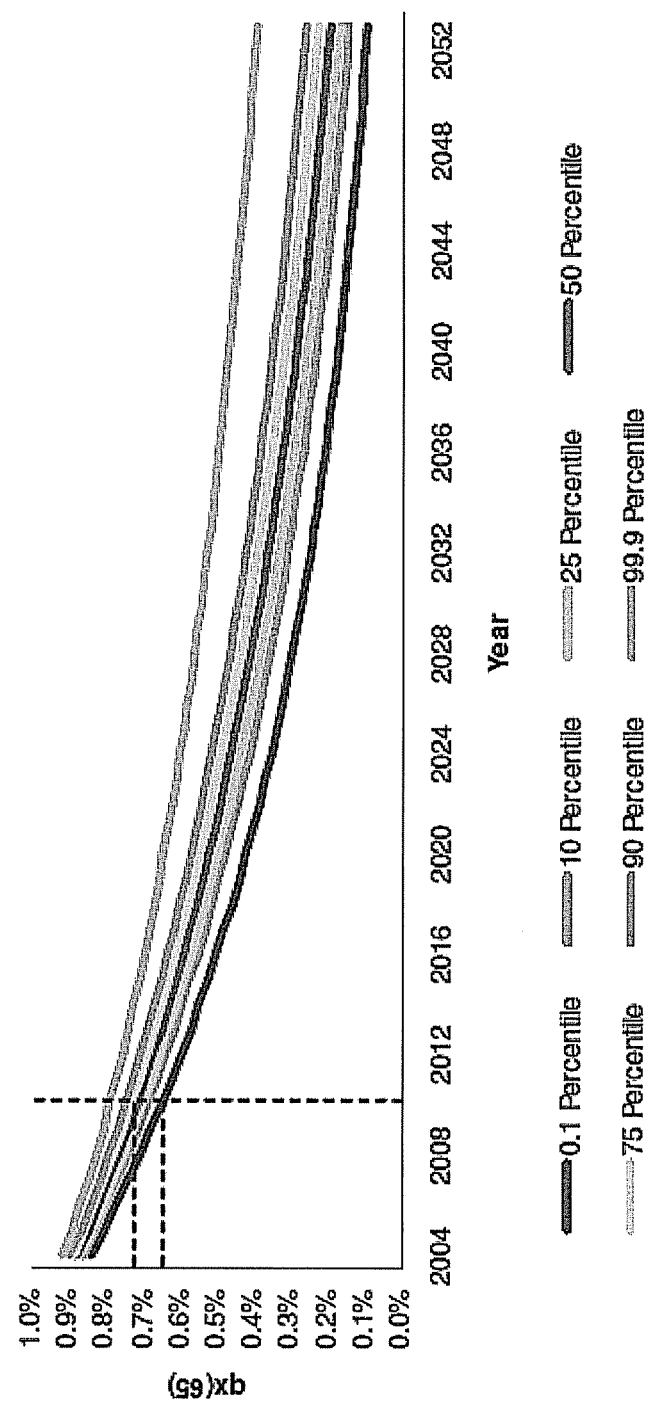
FIG. 22 shows the confidence intervals around the P-Spline Best Estimate for the mortality rate projections for a 65-year-old male.

As discussed above, an advantage of the P-spline approach used in preferred embodiments of aspects of the invention is that as well as producing a 'best estimate' of future mortality rates, it also produces confidence intervals around that best estimate. As an example, FIG. 22 shows these confidence intervals for a 65-year old male. In the best estimate, the annual probability of death drops from 88 basis points (bps) to 74 bps over the first 5 years. But in the worst case it drops to 68 bps.

Figure 23:
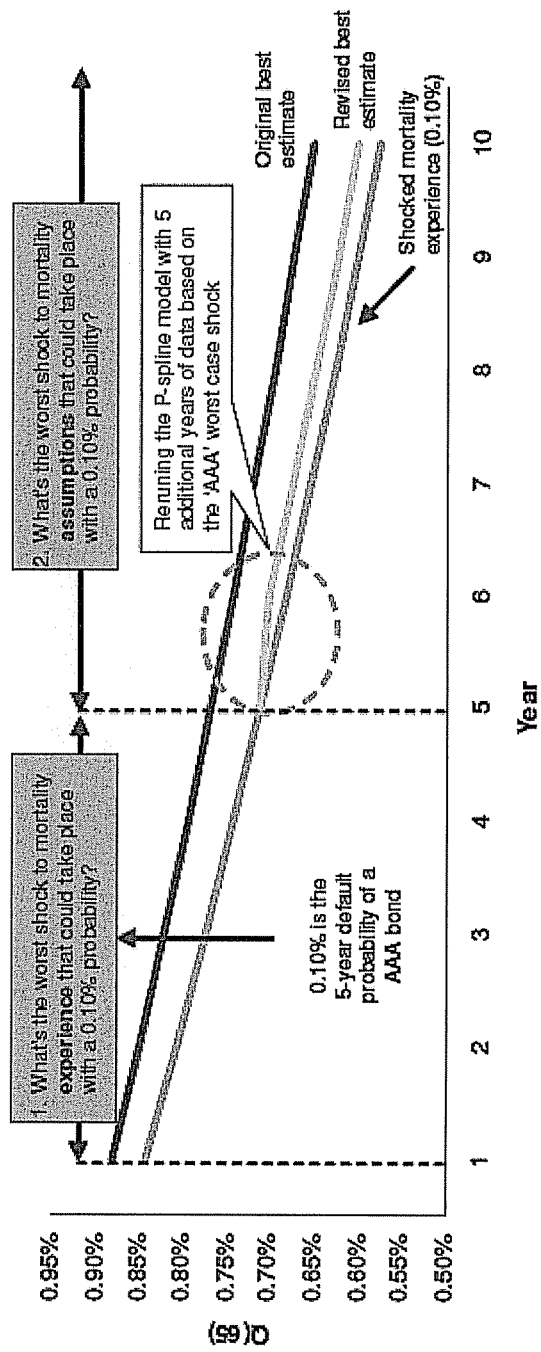
FIG. 23 shows an example of a shock scenario using a 5 year time horizon.

To apply these stressed mortality scenarios to the capital calculation; there needs to be estimated what the impact of such a shock would be over the relevant time horizon. Taking again the example of a 5 year time horizon, FIG. 23 shows for a 65-year-old male the two impacts that 5 years of shocked mortality experience would have on our liability valuation.

The first impact is via the lower mortality experience during those 5 years. The fact that fewer people than expected die in years 1-5 means that more pension payments have had to be paid out during those years and, other things being equal, more will have to be paid out in future years for the people who were expected to die during years 1-5 but who didn't.

The second impact of the shock is via its effect on the assumptions made about future mortality rates. If lower mortality rates are observed over a sustained period of time, the future longevity projections also then need to be revised. Therefore the P-spline model must be re-run at year 5, taking account of the bad news experienced from years 1-5 as well as the historical data prior to that. These revised expectations are shown by the 'revised best estimate' line in FIG. 23.

The capital required to withstand the worst case shock over a 5 year time horizon therefore entails revaluing the liabilities under the shocked mortality rates for the first 5 years but also taking account of the revised expectations for the subsequent run-off period.

This is shown in FIG. 23, again for a 65-year-old male, where the qx(5 year shock) line represents the mortality assumptions underlying the 5-year shock. During the first 5 years, the mortality rates are the fully shocked once. Beyond year 5, the mortality assumptions are based on the revised forecast using the P-spline.

FIG. 23 also shows a 1-year shock, where the qx(1 year shock) line represents the mortality assumptions underlying the 5-year shock. Relative to the 5-year shock it is much more extreme: the default probability of a AAA rated bond at a 1-year time horizon is much lower than a 5-year time horizon and so this probability corresponds to a more extreme mortality shock. On the other hand, a 1-year shock has a relatively short-lived impact on mortality projections. After 1-year of bad news, we (and the P-spline model) would allow for the possibility that this is just a temporary 'blip' (perhaps caused by e.g. a warmer winter) and so the revised future expectations would be quite close to the original best estimate. By contrast, the 10-year shock, which is represented by the qx(10 year shock) line, is a less extreme shock than the 5-year one. But because it is long-lasting, it is almost entirely incorporated into future expectations, as can be seen from the fact that there is only a very modest kink at year 10.

Recalling that, according to aspects of the invention, the approach to assessing longevity capital is to ensure sufficient capital is held so that the default probability is lower than the relevant bond class at all time horizons, the worst binding time horizon in terms of liability valuations must be determined. However, it is clear from FIG. 23 that it is not possible to say 'a-priori' which time horizon is the worst one in terms of liability valuations. In this example, and in practice, that the worst time horizon has been found to be generally in the region of 6-8 years. However, this will vary by portfolio characteristic (the binding time horizon for older individuals tends to be shorter than for younger individuals). The preferred approach is to test all the relevant time horizons for any given pension portfolio and take the most penal (i.e. worst) one.

The results of this binding time horizon testing process for this example are shown in Table 3, which shows the Net Present Value (NPV) of the shocked value of the liabilities for a confidence interval for an AAA-rated equivalent bond at different time horizons.

TABLE 3

|  | Best estimate | Shocked liability value (AAA confidence interval) | | | | | | | |
| --- | --- | --- | --- | --- | --- | --- | --- | --- | --- |
|  |  | 5 yr | 6 yr | 7 yr | 8 yr | 9 yr | 10 yr | 15 yr | 30 yr |
| NPV £MM | 12.10 | 12.729 | 12.730 | 12.732 | 12.729 | 12.726 | 12.723 | 12.692 | 12.573 |
| Capital | NA | 5.20% | 5.21% | 5.22% | 5.20% | 5.17% | 5.15% | 4.89% | 3.91% |

In this example, the best estimate value of the liabilities is £12.10 mM. Looking at different time horizons, the shocked liability ranges from £12.573 mM upwards, with the binding (i.e. worst) time horizon is 7 years. In other words if sufficient assets are held to cover this stressed liability value of £12.732, then the default probability on the liabilities is lower than that of a AAA-rated bond not only over a 7-year time horizon but over all other horizons as well.

Preferably, a full re-running of the P-spline model following each shock is not conducted. P-spline modelling can be made much more flexible by taking an approximation of the revised expected mortality rates following the shock.

Stochastic Longevity Trend Risk Quantification Method

Figure 24:
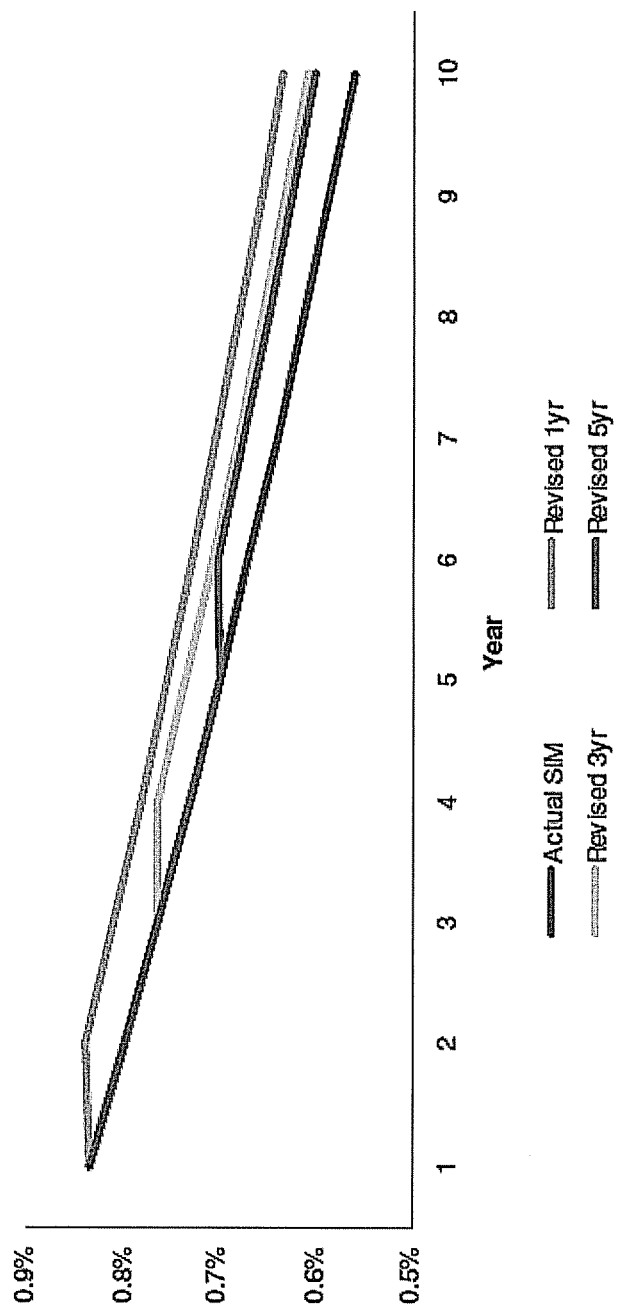
FIG. 24 shows a calculation of shocked mortality rates for different time horizons for a single stochastic draw.

Turning now to look at the stochastic approach to calculating longevity capital, which builds very much on the deterministic approach described above. Under the stochastic approach mortality shocks are randomly simulated using the P-spline percentiles shown in FIG. 22. For any given stochastic simulation and any given time horizon, the experience impact (i.e. the simulated mortality rates up until the time horizon) is then separated out from the assumptions impact (i.e. the effect that the simulated mortality up to the time horizon has on projected future mortality rates). This is shown in FIG. 24, which illustrates calculations of shocked mortality rates for different time horizons for a single stochastic draw. Here, for different time horizons any particular simulated path is applied in full up to the time horizon and then in part (via its effect on future expectations through re-running the P-spline) beyond the time horizon. While FIG. 24 illustrates mortality rates for a single age group only, it is important to appreciate that in practice, a simulation entails shocking mortality rates across all ages (and both genders).

Figure 25:
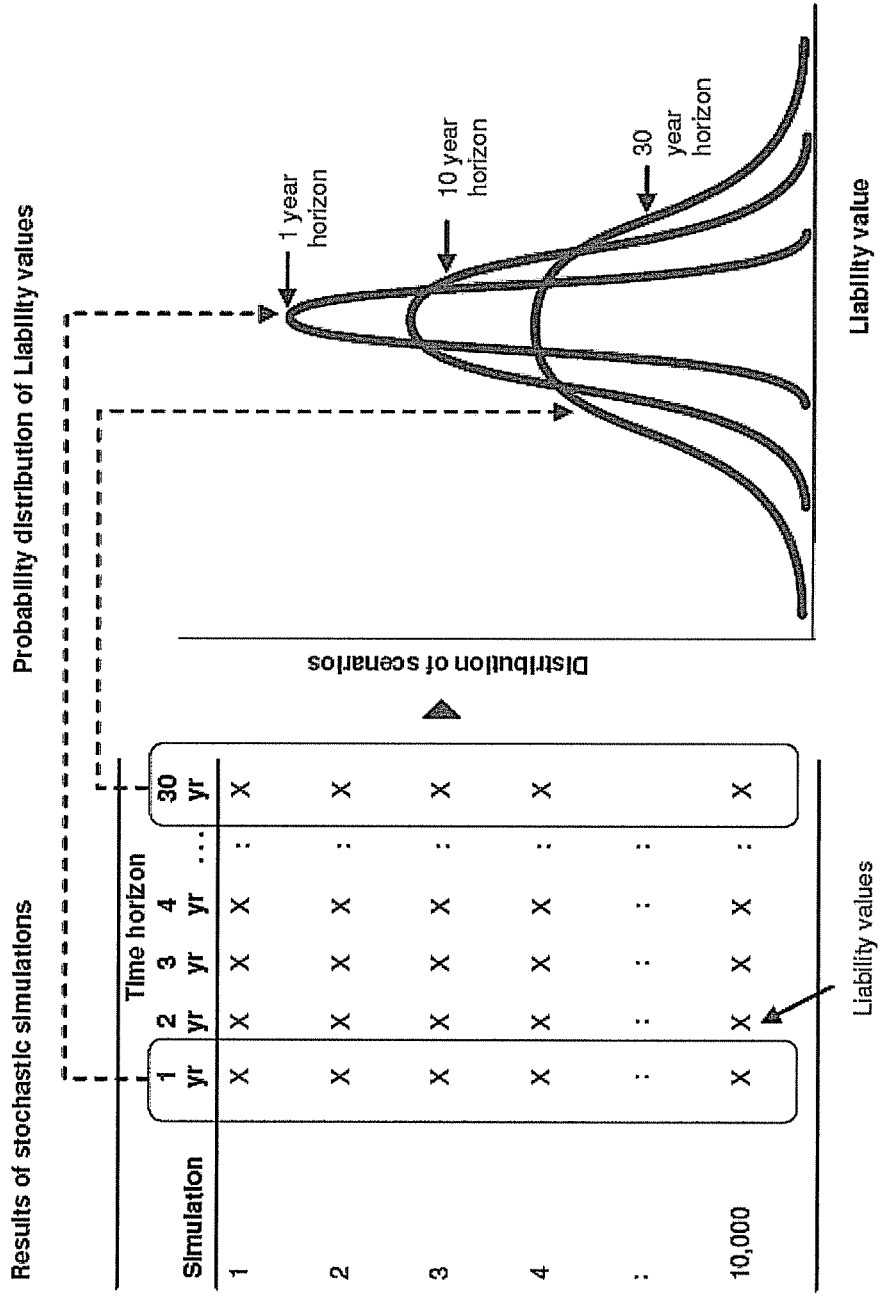
FIG. 25 shows the results of a stochastic simulation process.

Having run the stochastic simulations and valued the liabilities for each time horizon for each simulation, a probability distribution to be plotted for the liability values at each time horizon. This is shown in FIG. 25. The one-year shocks are short-lived and expectations are only modestly affected, giving a narrow distribution, whereas the 30 year shocks naturally give a much wider distribution.

In accordance with aspects of the invention the required capital can then be found by looking at the appropriate tail of the distribution. So, for example, to have a lower default probability than an equivalent AAA bond over a 1-year time horizon, for which, according to the default calibration, the probability of default is 1 basis point, sufficient capital would need to be held to cover this 1 basis point shock on the narrow 1-year distribution. By contrast, to justify a AAA rating over a 5 year time horizon, for which the probability of default is 10 basis points, to find sufficient capital we do not need to go so far into the tail of the distribution as for the 1 year horizon, but the 5-year distribution itself is much wider.

As with the deterministic approach, in the stochastic approach it is hard to say a priori which time horizon will give the highest capital requirement. In practice, however, since this approach gives identical capital requirements to the deterministic approach, the binding horizon will typically be in the range of 6-8 years.

The assessment of longevity capital for a Moody's rated product in accordance with aspects of the present invention will now be discussed.

For a Moody's rated product, in preferred embodiments of aspects of the invention, the approach is to hold sufficient capital to ensure that the expected loss is lower than the Moody's idealized loss rates for the target debt rating. Moody's idealized loss rates are shown in Table 4. As one would expect, loss rates rise over time. In the invention, the approach is to ensure that sufficient capital is held so that the expected loss is lower than that of a security with the target Moody's debt rating at all appropriate time horizons. In this sense the capital calibration is conservative since the expected loss will be equal to that of an equivalently Moody's rated security for the binding time horizon and even lower at all other appropriate time horizons.

The approach to calculating the capital requirement for any given time horizon will now be discussed in relation to a Moody's rated product. Again, stress tests of the appropriate size (i.e. a longevity shock) are applied to the cash flow projections and the resulting impact on liability valuations is observed. In the case of a Moody's rated product we are essentially answering the question "How much capital do we need to hold to ensure the expected loss is no more than x %?" where x is the target expected loss (from the Moody's idealised loss rate table) for the given time horizon. So, for example, at a 5 year time horizon, the expected loss for a Aaa rated security is 0.0016%. Therefore the level of capital that results in an expected loss of no more than 0.0016% needs to be found.

In order to estimate the expected loss for a given level of capital the value of liabilities at all points in the tail of the distribution of liabilities needs to be known. This can be performed by stochastically simulating the Net Present Value of the liabilities. However, calculating the full distribution of the tail of this distribution is time consuming. In order to speed up our calculation, a distribution (for example, a normal distribution) is preferably fitted to the actual scheme liability distribution which produces almost identical results. Once liability distribution has been fitted to the stochastically simulated distribution the probability of exhausting the capital and the associated loss for any given level of capital can be calculated. Intuitively, as the level of capital is increased, the probability of exhausting the capital and the associated loss both decrease.

As in the approach to assessing the capital required for a Standard and Poor's and Fitch's rated product, for a Moody's product stressed mortality scenarios must be applied to the capital calculation by estimating the impact of the shocks over the relevant time horizon.

In this example, for P-spline model for a 65-year-old male, the best estimate of the annual probability of death drops from 85 bps to 73 bps over the first 5 years. But for a 0.1 percentile confidence interval shock the annual probability of death drops to 70 bps. Again, this shock has two impacts on the liability valuation: the lower mortality experience during those 5 years; and its effect on our assumptions about future mortality rates.

The binding time horizon which produces the worst case liability valuations must then be found in order to assess the longevity capital required to ensure that the estimated expected loss in that worst case scenario is no more than that of an equivalently Moody's rated security. Again, although it is not possible to say 'a-priori' which time horizon is the worst one in terms of liability valuations, in practice we have found that the worst time horizon is stable for different scheme profiles. We will check we have captured the worst case by looking at the sensitivity to the time horizon.

The method of calculating the expected loss for assessing the longevity capital requirement of a Moody's rated product in accordance with aspects of the invention will now be described.

TABLE 4

|  | 1-Yr | 2-Yr | 3-Yr | 4-Yr | 5-Yr | 6-Yr | 7-Yr | 8-Yr | 9-Yr | 10-Yr |
| --- | --- | --- | --- | --- | --- | --- | --- | --- | --- | --- |
| Aaa | 0.0000% | 0.0001% | 0.0004% | 0.0010% | 0.0016% | 0.0022% | 0.003% | 0.0036% | 0.0045% | 0.0055% |
| Aa1 | 0.0003% | 0.0017% | 0.0055% | 0.0116% | 0.0171% | 0.0231% | 0.0297% | 0.0369% | 0.0451% | 0.0550% |
| Aa2 | 0.0007% | 0.0044% | 0.0143% | 0.0259% | 0.0374% | 0.0490% | 0.0611% | 0.0743% | 0.0902% | 0.1100% |
| Aa3 | 0.0017% | 0.0105% | 0.0325% | 0.0556% | 0.0781% | 0.1007% | 0.1249% | 0.1496% | 0.1799% | 0.2200% |
| A1 | 0.0032% | 0.0204% | 0.0644% | 0.1040% | 0.1436% | 0.1815% | 0.2233% | 0.2640% | 0.3152% | 0.3850% |
| A2 | 0.0060% | 0.0385% | 0.1221% | 0.1898% | 0.2569% | 0.3207% | 0.3905% | 0.4560% | 0.5401% | 0.6600% |
| A3 | 0.0214% | 0.0825% | 0.1980% | 0.2970% | 0.4015% | 0.5005% | 0.6105% | 0.7150% | 0.8360% | 0.9900% |

In aspects of the invention the approach to calculating expected loss for the purpose of determining the longevity risk capital requirements is analogous to traditional Expected Loss (EL) calculations, as follows:

$$EL = PS \times LGS$$

Where: EL=Expected Loss
PS=Probability of Shortfall
LGS=Loss Given Shortfall

A shortfall occurs if the Net Present Value (NPV) of the actual liabilities at a given point in time exceed the sum of the 'best estimate' NPV of liabilities and capital held. Thus, shortfall can be expressed by the following equation:

$$\text{Shortfall} = \max(0, Liab_{actual} - (Liab_{BE} + \text{Capital}))$$

Where: $Liab_{actual}$=Actual NPV of liabilities
$Liab_{BE}$=Best estimate NPV of liabilities
Capital=Amount of capital held For example, if the initial best estimate of liabilities is £100, capital held is £8 and the actual liabilities are £110 then the shortfall is calculated as:

$$\text{Shortfall} = \max(0, 110 - (100 + 8))$$
$$= £2$$

The Probability of Shortfall (PS) is then defined as the probability that a shortfall occurs. That is, the probability that the capital held is not sufficient to cover the difference between the actual and best estimate liabilities. PS is analogous to probability of default in traditional expected loss methodology. Thus Probability of Shortfall can be expressed by the following equation:

$$PS = \text{Prob}(Liab_{actual} > (Liab_{BE} + \text{Capital}))$$

Where: $Liab_{actual}$=Actual liabilities
$Liab_{BE}$=Best estimate liabilities
Capital=Amount of capital held The Loss Given Shortfall (LGS) is defined as the average loss that occurs in the event that there is a shortfall expressed as a proportion of what would have been paid if the liability was covered in full and is analogous to Loss Given Default (LGD) in traditional expected loss methodology. Thus Loss Given Shortfall can be expressed by the following equation:

$$LGS = \text{shortfall/actual liabilities}$$

In order to produce an estimated expected loss, the Probability of Shortfall and Loss Given Shortfall must be estimated. In aspects of the invention, this is done by fitting a distribution (for example, a Normal distribution) to estimate the actual Net Present Value of Liabilities over the tail region.

From the 'fitted' distribution, the Probability of Shortfall can then be estimated for a given level of capital by calculating the probability that the actual liabilities exceed the best estimate liabilities plus the amount of capital held.

Similarly, to estimate the Loss Given Shortfall, the tail region of the 'fitted' distribution of liabilities can be sampled. For example, 500 random draws from the tail region can be performed and then calculate the expected loss as the average of these tail scenarios (a very large number of simulations is not required to achieve convergence as we are already sampling in the tail region).

Figure 26:
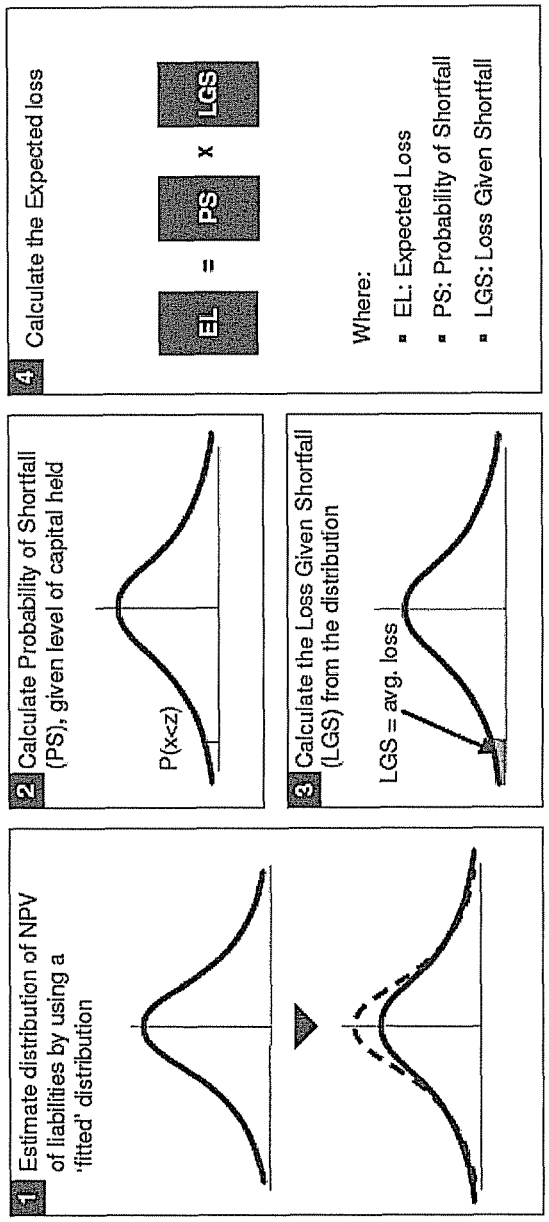
FIG. 26 shows the calculation of Expected Loss.
Figure 27:
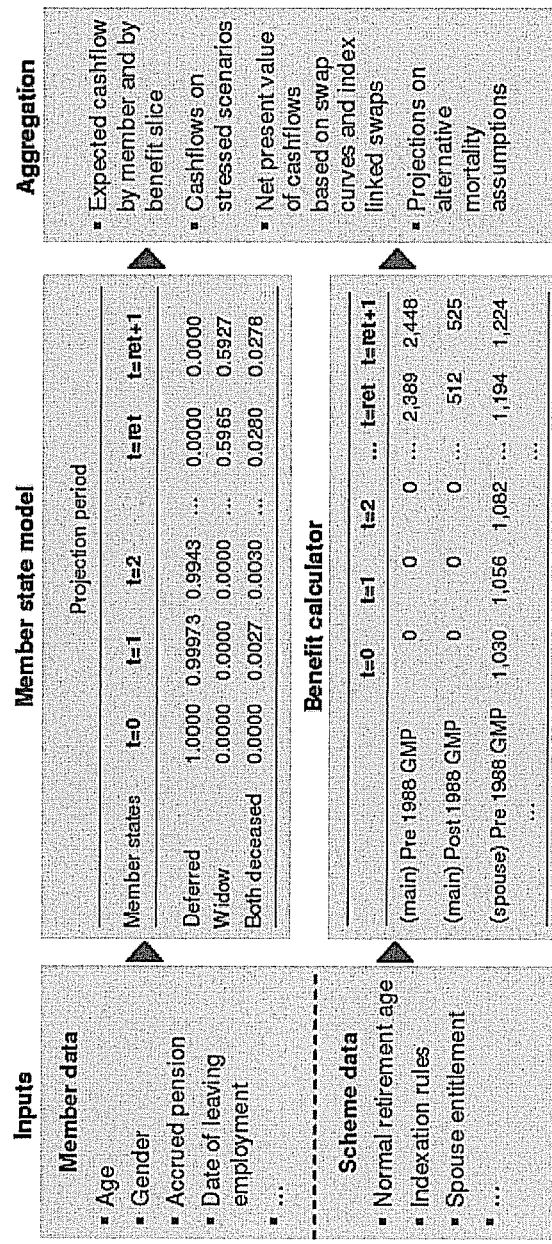
FIG. 27 illustrates the main elements of the Longevity Capital Model (LCM)

Thus, in aspects of the invention, the preferred approach to calculating the Expected Loss, as illustrated in FIG. 26, is as follows:

1. Fit a distribution to the scheme liabilities using an actual liability result under different longevity scenarios.
2. Calculate the Probability of Shortfall (PS) from the 'fitted' distribution, given the level of capital held.
3. Calculate the Loss Given Shortfall (LGS) from the 'fitted' distribution, given the level of capital held.
4. Calculate the Expected loss as EL=PS×LGS.

Thus the Expected Loss associated with a particular longevity shock can be calculated.

As described above, the methodologies set out above for determining the change in the NPV of the pension scheme liabilities and the Expected Loss in the case of a longevity shock that is projected by the statistical longevity projection model to occur with a certain probability can be used to quantify longevity risk quantify and price the longevity risk associated with the pension scheme generally. This can assist investors in understanding the longevity exposure of the financial instruments of the present invention.

It can also be specifically be applied to calculate the longevity risk capital required to support the issue of a financial instrument having a specific rating from a ratings agency.

The methodology can also be applied to calculate the size of subordinated tranches of capital such that they have subordinated debt ratings such as BBB or Aa1, Aa2 etc. This is calculated as the difference between the NPV of the pension cash flow liabilities for a longevity shock associated with a target rating for the tranche being sized, and the NPV of the pension cash flows for, for example, the a longevity shock associated with the rating of the next most senior tranche of issued capital. Of course, subordinated capital may be issued without a rating.

The methodology of aspects of the present invention can also be applied generally to quantify the longevity risk exposure of any asset or a liability having cash flows of sums of accounts receivable and accounts payable which are dependent to some extent on the actual future mortality experience or exposure of a group of creditors or debtors.

Ratings Method for Quantifying Longevity Process' Risk

In addition to the analysis of longevity risk and quantification of the risk capital associated therewith, an aspect of the present invention also provides a method for quantifying the inherent risk associated with the process of projecting longevity for the members of a pension scheme of a certain size in the way described above. This process risk is inherent in the mortality projections for a pension scheme output from the statistical mortality projection model incorporating mortality trends in a dataset associated with reference population and also incorporating mortality level risk adjustments. The magnitude of the process risk is dependent on the size of a pension scheme membership being securitized, and is particularly evident in smaller portfolios of, for example, only a few thousand members.

The risk capital required to support the process risk inherent in the capital projections for a pension scheme of a certain size output by a statistical mortality projection model may be calculated by performing a bootstrapping analysis on the reference population (such as, in the case given above, the CMI dataset) so as to characterise an error distribution for the mortality projections produced by a statistical mortality projection model. The error distribution is associated with a size of the population of the pension scheme. The characteristics of the error distribution for the mortality of the pension scheme members, for example the standard deviation, may be adjusted, for example by an adjustment factor, to produce an error distribution in the expected cash flows. By applying said error distribution to the Net Present Value of the expected cash flows, the amount of risk capital required to support the process risk can be quantified.

In the case of a Standard and Poor's or Fitch rated financial instrument, the amount of risk capital to be held is calculated as the amount which is sufficient to ensure that the payment amounts on the financial instrument can be met in the case of a sample error in the mortality projections which is projected to occur with a probability of no more than the default probability of a bond having an equivalent rating according to the rating agency's default probability rate table.

In the case of a Moody's rated financial instrument, the amount of risk capital to be held is calculated as the amount which is sufficient to ensure that the expected loss that would result from a sample error in the mortality projections is lower than the expected loss of a bond having an equivalent credit rating according to the credit rating agency's idealised loss rate table.

The bootstrapping analysis may be performed by calculating, for N random samples of members of the reference population of the same size as the population of the pension scheme, the mortality rate projected by the statistical mortality projection model for that random sample for a period of time. By comparing each of said mortality rate projections with the actual mortality rate for that sample of the reference population and for that period of time, the errors in the mortality projections can be determined and characterised. The error distribution will generally follow a normal distribution.

An example of a bootstrapping analysis of the CMI dataset of the process risk associated with the application of the statistical mortality projection method described above to a pension scheme members will now be described.

A series of bootstrapping analyses were carried out which compared projected mortality against actual mortality for 5,000 randomly sampled portfolios of members. The process of bootstrapping is as follows:
- randomly select N lives from the data set
- use the model to calculate the expected number of deaths within the sample
- compare the actual number of deaths in the sample with the expected
- repeat these steps 5,000 times for each bootstrapping analysis In each bootstrapping analysis, the ratio of expected deaths against actual deaths was analysed for each of the 5,000 simulations. The model parameters used in the base case for the bootstrapping are summarised in Table 5 below.

TABLE 5

Model parameter for bootstrapping base case

| Model parameter | Setting |
| --- | --- |
| Fitted model dimensions | Age, sex and lifestyle |
| Amount of historical data used for fitting | Years 2002 to 2006 |
| Size of portfolio for each simulation | 100,000 lives |
| Number of bootstrapping simulations | 5,000 runs |

Figure 28:
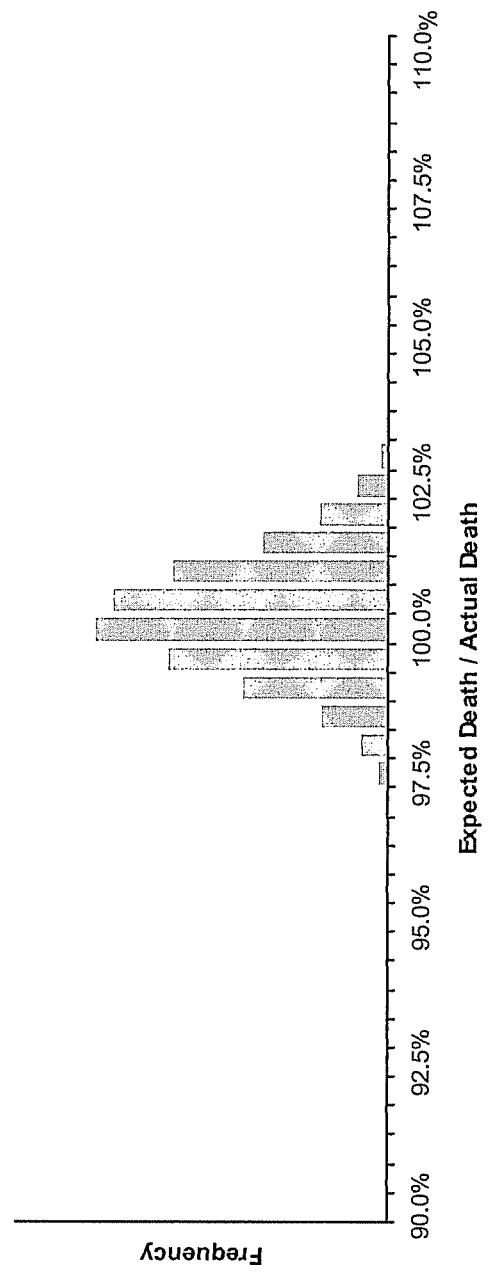
FIG. 28 shows the distribution of the results from each of the 5,000 simulations of the base case of the bootstrapping analysis for quantifying process risk.

FIG. 28 shows the distribution of the results from each of the 5,000 simulations using the base case. In this graph, a scenario with value of 100% means that the number of deaths predicted using the fitted mortality model is equal to the actual number of deaths in that scenario.

Table 6 summarises the results of the error distribution base case; the mean, standard error and 99.5$^{th}$ percentile of the deviation between actual and predicted deaths were calculated.

TABLE 6

Summary of the bootstrapping output - Base Case

| Scenario | Mean deviation | Standard deviation | 99.5 percentile |
| --- | --- | --- | --- |
| Base case | 0.00% | 1.02% | 2.52% |

Figure 29:
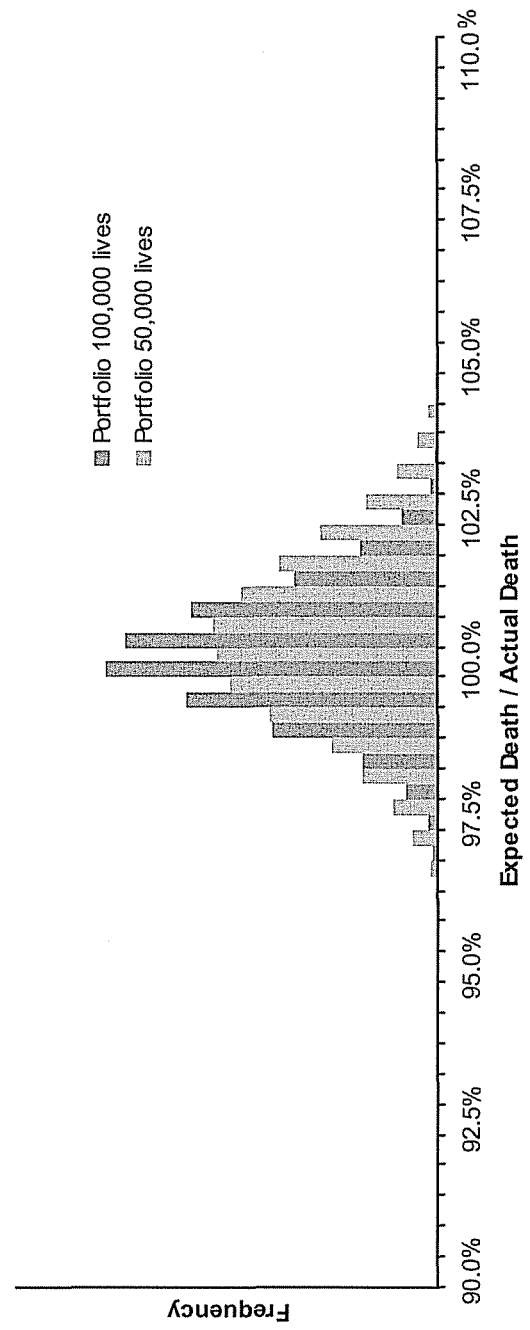
FIG. 29 shows the effect on process risk of different pension scheme/sample sizes for a sample size of 50,000 lives and 100,000 lives.

The sensitivity of the of the distribution of the outcomes for different pension scheme/sample sizes around the base case was tested for a sample size of 50,000 lives and 100,000 lives. The results are shown in FIG. 29 and Table 7.

TABLE 7

Summary of the bootstrapping output - by scheme size

| Scenario | Mean deviation | Standard deviation | 99.5 percentile deviation |
| --- | --- | --- | --- |
| Portfolio size 50,000 | 0.00% | 1.46% | 3.68% |
| Portfolio size 100,000 | 0.00% | 1.02% | 2.52% |

Based on this analysis, it is clear that mortality level risk decreases very quickly as the entire portfolio exceeds 100,000 lives using a level mortality risk model using age, sex and lifestyle.

These mortality distributions can then be adapted and used according to aspects of the present invention to quantify the risk capital requirement associated with process risk.

Providing Risk Capital and Supporting the Issuance of Longevity Financial Instruments The risk capital can be held in the form of subordinated tranches of debt and equity, issued in the form of, for example, capital notes and equity notes. Due to the low volatility in longevity risk of for example a pension scheme membership, the opportunity presented to investors to create value from subordinated notes exposed to this longevity risk is rather limited and is confined to the tail of the distribution. This may limit interest from investors and also create potential barriers to achieving an underwriting of the longevity risk in the capital markets. According to aspects of the present invention, to increase the opportunity for investors to create value by investing in these subordinated tranches of capital, and to make them more attractive, the subordinated capital may comprise exposure to longevity risk and to asset risk together. Thus the subordinated capital issued according to this aspect of the invention will support the risk exposure of the senior product to longevity risk and will also support the risk exposure of the assets underlying the issue of the senior product.

A financial instrument according to the present invention may be issued where it is not underwritten or is self-underwritten (i.e. where the corporate sponsor of the pension scheme invests in the subordinated risk capital in order to support the issue of the financial product). This may occur where, for example, the value of a pension scheme's liabilities is so large that there is not the underwriting capacity in the market available to support the issue of a capital markets product aimed at securitizing the longevity risk of the pension scheme. In this instance, the operation of the pension scheme may be transferred onto the risk management system platform and a financial product according to aspects of the present invention may be issued while the pension scheme sponsor provides the risk capital to support the issue. The subordinated capital then held by the sponsor may later be sold on by the sponsor.

Due to the fact that the entities issuing the various tranches of financial instruments according to aspects of the invention will always operate on the basis of their funding duration always exceeding their asset duration, this will be a benefit to potential capital note investors who will be able to access exposure to longevity with an enhanced yield provided by the additional exposure to the asset portfolio. For many traditional leveraged credit investors, this will provide an attractive new alternative way of achieving leveraged exposure to credit, without the need to additionally expose themselves to the risks associated with refinancing of short term debt and mark to market models, which apply to leveraged investment models which negatively mis-match the duration of their assets and liabilities by borrowing short and lending long.

By transferring the operation of the pension scheme onto the risk management system supporting the methods of aspects of the present invention, the risk management system provides a powerful tool enabling the careful and calculated management of the liabilities of the pension scheme. By the capital projection modelling methods of aspects of the present invention, pension scheme trustees or corporate sponsors may use the risk management system to analyse the costs associated with the securitization of the cash flows of liabilities to individual pension scheme members and take any appropriate action to manage those liabilities. For example, the trustees of a pension scheme or the corporate sponsor thereof may identify, using the risk management system, a number of deferred pension members for whom the cost of investing in a financial instrument according to aspects of the present invention to securitize that members liabilities is particularly costly, at, for example, £100,000 each. Having this information, the trustees or the corporate sponsor may decide to manage those liabilities by offering those members a cash incentive of for example, £80,000, to transfer out of the pension scheme. This capability for liability management in this way is provided by the risk management system and methods of aspects of the present invention.

The Longevity Capital Model

The Longevity Capital Model (LCM) for cash flow projection will now be described.

The LCM is a cash flow projection model in accordance with aspects of the invention that carries out member-by-member pension cash flow projection and valuation. FIG. 26 illustrates the main elements of this model.

The input sheets contain member-by-member information on factors which drive the member's pension entitlement such as accrued pension entitlement, as well as factors driving the member's expected mortality such as age and gender. The sheets also contain pension scheme level information such as the rules surrounding indexation of the various slices of benefits before and during retirement.

The member state model estimates the likelihood of a given member being alive or deceased (and if deceased whether their spouse is alive or deceased) on a given date. This probability projection is based on the mortality assumptions derived using the P-spline and fed into the model as an input.

The benefit calculator estimates the pension cash flow to be paid to a given member in a given period on the assumption that they are alive in that period. So, for example, it calculates the pension cash flow if the main member is still alive and also the pension cash flow if they are dead but the spouse is still alive. Beyond this, it calculates the separate 'slices' of benefits—so, for example, it calculates a member's contracted out benefits separately from the standard pension benefits, taking account of different indexation requirements for each.

Finally, the aggregation section of the model draws together the member state model and the benefit calculator. By taking account of the probability of paying each type of pension benefit in each period as well as the size of that benefit, the model calculates expected cash flows. Net Present Values are derived based off swap rates for fixed cash flows and index-linked curves for indexed cash flows. Longevity risk capital requirements are then derived using one of the approaches described above to apply specific shocks to the mortality assumptions.

There will now be described a number of exemplary Pension Defeasance Securities products, which can be offered to pension scheme trustees and corporate sponsors and used to immunize a pension scheme from longevity risk by at least partially defeasing the pension scheme for at least a predetermined period.

The Buyout Equivalent Bond, or 'Blue Bond'

This is economically equivalent to a buyout and therefore the most comprehensive product, which pays cash flows that mirror the actual liabilities of the scheme to its members. This is achieved by using the proprietary risk management systems to analyse the pension scheme membership data and scheme rules to create a projection of expected liabilities. Payments on this bond will fully reflect all relevant pension scheme legislation including Barber adjustments, GMP step ups, and anti-franking legislation.

The Blue Bond, although economically equivalent to buyout, fundamentally differs from existing insurance buyout solutions as it is designed to be held as an asset of the pension scheme, under the control of the scheme's existing trustees. As with all products according to aspects of the invention, the Blue Bond is primarily designed for use by ongoing schemes. However, if required, it could also be structured to provide a full buyout solution for a closed pension scheme from which the sponsor wishes to be de-linked.

Once a pension scheme has bought a Blue Bond and the scheme data and rules are on the administrative platform of the risk management system, it is then very easy to price additional tranches of benefits, additional accruals, or increased compensation. Additional tranches of benefits can then be purchased at a defined price, making the financial impact of running a defined benefit scheme transparent to the sponsor.

The Term Buyout Bond, or 'Term Blue Bond'

This product pays cash flows that mirror the actual liabilities of the pension scheme to its members for a defined period. The product is ideal for pension schemes which are seeking to immunise a significant part of their risk, but may not have the resources to totally defease the liability. The Term Blue Bond allows a pension scheme to choose the period of risk that it covers, based upon its resources and risk appetite.

This product is likely to be popular with schemes that are looking to move to a position of full funding and total risk removal over a period of time as they will be able to reduce risk and volatility significantly and then extend the horizon of cover as they receive additional contributions from the sponsor or surplus is generated from exposure to higher risk assets.

The Deferred Payment Bond, or 'Geared Blue Bond'

This product is designed for schemes that are not currently fully funded and cannot, therefore, buy a full Blue Bond. This product provides full immunisation of risk for the life of the scheme, with part of the cost payable over a number of years. This makes it easier for the sponsor to cover the cost of filling the deficit in a phased way, while putting the trustees in a fully defeased position and fully removing the deficit volatility.

It could also be of value to schemes which could buy a full Blue Bond outright but choose to retain some non-matching assets within the scheme to try and achieve extra return, which could then be used to grant discretionary benefits or reduce sponsor contributions in respect of future accrual.

The Pro-Rata Bond, or 'Light Blue Bond'

This is a Blue Bond that pays out a defined percentage of scheme benefits for the full term of the scheme. Alternatively, payments on the bond may be linked with the liabilities of the pension scheme to any defined segment of its members, such as, for example, males or females only, members over a certain age, etc.

This product allows a scheme to choose exactly what proportion or segment of its liabilities it wishes to cover. The use of this bond is very flexible as it can be used to replace a traditional bond portfolio with an investment that mirrors the inflation sensitivity, duration, embedded options and longevity of the scheme's actual liabilities. It can also be used as part of a dynamic investment strategy to gradually move towards a complete removal of financial risk from the pension scheme as the proportion of the liabilities that are covered by the bond is increased.

The Term Deficit Volatility Removal Bond, or 'Green Bond'

This product is designed for pension scheme sponsors, which are concerned about deficit volatility stemming from IAS19 and FRS17. To deal with this issue, a number of different solutions are available depending on the requirements.

A typical example would involve transfer of the scheme assets to the issuer of the financial instrument which would undertake to pay all of the benefits due to members for 10 years, at the end of which the issuer of the financial instrument would return to the scheme an amount that guarantees the IAS19 surplus/deficit to a pre-specified level. As a result, the sponsor would be protected against deficit volatility for the life of the investment.

The Buyout Equivalent Fixed Inflation Bond, or 'White Bond'

This product is the same as the full Blue Bond except that it pays on the assumption that there is no future variability in inflation, i.e. it is priced on the basis of a fixed inflation assumption. The purpose of this product is to provide longevity cover to schemes who may have already removed their exposure to variable inflation through the derivative markets. This product may also be suitable for schemes where the sponsor is comfortable with the inflation risk—e.g. when a company has an income stream which is linked to inflation—but wishes to hedge exposure to longevity.

It will be understood that many other Pension Defeasance Securities products fall within the scope of the invention and those bonds described above are presented herein only as an example. In particular, bonds and other suitable securities and derivatives can be structured to meet the specific objectives of a pension scheme according to the scheme's rules, membership, appetite for risk and available resources. This can be achieved by analysing each of the separate risks the pension scheme faces, down to the individual member level, and removing those exposures the scheme does not wish to manage, whilst retaining those with which the scheme is comfortable and wishes to retain the upside potential. Bonds and other suitable securities and derivatives can therefore be issued which are capable of providing risk specific or partial defeasance or the total elimination all scheme risks, up to a buyout level.

The Life Expectancy Bond, or Purple Bond

This product pays cash flows that reflect actual liabilities of a scheme to its members subject to an agreed age limit for each member or defined group of members (group defined by reference to age, gender, status (deferred/pensioner) etc. The Purple Bond can therefore be used to provide cost effective risk management for scheme sponsors and trustees who do not want to pay excessive premiums for risks they consider to be of low probability.

The Best Estimate Cash Flows Only Bond, or Red Bond

The Red Bond pays cash flows that reflect projected liabilities of a scheme to its members at time of issue based upon longevity parameters required by the trustees and sponsor (these cash flows may reflect best estimate longevity or may be increased or decreased to meet additional or reduced risk coverage requirements); its cash flows are not subject to adjustment by reference to actual mortality outcomes but are subject to adjustment for all other factors (inflation and member discretions such as cash commutation, transfers out etc).

It will be appreciated that in putting into effect any embodiments of the invention, any or all calculations may be carried out by data processing apparatus having processing means, memory means, data input means and data output means, using suitable software which may be generic or specifically designed for use in the context of the present invention.

The invention claimed is:

1. A computer-implemented method of providing a risk management report in relation to a pension scheme, comprising:
   regularly calculating, using data processing apparatus, a value of obligations of a pension scheme to members of the pension scheme by applying data representative of a demographic assumption for the members, data representative of a market assumption and data representative of rules of the pension scheme to regularly updated data representative of the members to provide an indication of a value of liabilities of the pension scheme;
   regularly calculating, using data processing apparatus, a value for all asset classes held in an investment portfolio of the pension scheme based on regularly updated market data, data representative of a market assumption, and data representative of assets of the pension scheme to provide an indication of a value of the assets of the pension scheme; and providing, using data processing apparatus, up-to-date web-based reporting of the value of the assets and liabilities of the pension scheme based on the results of said regularly performed calculations.

2. A method as claimed in claim 1, wherein the demographic assumption comprises a mortality assumption and wherein the mortality assumption is based on a mortality table of a reference population.

3. A method as claimed in claim 2, wherein the mortality assumption includes adjustments made to the mortality table of a reference population based on an analysis of the members of the pension scheme.

4. A method as claimed in claim 3, wherein the analysis of the members of the pension scheme includes an analysis of the actual mortality experience of the pension scheme and/or an analysis of the socio-economic characteristics of the members of the pension scheme.

5. A method as claimed in claim 3, wherein the analysis of the members of the pension scheme is used to adjust, at a pension scheme group level, the mortality rate of the mortality assumptions for all pension scheme members and/or the future improvements in mortality of the mortality assumptions for all pension scheme members, and/or, at an individual pension scheme member level, the mortality rate of the mortality assumptions for each member.

6. A method as claimed in claim 1, wherein the demographic assumption comprises a mortality assumption, and wherein the method further comprises:

responsive to user input, calculating, using data processing apparatus, data representative of an adjusted mortality assumption by applying a user-specified adjustment to the mortality assumption;

recalculating an adjusted value of the pension scheme liabilities using the adjusted mortality assumption; and presenting the results of said recalculation in the web-based reporting of assets and liabilities of the pension scheme.

7. A method as claimed in claim 6, wherein the user-specified adjustment comprises an adjustment, at a pension scheme group level, to the mortality rate of the mortality assumptions for all pension scheme members or to the future improvements in mortality of the mortality assumptions for all pension scheme members.

8. A method as claimed in claim 6, wherein the user-specified adjustment comprises adjustments, at an individual pension scheme member level, to the mortality rate of the mortality assumptions for each member.

9. A method as claimed in claim 8, wherein the individual member mortality adjustments for each member are dependent on the socio-economic characteristics of that member.

10. A method as claimed in claim 1, further comprising:
providing a plurality of possible demographic assumptions and market assumptions, selectable by a user for use in the step of calculating the value of the liabilities of the pension scheme, and responsive to a user selection of one of said plurality of possible demographic assumptions and one of said plurality of possible market assumptions, providing to the user the results of the calculation of the value of the liabilities of the pension scheme performed using said selected demographic assumption and said selected market assumption.

11. A method as claimed in claim 1, further comprising:
wherein the data representative of a market assumption includes one or more assumptions from the group comprising: an interest rate assumption, an inflation assumption, a discount rate assumption, an FX assumption, a credit spread assumption, an asset value market stress assumption, an equity dividend assumption, and a salary assumption.

12. A method as claimed in claim 11, further comprising:
recalculating, responsive to user input of a stress related to the demographic assumption and/or market assumption, and using data processing apparatus, what the value of the pension scheme assets and/or liabilities would be in the event that stressed assumptions were to occur by applying data representative of a user-specified stress to adjust a mortality assumption, interest rate assumption, inflation assumption, and/or a discount rate assumption.

13. A method as claimed in claim 1, further comprising:
providing in the web-based reporting an indication of the risk exposure of the scheme assets. and/or liabilities.

14. A method as claimed in claim 1, further comprising:
calculating a metric of the risk exposure of the pension scheme on the basis of the pension scheme assets and/or liabilities.

15. A method as claimed in claim 14, wherein the metric calculated is one of a funding level of the pension scheme, a contributions requirement to ensure the pension scheme is fully funded, value of a surplus/deficit of the scheme, a volatility of the funding level of the pension scheme, a change in asset and/or liability cash flows and valuations over a given time or in response to stress testing, a Value at Risk, a Risk Based Capital (RBC) requirement to support the pension scheme, a Risk Adjusted Return on Capital of the assets, and a risk of an asset-liability mismatch.

16. A method as claimed in claim 1, further comprising:
regularly and automatically calculating, using data processing apparatus, a projection of future cash flow obligations of the pension scheme to members of the pension scheme by applying data representative of a demographic assumption for the members, data representative of a market assumption and data representative of the rules of the pension scheme to regularly updated data representative of the members to provide an indication of the value of the liabilities of the pension scheme;

regularly and automatically calculating, using data processing apparatus, a projection of future cash flows for all asset classes held in an investment portfolio of the pension scheme based on regularly updated market data, data representative of a market assumption, and data representative of the pension scheme assets to provide an indication of the value of the assets of the pension scheme; and providing, using data processing apparatus, up-to-date web-based reporting of the value of the assets and liabilities of the pension scheme based on the results of said regularly performed calculations.

17. A computer-implemented method as claimed in claim 16, wherein the market assumption includes one or more assumptions from the group comprising: an interest rate assumption, an inflation assumption, a discount rate assumption, an FX assumption, a credit spread assumption, an asset value market stress assumption, an equity dividend assumption, and a salary assumption.

18. A method as claimed in claim 16, further comprising:
generating data representative of the projected net cash flows of the pension scheme.

19. A method as claimed in claim 16, further comprising:
providing an analysis of changes that can be made to the projected asset cash flow to reduce the risk exposure of the pension scheme.

20. A method as claimed in claim 16, further comprising:
generating reports of the pension scheme asset and/or liability projections for use in achieving regulatory compliance.

21. A method as claimed in claim 16, further comprising performing, using data processing apparatus, a stochastic modelling of the future cash flows of the assets and/or liabilities of the pension scheme.

22. A method as claimed in claim 1, further comprising:
responsive to user input, calculating, using data processing apparatus, data representative of an adjusted market assumption by applying a user-specified adjustment to the market assumption;

recalculating an adjusted value of the pension scheme assets using the adjusted market assumption; and presenting the results of said recalculation in the web-based reporting of assets and liabilities of the pension scheme.

23. A method as claimed in claim 1, further comprising:
providing a plurality of possible market assumptions, selectable by a user for use in the step of calculating the value of the assets of the pension scheme, and responsive to a user selection of one of said plurality of possible market assumptions, providing to the user the results of the calculation of the value of the assets of the pension scheme performed using said selected market assumption.

24. A method as claimed in claim 1, further comprising:
providing to the user in the web-based reporting access to detail of the demographic and/or market assumptions, and/or providing access to the regularly updated market data.

25. A computer configured to be usable to provide a risk management report in relation to a pension scheme, comprising:
data processing apparatus; and
a non-transitory data carrier containing instructions which when run on the data processing apparatus, cause the data processing apparatus to be operable to:
regularly calculate, using data processing apparatus, a value of obligations of a pension scheme to members of the pension scheme by applying data representative of a demographic assumption for the members, data representative of a market assumption and data representative of rules of the pension scheme to regularly updated data representative of the members to provide an indication of a value of liabilities of the pension scheme;
regularly calculate, using data processing apparatus, a value for all asset classes held in an investment portfolio of the pension scheme based on regularly updated market data, data representative of a market assumption, and data representative of assets of the pension scheme to provide an indication of a value of the assets of the pension scheme; and
provide, using data processing apparatus, up-to-date web-based reporting of the value of the assets and liabilities of the pension scheme based on the results of said regularly performed calculations.

26. A non-transitory data carrier containing instructions which when run on a data processing apparatus, cause the data processing apparatus of a computer to:
regularly calculate, using data processing apparatus, a value of obligations of a pension scheme to members of the pension scheme by applying data representative of a demographic assumption for the members, data representative of a market assumption and data representative of rules of the pension scheme to regularly updated data representative of the members to provide an indication of a value of liabilities of the pension scheme;
regularly calculate, using data processing apparatus, a value for all asset classes held in an investment portfolio of the pension scheme based on regularly updated market data, data representative of a market assumption, and data representative of assets of the pension scheme to provide an indication of a value of the assets of the pension scheme; and
provide, using data processing apparatus, up-to-date web-based reporting of the value of the assets and liabilities of the pension scheme based on the results of said regularly performed calculations.

27. A computer-implemented method usable to assess a risk exposure of a pension scheme, comprising:
calculating, using data processing apparatus, a projection of future cash flow obligations of a pension scheme to members of the pension scheme by applying data representative of a demographic assumption for the members, data representative of a market assumption and data representative of rules of the pension scheme to regularly updated data representative of the members;
calculating, using data processing apparatus, a projection of future cash flows for all asset classes held in an investment portfolio of the pension scheme based on regularly updated market data, data representative of a market assumption, and data representative of the pension scheme assets; and
calculating, using data processing apparatus, what the projected future cash flow obligations of the pension scheme and/or what the projected future cash flows for the assets held by the pension scheme would be in the event that stressed assumptions were to occur by applying data representative of a user-specified stress to adjust a mortality assumption, and/or the market assumption.

* * * * *